United States Patent

Kanda et al.

[11] Patent Number: 6,044,463
[45] Date of Patent: *Mar. 28, 2000

[54] METHOD AND SYSTEM FOR MESSAGE DELIVERY UTILIZING ZERO KNOWLEDGE INTERACTIVE PROOF PROTOCOL

[75] Inventors: Masayuki Kanda; Kiyoshi Yamanaka; Youichi Takashima, all of Kanagawaken, Japan

[73] Assignee: Nippon Telegraph and Telephone Corporation, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/944,025

[22] Filed: Aug. 25, 1997

Related U.S. Application Data

[62] Division of application No. 08/535,199, Nov. 6, 1995, Pat. No. 6,011,848.

[30] Foreign Application Priority Data

| Mar. 7, 1994 | [JP] | Japan | 6-035797 |
| Sep. 7, 1994 | [JP] | Japan | 6-213374 |
| Sep. 21, 1994 | [JP] | Japan | 6-226282 |

[51] Int. Cl.[7] .............................. H04K 1/00; H04L 9/00
[52] U.S. Cl. ..................... 713/168; 713/170; 713/171; 380/30; 380/28
[58] Field of Search .................. 380/23, 24, 25, 380/30, 28, 49; 713/168, 170, 171

[56] References Cited

U.S. PATENT DOCUMENTS

| 4,200,770 | 4/1980 | Hellman et al. | 380/30 |
| 4,405,829 | 9/1983 | Rivest et al. | 380/30 |
| 4,748,668 | 5/1988 | Shamir et al. | |
| 4,956,863 | 9/1990 | Goss | 380/30 |
| 5,136,642 | 8/1992 | Kawamura et al. | 380/21 |
| 5,371,794 | 12/1994 | Difie et al. | 380/21 |
| 5,390,252 | 2/1995 | Suzuki et al. | 380/23 |
| 5,600,725 | 2/1997 | Rueppel et al. | 380/30 |

OTHER PUBLICATIONS

"Applied Cryptography," by Bruce, Schneier, pp. 425–428, 1994.

Article entitled, "A Method for Obtaining Digital Signature and Public–Key Cryptosystems", by Rivest, Shamir and Adleman, Feb. 1978, Communications of the ACM.

Article entitled, "How to Prove Yourself: Practical Solutions to Identification and Signature Problems", by Fiat and Shamir, Department of Applied Mathematics, The Welzmann Institute of Science, Rehovot 76100, Isarel.

Article entitled, "An Extension of the Fiat–Shamir Scheme Based on Higher Degree Roots", by Ohta and Okamoto, NTT Communications and Information Processing Laboratories, Nippon Telegraph and Telephone Corporation, Aug. 1988.

*Primary Examiner*—Gail O. Hayes
*Assistant Examiner*—Hrayr A Sayadian
*Attorney, Agent, or Firm*—Banner & Witcoff, Ltd.

[57] ABSTRACT

A message delivery system which can guarantee the authenticity of a user, the reliability of a message delivery, and the authenticity of the message delivery, while preventing an illegal act, and which can prove them at a later time. The system has an information provider terminal including a user authentication unit for carrying out a user authentication of the user according to a zero knowledge interactive proof protocol using check bits E generated according to a work key W, and a transmission unit for transmitting to the user a ciphertext C in which a message M to be delivered to the user is enciphered according to a secret key cryptosystem by using the work key W, and the check bits E. The system also has a user terminal including a message reception unit for taking out the work key W by using at least the check bits E, and obtaining the message M by deciphering the ciphertext C according to the secret key cryptosystem by using the work key W.

13 Claims, 27 Drawing Sheets

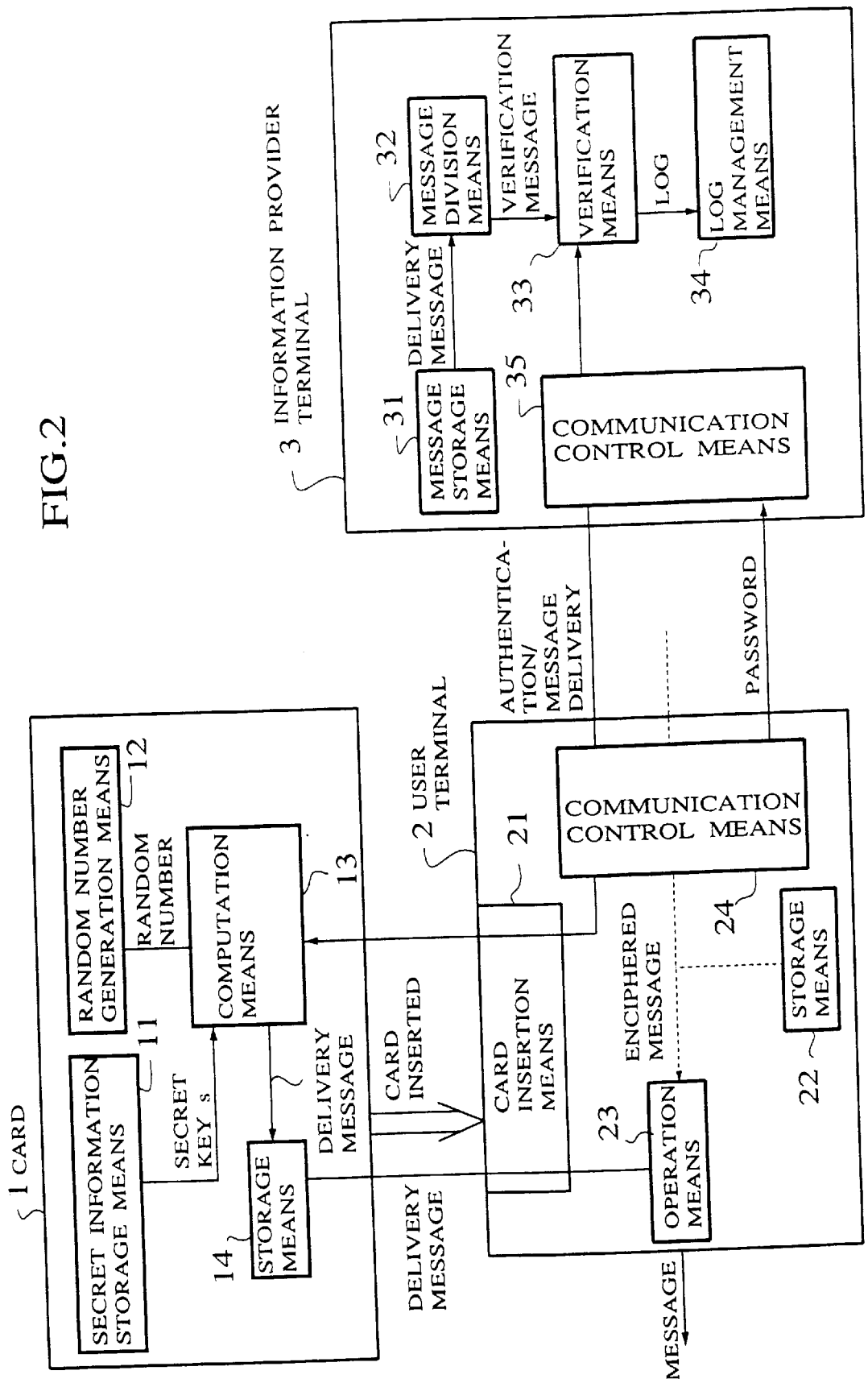

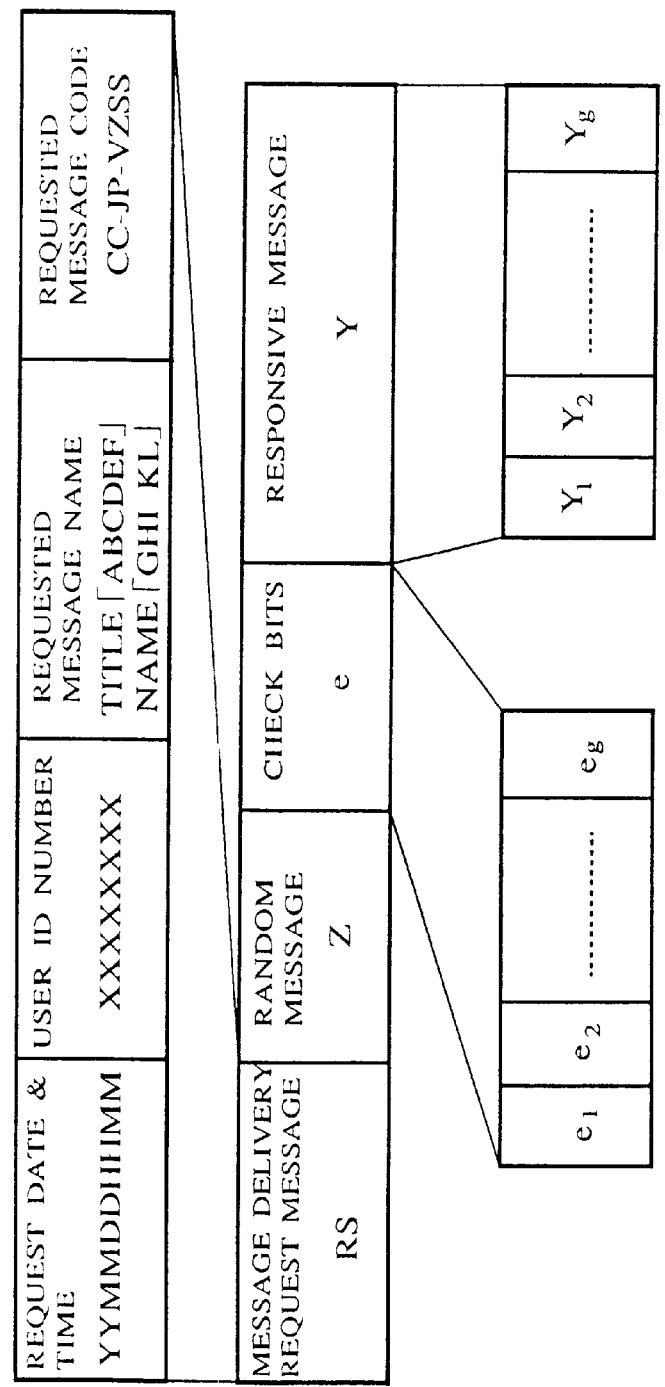

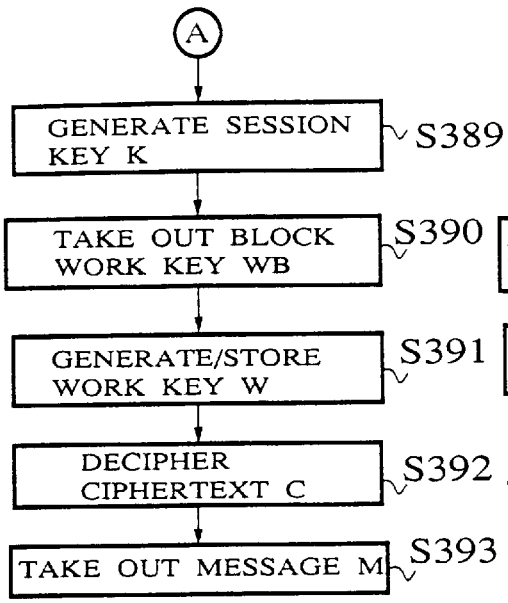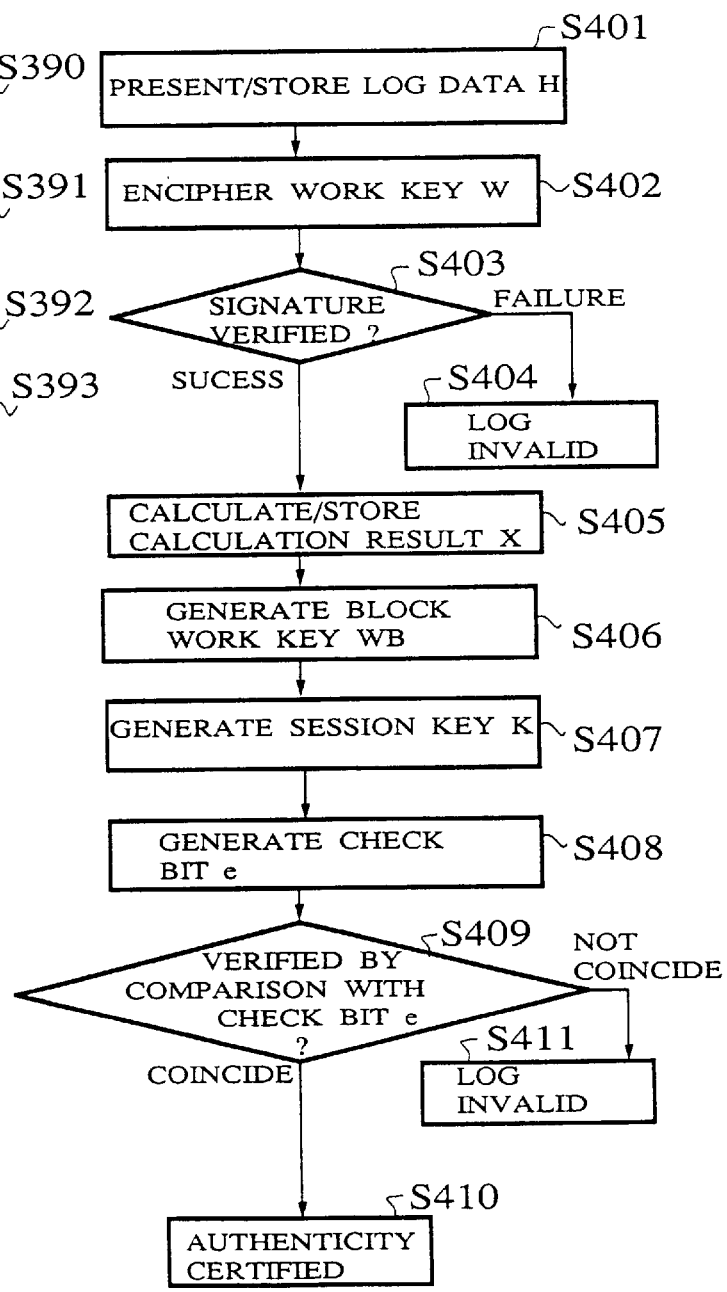

METHOD AND SYSTEM FOR MESSAGE DELIVERY UTILIZING ZERO KNOWLEDGE INTERACTIVE PROOF PROTOCOL

This application is a division of application Ser. No. 08/535,199 filed Nov. 6, 1995 and entitled, "METHOD AND SYSTEM FOR MESSAGE DELIVERY UTILIZING ZERO KNOWLEDGE INTERACTIVE PROOF PROTOCOL", now U.S. Pat. No. 6,011,848.

TECHNICAL FIELD

The present invention relates to a message delivery method and system in which an information provider provides a message requested by a user via a communication system, the information provider verifies the authenticity of the user, while surely delivering to the user the message requested by the user, and in response to a claim by the user later on that the requested message was not received, it is possible to prove that the information provider definitely delivered the requested message to the user and that the user received it.

BACKGROUND ART

Conventionally, representative authentication methods include a user authentication scheme for checking the authenticity of a system user, a message authentication scheme for proving that a message is an authentic one, and a digital signature scheme in which they are combined further and the information producer guarantees that a produced message is authentic. Here, the user authentication scheme, the message authentication scheme, and the digital signature scheme will be briefly explained with references to the respective figures.

FIG. 1A is a conceptual diagram of an authentication scheme according to the Fiat Shamir scheme which is a representative example of the user authentication scheme. (A. Fiat and A. Shamir: "How To Prove Yourself, Practical Solutions To Identification And Signature Problems", Proc. of Crypto '86, 1986.5, and U.S. Pat. No. 4,748,668.

According to this Fiat Shamir scheme, when a party (referred to hereafter as a prover) which owns secret information s tries to prove its authenticity to a verifier, it is authenticated as follows, with N (=pq: p and q are mutually different large prime numbers) and $I(=s^2 \pmod N)$ as the public information of the prover, and s, p and q as the secret information of the prover.

First, at the beginning, the prover generates a random number R, calculates a preresponsive message $X=R^2 \pmod N$, and sends X to the verifier. The verifier who received X selects 0 or 1 randomly as a check bit e, and sends e to the prover. The prover who received e calculates a responsive message $Y=Rs^e \pmod N$, and sends Y to the verifier. The prover who received Y verifies whether a verification formula $Y^2=X \times I^e \pmod N$ holds.

By referring to the foregoing steps as one round, and repeating this for t rounds, the probability of a third party who does not know the secret information clearing the verification formula of the verifier becomes $(\frac{1}{2}^t)$. Therefore, when the authentication is cleared for sufficiently large t, the verifier may very well judge that the verification target (prover) is an authentic prover who owns the secret information s.

Here, this authentication scheme is generally referred as an authentication scheme based on the zero knowledge interactive proof, which has merit in that the prover notifies only a fact that it owns the secret information s to the verifier, without leaking other contents related to the secret information s.

In the Fiat Shamir scheme, there has been a problem that the log for the prover and the verifier cannot be used later as definitive evidence that the verifier has authenticated the prover. For this reason, there is a proposition of an authentication scheme in Sakurai (Japanese Patent Application Laid Open No. 5-12321) as a solution for this problem. According to this authentication scheme, it is said that, definitive evidence that the verifier has really authenticated the prover remains even after the verifier has authenticated the prover.

What remains as an evidence though is only that the verifier authenticated the prover through a communication at best, and apart from this authenticated fact, it does not refer to what kind of communication has been made, such as the communication content in the first place. Also, because it records and maintains all the communication sequences as the evidence of the authenticated fact, there is also a drawback in that a large amount of information must be recorded and maintained by the verifier.

Next, FIG. 1B is a conceptual diagram of an authenticator in which the prover, who wishes to transmit a message M, produces an authenticator $h_k(M)$ for the message M by utilizing the hash function h with a secret key $K_h$ as a parameter. The prover transmits the authenticator along with the message M to the verifier who is a transmission target. The verifier is secretly sharing the same secret key $K_h$ as the prover in advance, so that it produces the authenticator by using the secret key $K_h$ from the received message similarly as in the above, and checks by matching with the received authenticator. When this matching succeeds, the authenticity of the received message is guaranteed. Because the correct authenticator for an arbitrary message cannot be produced without knowing the secret key $K_h$.

The main purpose of both the above described user authentication and message authenticated schemes is preventing an illegal act by a third party. The user authentication scheme verifies, at best, that the prover is an authenticated owner of the secret information. In other words, it proves that a third party has not been using that secret information illegally. The message authenticated scheme verifies only that an illegal act by a third party, such as an alteration of the message, has not been performed. Therefore, these two authentication schemes are effective, in principle, only against an illegal act by a third party. Their lack of effectiveness against illegal acts by the prover or the verifier is a draw back.

Next, FIG. 1C is a conceptual diagram of an RSA signature scheme (R. L. Rivest, A. Shamir, L. Adleman, "A Method For Obtaining Digital Signatures And Public-Key Cryptosystem", Comm. ACM, vol. 21, No. 2, 1978.2) which is one example of a digital signature.

According to the RSA signature scheme, it is authenticated as follows, with e and N (=pq: p and q are mutually different large prime numbers) as the public information of the signer, and $d[e \times d \pmod{(p-1)(q-1)}=1]$, p and q as the secret information of the signer.

First, the signer calculates a signed message $C=M^d \pmod N$ in order to guarantee that the message M is certainly what is produced by the signer, and transmits C to the verifier. The verifier who received the signed message C calculates $M=C^e \pmod N$, and judges the authenticity of the obtained message M. At this point, when it is judged that the obtained message M is authentic, it is guaranteed that the received message M is definitely what was produced by the signer.

This is because a correct signed message for an arbitrary message cannot be produced without knowing the secret information d, and in addition, the secret information d is unique to each individual so that the signer himself is also going to be specified. Therefore, illegal acts in which the third party or the verifier alters the message content, or the signer denies the message content, are considered to be difficult.

However, at best, this only has an effect from the point at which the exchange of the messages has normally finished. There is no guarantee for what came before that, i.e., whether the transmitted signed message C has surely reached the verifier from the viewpoint of the signer. As such, so that once it is claimed that the signed message C has not been received by the verifier, there is no means for the signer to oppose that claim, which is a drawback.

In a case in which the information provider provides a message requested by the user, it is necessary to satisfy the following four conditions:

(1) the user authentication for guaranteeing that it is the authentic user;

(2) the delivery proof for guaranteeing that the information provider has surely provided the message requested by the user, and the user has received the provided message;

(3) the content proof that the provided message is the authentic one, which is capable of preventing the illegal act such as the alteration; and (4) the fact that all of (1) to (3) can be proved later on as the information provider presents evidence such as a log, and the like to an arbitrator, as needed or desired.

As explained in the conventional schemes, the Fiat Shamir scheme satisfies (1) alone, the scheme of Sakurai (Japanese Patent Application Laid Open No. 5-12321) satisfies only (1) and a part of (4) (only an evidence for the user authentication), the message authentication satisfies only a part of (3) (only a guarantee that the message is authentic), and the RSA signature scheme satisfies only (3), so that there has been a drawback that the information provider is not provided evidence of some kind of illegal act, such as an improper claim in which the user says the provider message has not been received despite the fact that it has been received, as in (2) in particular.

DISCLOSURE OF THE INVENTION

An object of the present invention is to provide a method and a system for message delivery utilizing the zero knowledge interactive proof protocol, capable of satisfying all of the above described four conditions that could not have been satisfied by a conventional scheme, while transmitting a message from an information provider to a user (including a card, a user terminal, etc.).

According to one aspect of the present invention, there is provided a message delivery method in a system containing at least an information provider and a user, when the user requests a delivery of a message to the information provider, characterized by carrying out: a step in which the information provider carries out a user authentication of the user according to a zero knowledge interactive proof protocol; a step in which the information provider transmits the message M to be delivered to the user as a part of check bits E in the zero knowledge interactive proof protocol, and delivers the message to the user in units of one bit or a plurality of bits; and a step in which the information provider makes a record management of a log data H for the zero knowledge interactive proof protocol.

According to another aspect of the present invention, there is provided a system containing at least a user terminal and an information provider terminal, which is a message delivery system characterized in that: the user terminal has: a user communication control means for controlling a communication with the information provider terminal, a user secret information storage means for storing secret information to be kept in secret by the user, a random number generation means for generating random numbers, and a user computation means for generating a preresponsive message and a responsive message to be communicated through said user communication control means according to said secret information and random numbers; and the information provider terminal has: an information provider communication control means for controlling a communication with the user terminal, a message database for storing messages to be provided to the user through said information provider communication control means, and a verification means for making an authentication of the user through said information provider communication control means.

According to another aspect of the present invention, there is provided a system containing at least a user terminal and an information provider terminal, which is a message delivery system characterized in that: the user terminal has: a user communication control means for controlling a communication with the information provider terminal, a user secret information storage means for storing secret information to be kept in secret by the user, a user secret key cryptosystem means for carrying out a secret communication with the information provider terminal through said user communication control means; a random number generation means for generating random numbers, a user computation means for generating a preresponsive message, a responsive message, and a secret key to be communicated through said user communication control means, and a message storage means for storing a message delivered from the information provider through said user communication control means; and the information provider terminal has: an information provider communication control means for controlling a communication with the user terminal, a message database for storing messages to be provided to the user through said information provider communication control means, an information provider computation means for generating the secret key and check bits, an information provider secret key cryptosystem means for carrying out a secret communication with the user terminal through said information provider communication control means, and a verification means for making an authentication of the user through said information provider communication control means.

BRIEF DESCRIPTION OF THE DRAWINGS

FIG. 2 is a block diagram showing an exemplary configuration of a message delivery system in the first embodiment of the present invention.

FIG. 20 is a diagram showing a configuration format of a message delivery request message used in the message delivery system shown in FIG. 17.

FIG. 21 is a diagram showing a configuration format of a log used in the message delivery system shown in FIG. 17.

FIG. 28 is a flow chart showing a second half of an operation procedure concerning a message delivery, a delivery certification and a message take out for the message delivery system shown in FIG. 26.

FIG. 29 is a flow chart showing an operation procedure concerning an arbitration for the message delivery system shown in FIG. 26.

BEST MODE FOR CARRYING OUT THE INVENTION

Figure 1A:
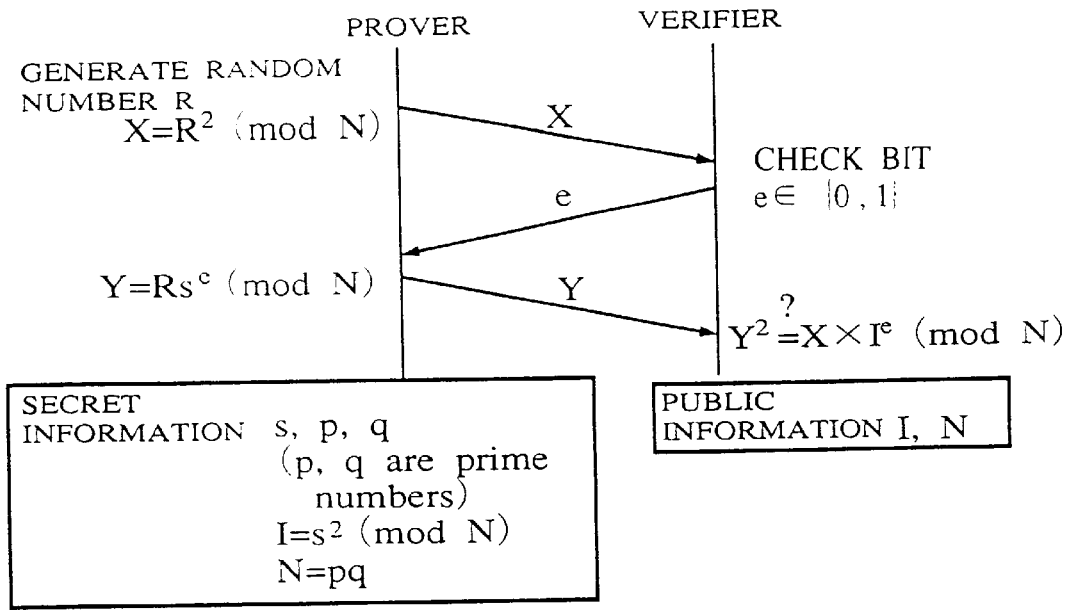
FIG. 1A is a conceptual diagram showing a user authentication scheme according to a conventional Fiat Shamir scheme.
Figure 1B:
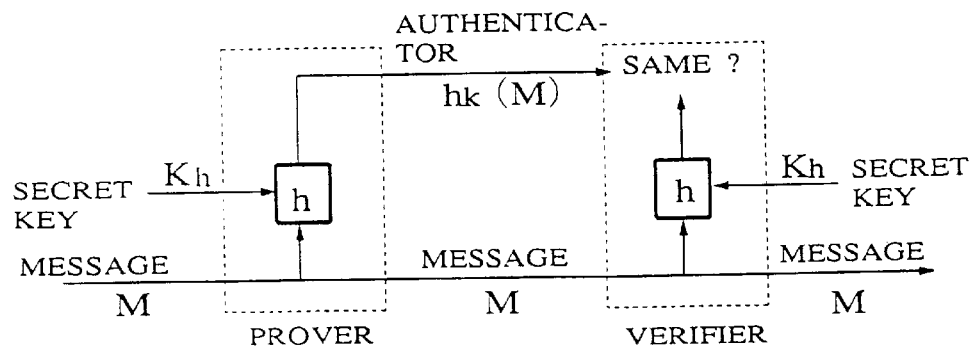
FIG. 1B is a conceptual diagram showing a message authentication scheme according to a conventional authenticator scheme.
Figure 1C:
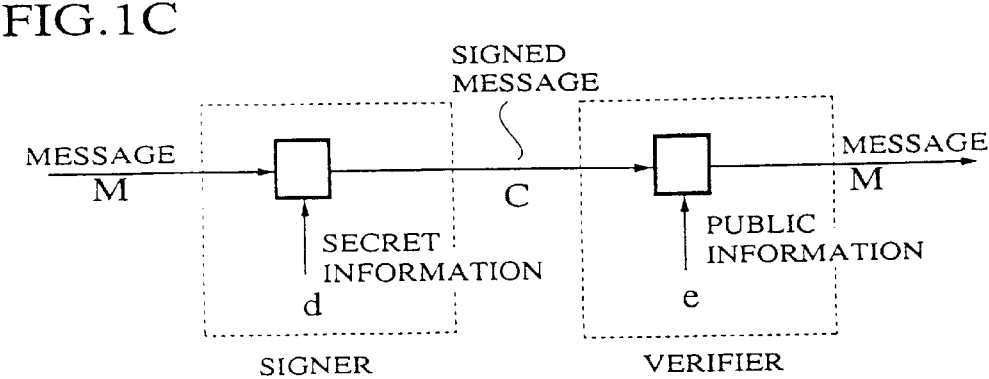
FIG. 1C is a conceptual diagram showing a digital authentication scheme according to a conventional RSA scheme.
Figure 3:
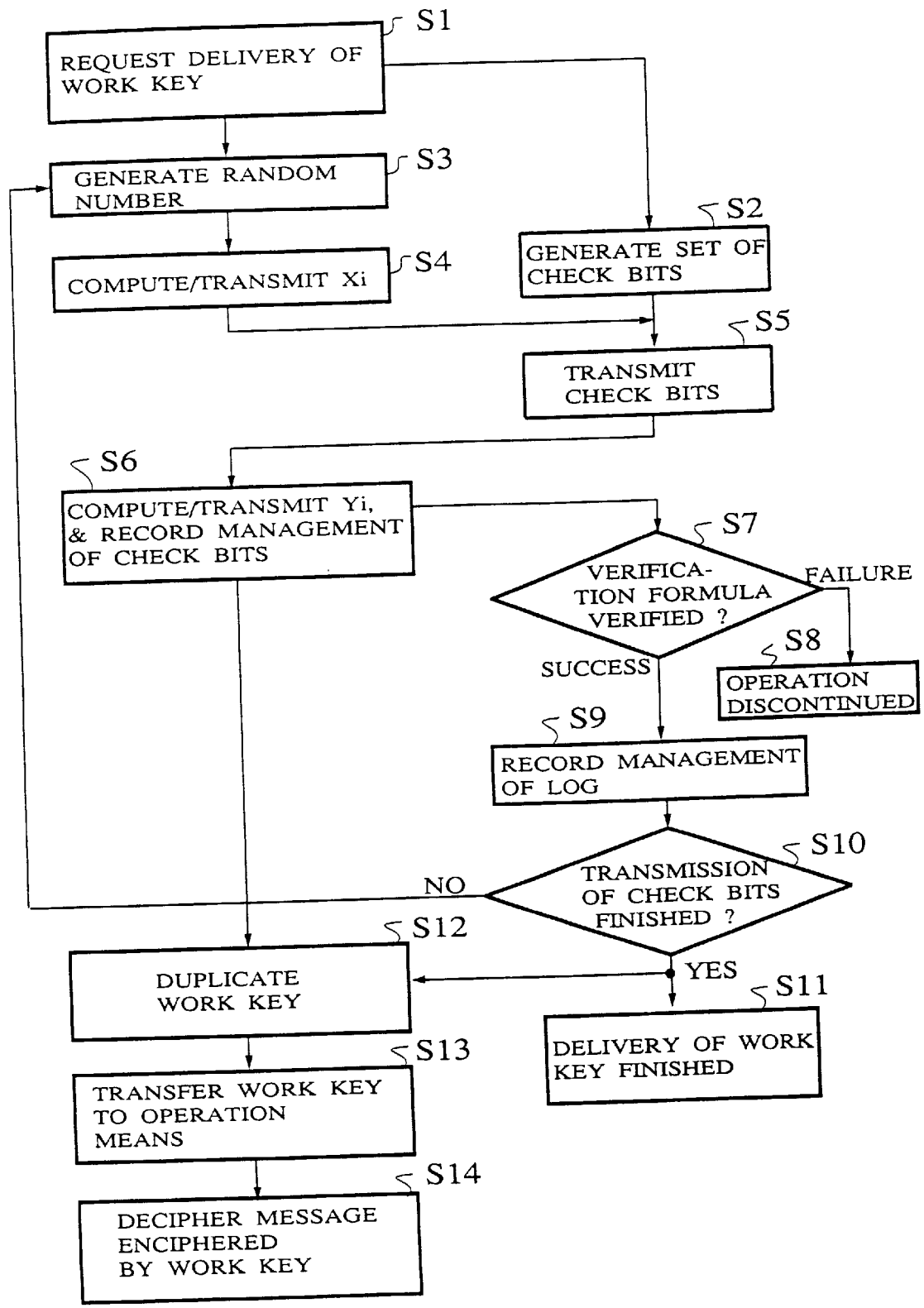
FIG. 3 is a flow chart showing an operation procedure for the message delivery system shown in FIG. 2.
Figure 4:
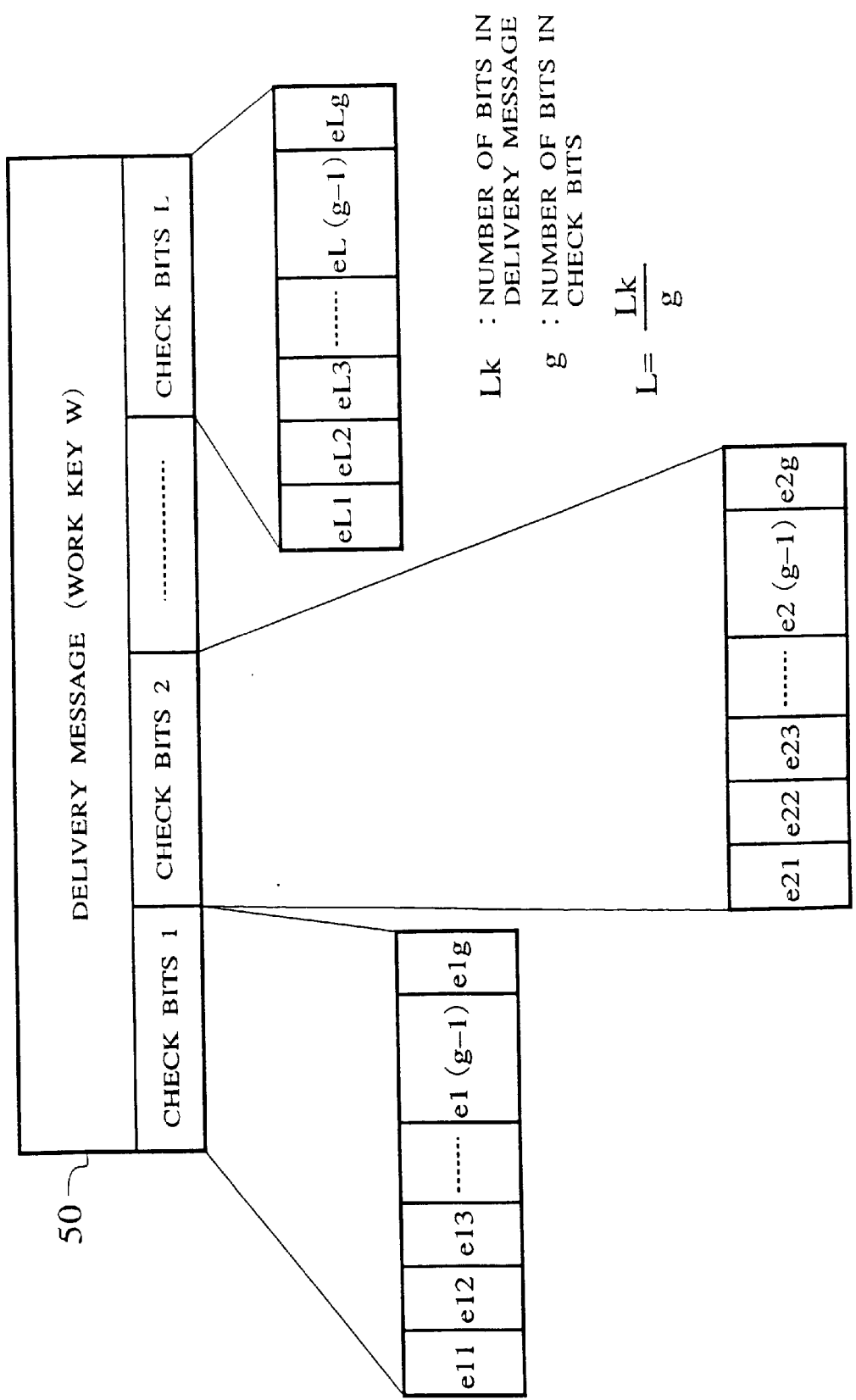
FIG. 4 is a diagram showing an exemplary delivery message used in the message delivery system shown in FIG. 2.

In the following, the embodiments of the present invention will be explained with references to the drawings.

FIG. 2 shows an exemplary configuration of a message delivery system in the first embodiment of the present invention. In FIG. 2, 1 is a card owned by a user, 11 is a secret information storage means for storing a secret information unique to the card, 12 is a random number generation means utilized in the zero knowledge interactive proof protocol, 13 is a computation means for carrying out computations necessary in executing the protocol, and 14 is a storage means for recording messages from an information provider. Here, each of these means is implemented on a tamper resistant device such as an IC and is physically safe.

User terminal 2 is a fixed type user terminal used by the user, 21 is a card insertion means, 22 is a storage means for storing messages from the information provider, 23 is an operation means for operating the messages, and 24 is a communication control means for making a communication with the information provider.

Information provider terminal 3 is for delivering delivery messages to the user, 31 is a message store means for storing the delivery messages, 32 is a message division means for producing sets of check bits by dividing the delivery message, 33 is a verification means for carrying out a verification of the zero knowledge interactive proof protocol, 34 is a log management means for making a record management of logs and authentication records, and 35 is a communication control means for making a communication with the user terminal.

Next, the card 1 generates g pieces of random numbers $R_i$ at the random number generation means 12 (S3), calculates $X_i = R_i^2 \pmod N$ for each at the computation means 13, and transmits $X_i$ to the information provider via the communication control means 24 (S4).

The information provider who received $X_i$ via the communication control means 35 transmits the j-th check bit $e_{ji}$ to the card 1 via the communication control means 35 (S5).

At the card 1, for each bit i of the check bit $e_{ji}$ received via the communication control means 24, $Y_i = R_i$ if it is 0, or $Y_i = sR_i \pmod N$ using the secret information s stored in the secret information storage means 11 if it is 1, is calculated at the computation means 13, and after the check bit $e_{ji}$ is recorded in the storage means 14, $Y_i$ is transmitted to the information provider via the communication control means 24 (S6).

For each bit i, the information provider verifies whether a verification formula $Y_i^2 = X_i \pmod N$ is satisfied if the check bit is 0, or a verification formula $Y_i^2 = X_i I \pmod N$ is satisfied if it is 1, at the verification means 33 from said $X_i$, said $Y_i$ and said check bit $e_{ji}$ received via the communication control means 35 (S7). If this verification fails, the information provider regards the card 1 as illegal and discontinues the operation subsequent to that (S8). If the verification succeeds, a record management of $X_i$, $Y_i$, and check bit $e_{ji}$ is made as the log in the log management means 34 (S9). Then, the steps subsequent to the above described S3 are repeated until it finishes transmitting all of $L_W/g$ sets of the check bits $e_{ji}$ produced at the message division means 32 (S10), and eventually the information provider considers the delivery of the work key W finished at a point when the transmission of all of $L_w/g$ sets of the check bits $e_{ji}$ produced at the message division means 32 has finished (S11).

At the card 1, after the work key W is duplicated by combining all of $L_w/g$ sets of the check bits $e_{ji}$ recorded in the storage means 14 (S12), it is transferred to the operation means 23 of the user terminal 2 (S13). At the operation means 23, the message m can be obtained by deciphering the enciphered message W(m) stored in the storage means 22 by using the transferred work key W (S14).

The above explains how the information provider can certify that the necessary message has surely been delivered to the user and then recorded in the card of the user. For example, when the message m is made to be a charged message such as a writing, W(m) enciphered by the work key W is transmitted to the user in advance, or recorded on a medium such as a CD-ROM and distributed in advance. After the information provider transmits the work key W by the above described delivery method, it is possible for the information provider to utilize the log which is recorded and managed in the log management means 34 at the time of collecting the message fee such as a fee for using the copyright to the user who has definitely purchased the message m. Also, for electronic mail, the mail content m is enciphered by the work key W and W(m) is transmitted to the delivery target in advance, and later on, as the work key W is transmitted by the above described delivery method from the electronic mail manager to the delivery target, the electronic mail manager can utilize it as the delivery proof, and soon, such that various manners of utilization are possible.

As explained above, in this first embodiment, the zero knowledge interactive proof protocol is utilized as the user authentication method by the information provider in the first place, so that in view of the purpose and the conventionally known utilization method of the zero knowledge interactive proof protocol, it is almost impossible to continuously clear the verification by the information provider if the user is not utilizing the authentic card, and it is nearly completely rejected at the authentication stage.

Secondly, at a portion at which the delivery message is delivered from the information provider to the user, the delivery is made by containing the delivery message in the check bits of the zero knowledge interactive proof protocol, so that when the zero knowledge interactive proof protocol finishes normally, the check bits, which are the delivery message, have definitely been received and recorded, and appropriate processing has been performed on the card. If the verification of the information provider failed in the middle, the authentication subsequent to the failure is discontinued, and the remaining check bits are not delivered, so that the delivery message that can be learned by the user is limited to the portion prior to the failure of the verification.

Thirdly, the information provider can certify that the normal authentication has been made between the information provider and the user by making a record management of the log (said $X_i$, said $Y_i$, said check bits $e_{ji}$), so that, in addition to the second effect, it must be such that the user has received the delivery message, and the delivery message is recorded in the storage means 14 of the card. This fact implies that it is possible to judge whether the user is in a state capable of generating the work key W by matching the log disclosed by the information provider and the delivery message recorded on the card submitted from the user. Note that, in this case, when there is no submission of the card from the user, it is judged to be in a state capable of generating the work key W.

Therefore, it is impossible for an illegal user to utilize the system, or to illegally exploit all of the delivery message. Also, against such an improper claim in which the user says the delivery message has not been received despite the fact that the authentication has finished normally, it is possible for the information provider to oppose such a claim by disclosing the log while requesting the user to submit the card.

Note that, even in the above embodiment, there is no necessity for dividing the entire delivery message and generating the check bits $e_{ji}$, and for example, it is possible to consider the message delivery method in which up to the gn-th bits from the top of the delivery message are set as the check bits $e_{ji}$ (j=1, ..., n), and after the zero knowledge interactive proof protocol using n sets of the check bits $e_{ji}$ is finished, the remaining portion of the delivery message is transmitted collectively. In this case, there is a feature that, by changing a value of n variously, the security level in the zero knowledge interactive proof can be changed while an amount of communication can be reduced. For example, when n is set to be a half of $L_w/g$, an amount of communication also becomes nearly a half.

Also, as for the method for generating the check bits $e_{ji}$, apart from generating them by simply dividing the delivery message, it is also possible to generate them by attaching a dummy message, or by enciphering them. In this case, by providing a function for restoring the original delivery message by autonomously removing the dummy message from the secret information set up in advance in the card or the stored check bits $e_{ji}$, or deciphering them, it is possible to make it impossible to take out said delivery message unless the zero knowledge interactive proof is finished normally. Consequently, it is possible to prevent third parties and the user from illegally exploiting the check bits $e_{ji}$, or performing such an illegal act in which the authentication is failed on purpose after a majority of the check bits $e_{ji}$ are received, such that the third party or the user obtains the delivery message despite the information provider having knowledge that the delivery has failed or not noticing that delivery has failed.

Note that, in the message delivery method and system according to the above described first embodiment, all of the information necessary for the zero knowledge interactive proof protocol is implemented on the tamper resistant device, and the actual message delivery is also executed by using only those means implemented on the tamper resistant device, so that said information is not going to be externally accessible. It is impossible even for the card owner to learn the information. Therefore, it is possible to prevent such illegal acts as forging the card itself, or rewriting the recorded information on the card.

Next, the second embodiment of the present invention will be explained.

Figure 5:
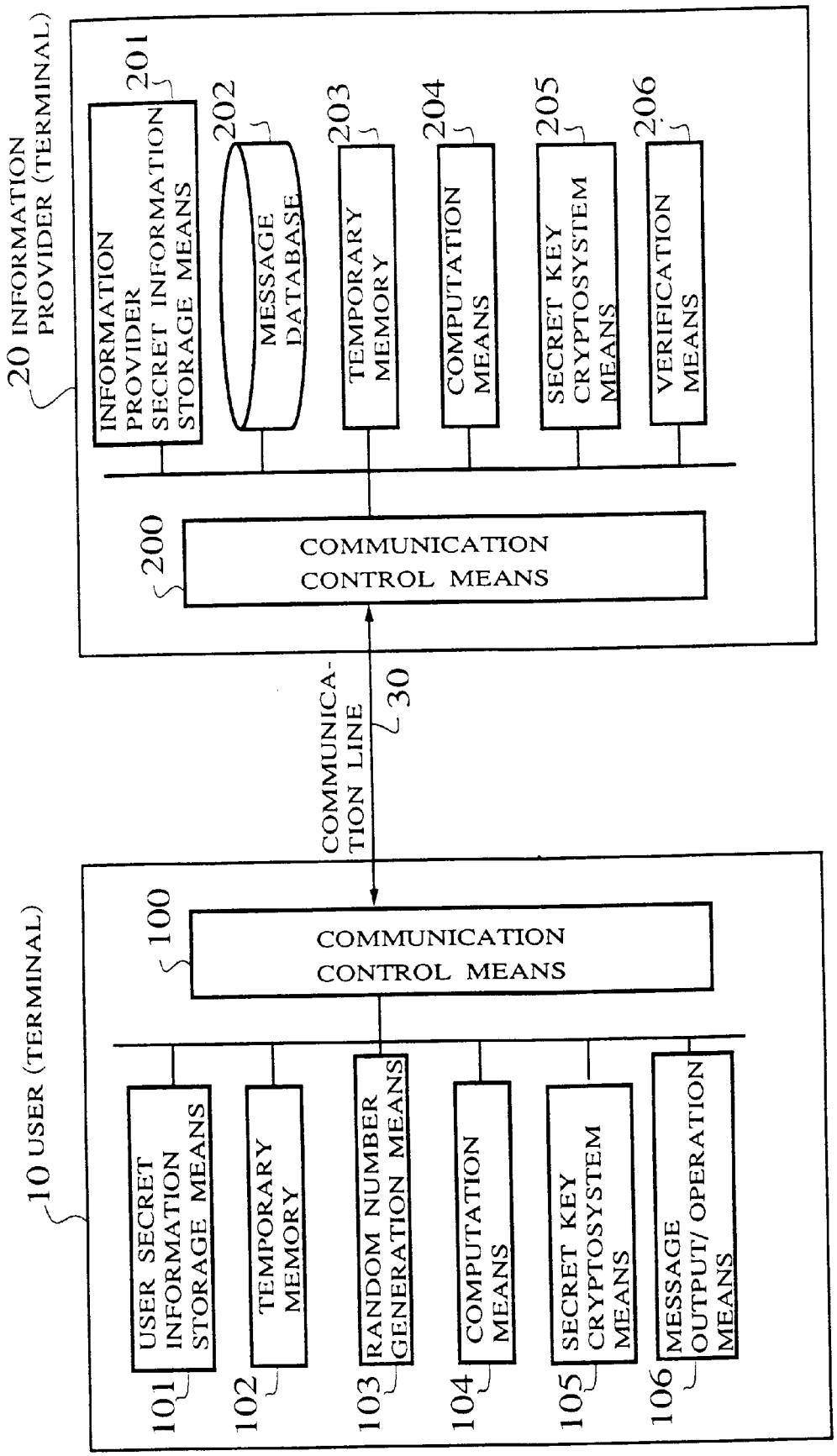
FIG. 5 is a block diagram showing an exemplary configuration of a message delivery system in the second embodiment of the present invention.

FIG. 5 is a block diagram showing a configuration of a message delivery system in the second embodiment of the present invention, in which 10 indicates a terminal (user terminal) of a user who receives messages provided from an information provider terminal 20, where 100 is a communication control means for controlling a communication line 30, 101 is a user secret information storage means for storing secret information of the user, 102 is a temporary memory for the user to temporarily store necessary information, 103 is a random number generation means for the user to generate random numbers, 104 is a computation means having a function for the user to carry out necessary computations, 105 is a secret key cryptosystem means for carrying out a secret communication according to the secret key cryptosystem (DES, FEAL, for example), and 106 is a message output/operation means for the user to output or operate the received message.

Also, 20 indicates a terminal (information provider terminal) of the information provider for providing messages, where 200 is a communication control means for controlling the communication line 30, 201 is an information provider secret information storage means for storing secret information of the information provider, 202 is a message database in which the messages to be provided are stored, 203 is a temporary memory for the information provider to temporarily store necessary information, 204 is a computation means having a function for the information provider to carry out necessary computations, 205 is a secret key cryptosystem means for carrying out the secret communication according to the secret key cryptosystem, and 206 is a verification means for verifying an authenticity of a communication sequence according to the Fiat Shamir scheme. Communication line 30 connects the user and the information provider.

Figure 6:
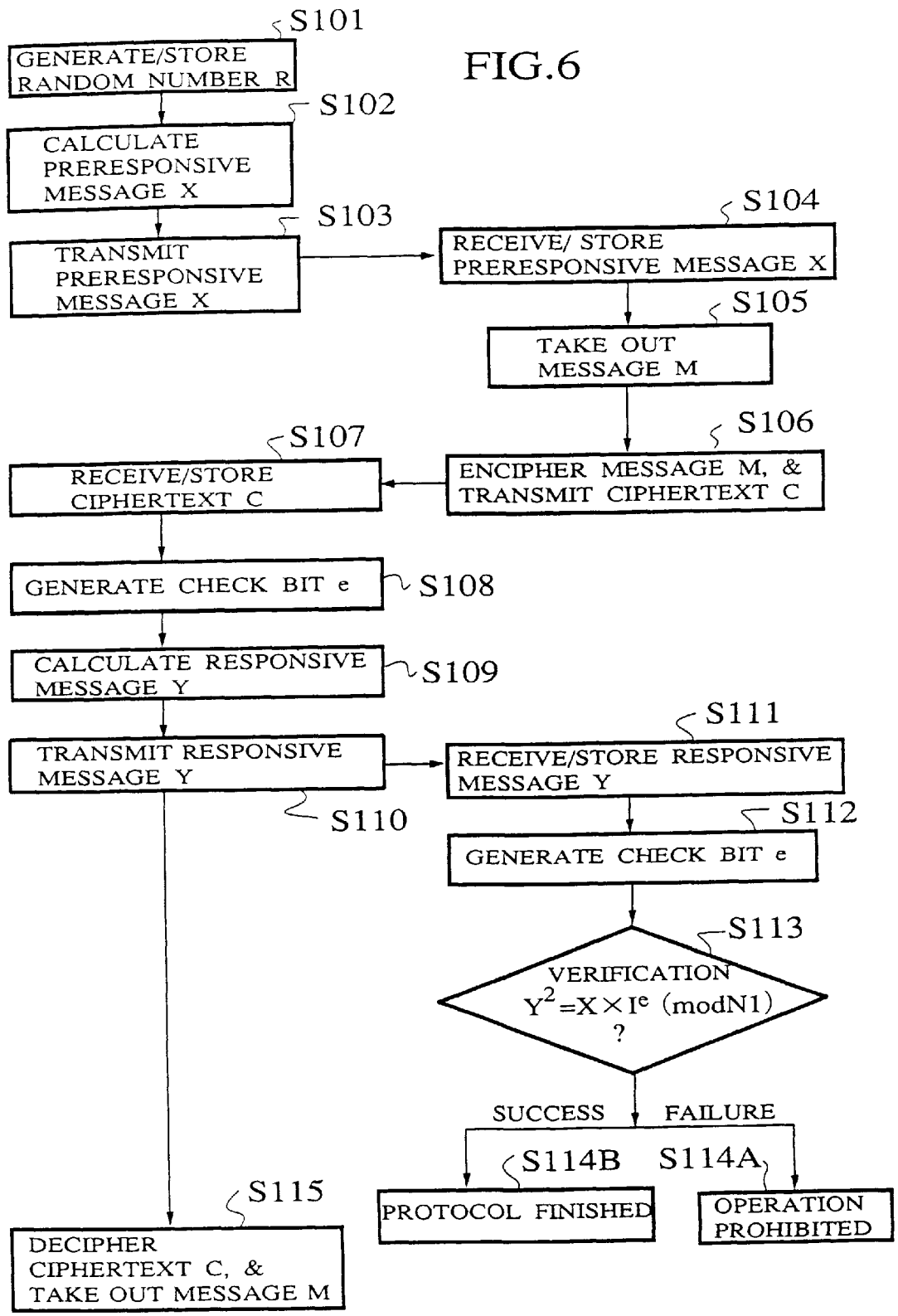
FIG. 6 is a flow chart showing an operation procedure for the message delivery system shown in FIG. 5.

In the following, an operation procedure will be explained according to the flow chart of FIG. 6.

First, as a preparation stage, a reliable center sets up p1, q1, I, and s for each user, discloses N1 and I among them as the public information of the user, and stores s as the secret information of the user in the user secret information storage means 101 and secretly distributes it to the user. Here, p1 and q1 are mutually different large prime numbers, and N1=p1×q1. Also, I=$s^2$ (mod N1) holds.

In addition, a system secret key SK is set up between each information provider and each user, and registered in the user secret information storage means 101 and in the information provider secret information storage means 201 in advance. It is preferable for this system secret key SK to be different for each information provider and each user, but in view of a system design, one type of a secret key of the system as a whole, or a plurality of types of system secret keys among a plurality of users, could also be used.

(1) Delivery certification step

The user terminal 10 generates g pieces of random numbers $R_i$ (i=1, 2, ..., g) by the random number generation means 103, stores them in the temporary memory 102 (S101), calculates a preresponsive message $X_i=R_i^2$ (mod N1) (i=1, 2, ..., g) by the computation means 104 for each random number (S102), and transmits it to the information provider terminal 20 through the communication line 30 (S103).

The information provider terminal 20 stores the received preresponsive message $X_i$ (i=1, 2, ..., g) in the temporary memory 203 (S104), takes out a message M to be delivered to the user terminal 10 from the message database 202 (S105), and transmits a ciphertext C=$E_{SK}$ (M) which is enciphered by the secret key cryptosystem means 205 with the system secret key SK stored in the information provider secret information storage means 201 as a secret key, to the user terminal 10 through the communication line 30 (S106).

The user terminal 10 stores the received ciphertext C in the temporary memory 102 (S107), and after that, generates the check bits $e_i$=h(C) (i=1, 2, ..., g) according to the hash function h which is a g bit data compression function, by using the ciphertext C at the computation means 104 (S108). For each bit i of the generated check bits $e_i$, $Y_i$=R, if $e_i$=0, or $Y_i$=s$R_i$ (mod N1) if $e_i$=1, is calculated from the random number $R_i$ stored in the temporary memory 102 and the user's secret information s stored in the user secret information storage means 101 (S109), and transmitted as a responsive message $Y_i$ (i=1,2, ..., g) to the information provider terminal 20 through the communication line 30 (S110).

The information provider terminal 20 stores the received responsive message $Y_i$ (i=1, 2, ..., g) in the temporary memory 203 (S111), and after that, generates the check bits $e^i$=h(C) (i=1,2, ..., g) according to the hash function which is a g bit data compression function, by using the ciphertext C at the computation means 204 (S112). At the verification means 206, whether a verification formula $Y_i^2$=$X_i$ (mod N1) if $e_i$=0, or a verification formula $Y_i^2$=$X_i$×I (mod n1) if $e_i$=1, is satisfied determined for each bit i, from the public information I of the user, the preresponsive message $X_i$, the responsive message $Y_i$, and the check bits $e_i$ stored in the temporary memory 203 (S113). In case this verification has failed, it regards the user as illegal, and the operation subsequent to that is prohibited (S114A). When the verification succeeds, the delivery of the message M is considered to have finished normally (S114B).

(2) Message take out step

The user terminal 10 deciphers the ciphertext C stored in the temporary memory 102 into the message M–$D_{SK}$ (C) by the secret key cryptosystem means 105 with the system secret key SK stored in the user secret information storage means 101 as the secret key, and outputs the message M from the message output/operation means 106 (S115).

That the delivery certification step has finished normally by using the above described message delivery method implies that the user authentication according to the zero knowledge interactive proof protocol has been carried out normally. Moreover, it becomes definitive proof that the check bits ei (i=1, 2, ..., g) have been generated correctly. Also, the check bits ei (i=1, 2, ..., g) are generated from the ciphertext C received by the user terminal 10 by using the hash function which is a data compression function, so that the correct check bits ei (i=1, 2, ..., g) cannot be generated unless the correct ciphertext C is received. Consequently, the fact that the user can generate the check bits ei (i=1, 2, ..., g) correctly and the fact that the user has received the ciphertext C (and the message M) normally become equivalent. As is apparent from the above explanation, the information provider can certify the fact that the message has been delivered to the user accurately and surely.

Here, the enciphering/deciphering is carried out by utilizing the secret key cryptosystem in the above explanation, but the public key cryptosystem could be instead. Also, it has been explained according to the Fiat Shamir scheme, but the present method is applicable to all the zero knowledge interactive proof protocols which base their safety on a difficulty of the factoring or a difficulty of the discrete logarithm problem and the like, including the Extended Fiat Shamir scheme (Ohta, Okamoto, "An Extension of the Fiat-Shamir Scheme Based on Higher Degree Roots", the Electronic Information Communication Society, Technical Research Report ISEC88-13).

Next, the third embodiment of the present invention will be explained.

Figure 7:
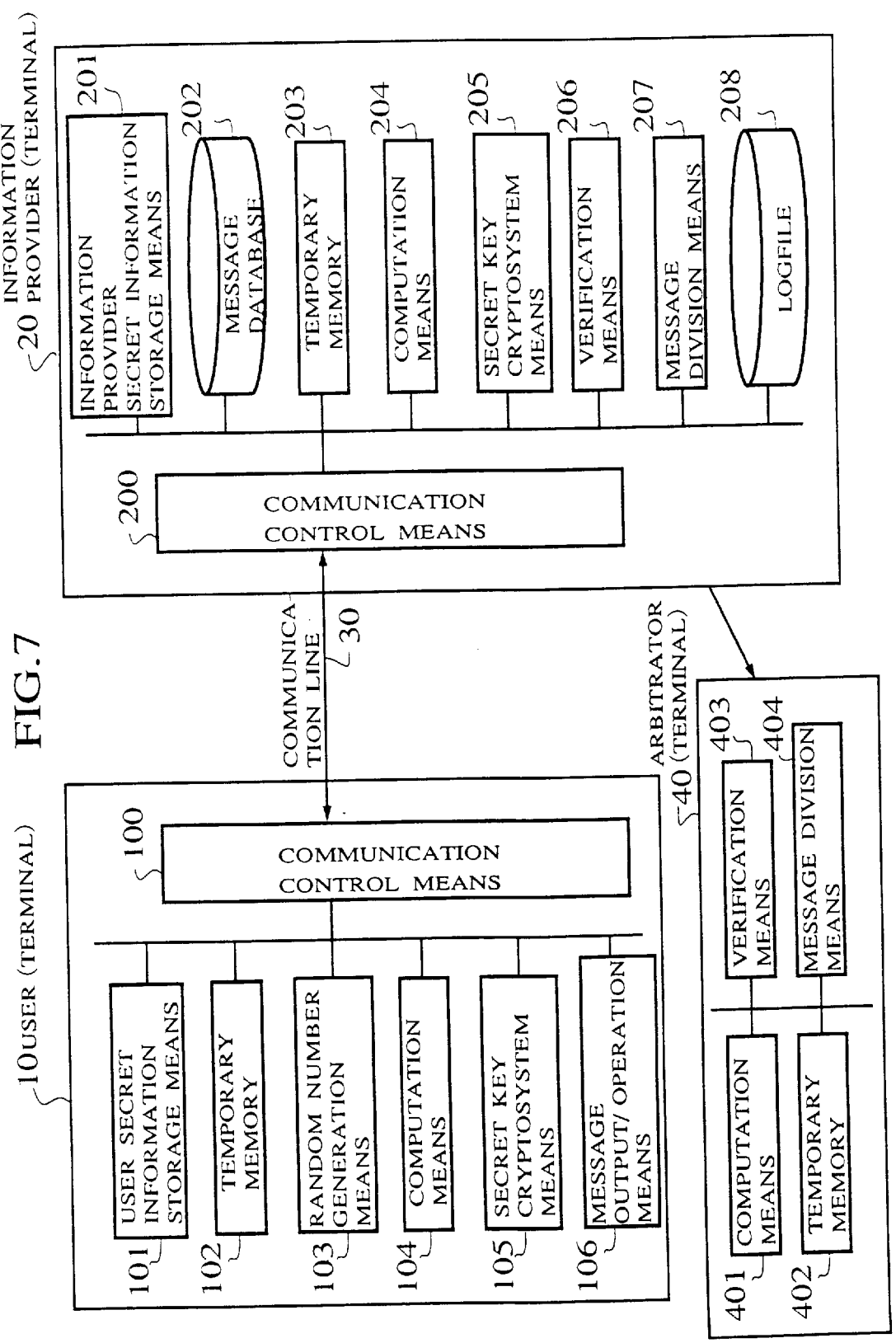
FIG. 7 is a block diagram showing an exemplary configuration of a message delivery system in the third embodiment of the present invention.

FIG. 7 is a block diagram showing a configuration of the message delivery system in the third embodiment of the present invention, in which 10 indicates a terminal (user terminal) of a user who receives messages provided from an information provider terminal 20, where the constituent means are similar to the second embodiment shown in FIG. 5. FIG. 5 shows an (information provider terminal 20) of an information provider for providing the messages, where the constituent means from 200 to 206 are similar to the second embodiment, while 207 is a message division means for dividing the message into a plurality of blocks in arbitrary bit lengths and storing them, and 208 is a logfile for making a record management of a log as an evidence for proving later on the fact that the message has been delivered to the user. As in the second embodiment, 30 indicates a communication line. An (arbitrator terminal 40) of an arbitrator is shown for judging later on an authenticity of a log from a neutral standpoint, for the log which is recorded and managed by the information provider in the logfile 208, where 401 is a computation means having a function for the arbitrator to carry out necessary computations, 402 is a temporary memory for the arbitrator to temporarily store a necessary information, 403 is a verification means for verifying an authenticity for the log about which the judgement of the authenticity is requested, and 404 is a message division means for dividing the message into a plurality of blocks in arbitrary bit lengths and storing them.

Figure 8:
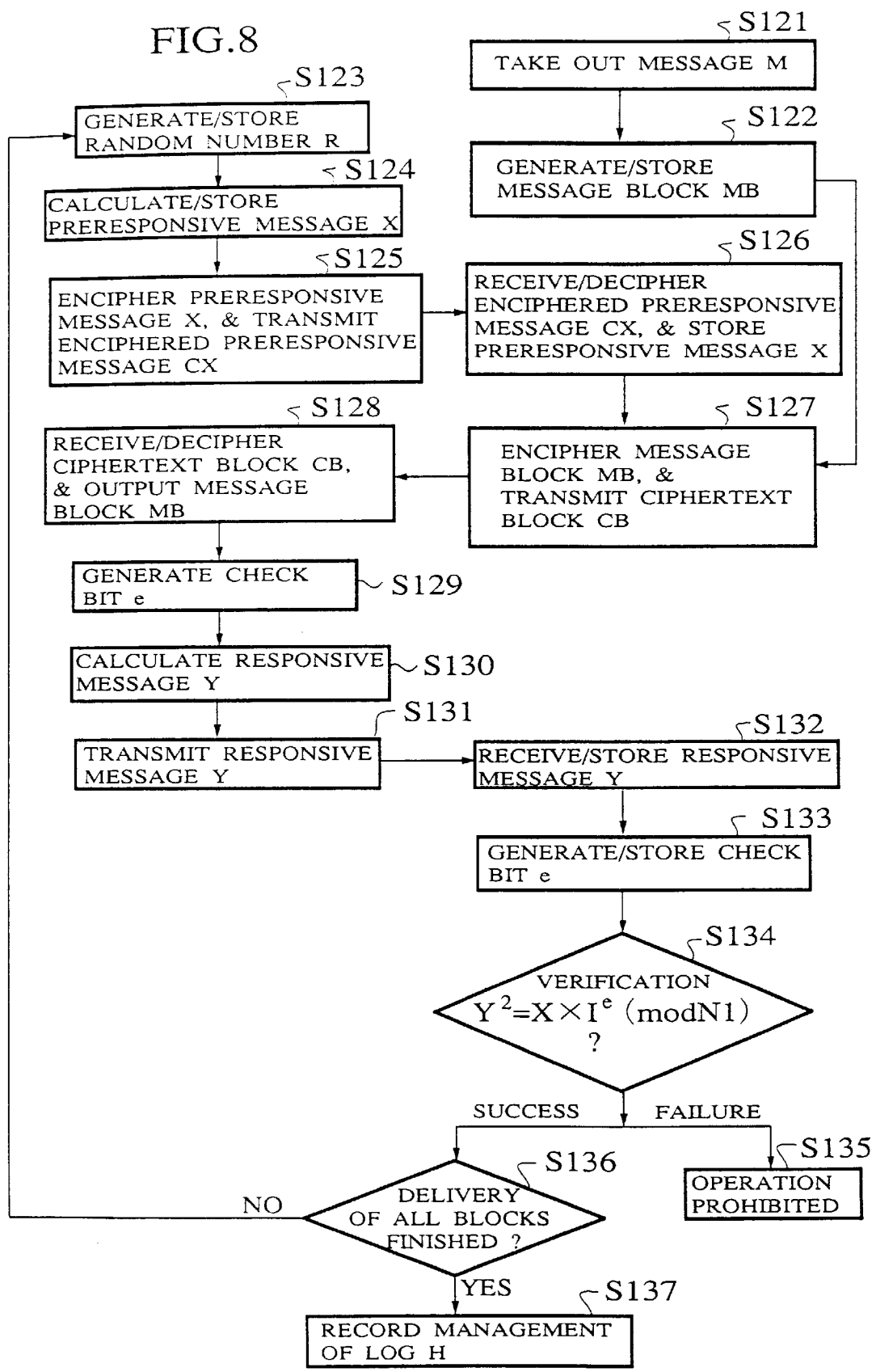
FIG. 8 is a flow chart showing an operation procedure concerning a delivery certification for the message delivery system shown in FIG. 7.
Figure 9:
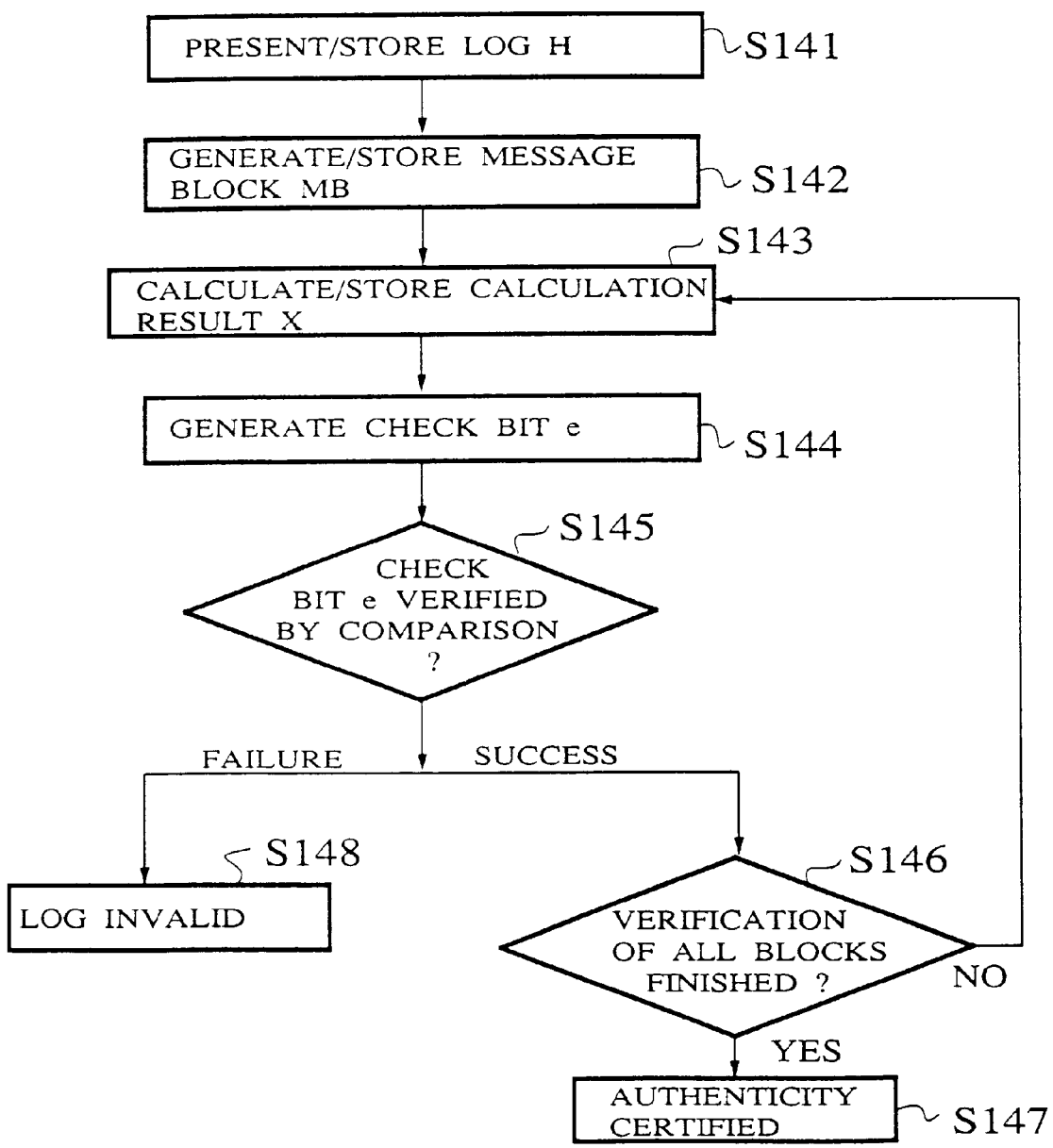
FIG. 9 is a flow chart showing an operation procedure concerning an arbitration for the message delivery system shown in FIG. 7.

In the following, the operation procedure for the delivery certification step will be explained according to the flow chart of FIG. 8, and the operation procedure for the arbitration will be explained according to the flow chart of FIG. 9. Here, the preparation stage is similar to the second embodiment described above.

(1) Delivery certification step

The information provider terminal 20 takes the message M to be delivered to the user terminal 10 from the message database 202 (S121), divides the message M into a plurality of blocks in sizes of arbitrary bit lengths, and stores them as the message blocks MBj (j=1, 2, . . . , m) at the message division means 207 (S122). Here, for the sake of the simplicity of the explanation, a number of divided blocks is set to be m, and a bit length is set to be constant g for all the blocks.

The processing from here on is for the j-th block, and the following processing is repeatedly carried out sequentially (m times) for each block from the first block to the m-th block.

The user terminal 10 generates g pieces of random numbers $R_{ij}$ (i=1, 2, . . . , g) by the random number generation means 103, stores them in the temporary memory 102 (S123), and calculates a preresponsive message $X_{ij}=R_{ij}^2$ (mod N1) (i=1, 2, . . . , g) by the computation means 104 for each random number, stores it in the temporary memory 102 (S124). After that, an enciphered preresponsive message $CX_{ij}=E_{SK}(X_{ij})$ (i=1, 2, . . . , g) which is enciphered by the secret key cryptosystem means 105 with the system secret key SK stored in the user secret information storage means 101 as the secret key, is transmitted to the information provider terminal 20 through the communication line 30 (S125).

The information provider terminal 20 deciphers the received enciphered preresponsive message $CX_{ij}$ (i=1, 2, . . . , g) into the preresponsive message $X_{ij}=D_{SK}(CX_{ij})$ (i=1, 2, . . . , g) by the secret key cryptosystem means 205 with the system secret key SK stored in the information provider secret information storage means 201 as the secret key, and stores it in the temporary memory 203 (S126). After that, a ciphertext block $CB_j=E_{SK}(MB_j)$, in which the message block $MB_j$ stored in the message division means 207 is enciphered by the secret key cryptosystem means 205 with the system secret key SK stored in the information provider secret information storage means 201 as the secret key, is transmitted to the user terminal 10 through the communication line 30 (S127).

The user terminal 10 deciphers the received ciphertext block $CB_j$ into the message block $MB_j=D_{SK}(CB_j)$ (i=1, 2, . . . , g) by the secret key cryptosystem means 105 with the system secret key SK stored in the user secret information storage means 101 as the secret key, and outputs the message block $MB_j$ from the message output/operation means 106 (S128).

In addition, to outputting the message block $MB_j$, the check bits $e_{ij}=h(MB_j\|X_{1j}\|X_{2j}\|...\|X_{gj})$ (i=1, 2, . . . , g) are generated according to the one-way random hash function h, by using the message block $MB_j$ and the preresponsive message $X_{ij}$ (i=1, 2, . . . , g) stored in the temporary memory 102 at the computation means 104 (S129), and for each bit i of the generated check bits $e_{ij}$, $Y_{ij}=R_{ij}$ if $e_{ij}=0$, or $Y_{ij}=sR_{ij}$ (mod N1) if $e_{ij}=1$, is calculated from the random number $R_{ij}$ stored in the temporary memory 102 and the user's secret information s stored in the user secret information storage means 101 (S130), and transmitted as a responsive message $Y_{ij}$ (i=1, 2, . . . , g) to the information provider terminal 20 through the communication line 30 (S131).

The information provider terminal 20 stores the received responsive message $Y_{ij}$ (i=1, 2, . . . , g) in the temporary memory 203 (S132), and after that, generates the check bits $e_{ij}=h(MB_j\|X_{1j}\|X_{2j}\|...X_{gj})$ (i=1, 2, . . . , g) according to the one-way random hash function h, by using the preresponsive message $X_{ij}$ (i=1, 2, . . . , g) stored in the temporary memory 203 and the message block MBj stored in the message division means 207 at the computation means 204, and stores them in the temporary memory 203 (S133).

Then, at the verification means 206, whether a verification formula $Y_{ij}^2=X_{ij}$ (mod N1) if $e_{ij}=0$, or a verification formula $Y_{ij}^2=X_{ij} \times I$ (mod N1) if $e_{ij}=1$, is satisfied or not is verified for each bit i, from the public information I of the user, and the preresponsive message $X_{ij}$, the responsive message $Y_{ij}$, and the check bits $e_{ij}$ stored in the temporary memory 203 (S134). If this verification has failed, the user is regarded as illegal, and the execution of the protocol is immediately discontinued (S135). If the verification has succeeded, the above processing is repeated until all the blocks are finished (S136). If the verification has succeeded for all the blocks from the first block to the m-th block, the message M, the check bits eij, and the responsive message $Y_{ij}$ (i=1, 2, . . . , g: j=1, 2, . . . , m) are recorded and managed in the logfile 208 as the log H (S137).

(2) Arbitration

If the user claims later on that the message M has not been received, the information provider terminal 20 presents the log H recorded and managed in the logfile 208, and stores it in the temporary memory 402 of the arbitrator terminal 40 (S141).

The arbitrator terminal 40 divides the message M into a plurality of message blocks $MB_j$ (j=1, 2, . . . , m) and stores them, for the message M in the log stored in the temporary memory 402, at the message division means 404 (S142).

For each block (j-th block), $X_{ij}=Y_{ij}^2$ (mod N1) if $e_{ij}=0$, or $X_{ij}=Y_{ij}^2/I$ (mod N1) if $e_{ij}=1$, is calculated at the computation means 401 for each bit i, from the public information I of the user terminal 10, and the check bits $e_{ij}$ and the responsive message $Y_{ij}$ in the log H stored in the temporary memory 402, and the calculation result $X_{ij}$ (i=1, 2, ..., g) is stored in the temporary memory 402 (S143).

Next, the check bits $e_{ij}$=h(MB$_j$‖X$_{1j}$‖X$_{2j}$‖–‖X$_g$) (i=1, 2, ..., g) are generated according to the one-way random hash function h of the computation means 401, from the message block MB$_j$ stored in the message division means 404 and the calculation result $X_{ij}$ (i=1, 2, ..., g) stored in the temporary memory 402 (S144).

After that, at the verification means 403, whether the generated check bits coincide with the check bits $e_{ij}$ (i=1, 2, ..., g) in the log H stored in the temporary memory 402 is checked (S145). When they coincide for all the blocks (m blocks from the first block to the m-th block) (S146), it implies that the authenticity of the log H is guaranteed (S147), and otherwise the log H becomes invalid (S148).

That the delivery certification step has finished normally by using the above described message delivery method implies that the user authentication according to the zero knowledge interactive proof protocol has been carried out normally. In addition, it becomes definitive proof that the check bits $e_{ij}$ (i=1, 2, ..., g: j=1, 2, ..., m) have been generated correctly. Also, the check bits $e_{ij}$ (i=1, 2, ..., g: j=1, 2, ..., m) are generated from the message blocks MB$_j$ (j=1, 2, ..., m) received by the user and the preresponsive message $X_{ij}$ (i=1, 2, ..., g: j=1, 2, ..., m) generated by the user by using the one-way random hash function h, so that the correct check bits $e_{ij}$ (i=1, 2, ..., g: j=1, 2, ..., m) cannot be generated unless the correct message blocks MB$_j$ (j=1, 2, ..., m) are received. Consequently, the fact that the user can generate check bits $e_{ij}$ (i=1, 2, ..., g: j=1, 2, ..., m) correctly and the fact that the user has received the message blocks MB$_j$ (j=1, 2, ..., m) normally become equivalent. Therefore, the information provider can certify the fact that the message has been delivered to the user accurately and surely.

Here, an example in which the enciphering/deciphering is carried out by utilizing the secret key cryptosystem has been explained in the above explanation, but the public key cryptosystem could be used instead. Also, it has been explained according to the Fiat Shamir scheme, but the present method can deal with any of the zero knowledge interactive proof protocols which base their safety on a difficulty of the factoring or a difficulty of the discrete logarithmic problem and the like including the Extended Fiat Shamir scheme (Ohta, Okamoto, "An extension of the Fiat-Shamir Scheme Based on Higher Degree Roots", the Electronic Information Communication Society, Technical Research Report ISEC88-13).

Next, in relation to the log H comprising the check bits $e_{ij}$, the responsive message $Y_{ij}$ (i=1, 2, ..., g: j=1, 2, ..., m), and the message M, they are mutually related by the verification formula in the zero knowledge interactive proof protocol and the one-way random hash function, so that it is impossible to forge the log H by illegally altering a portion of it. Therefore, by making a record management of the log H, it can be presented to a neutral third party, such as the arbitrator, later on as evidence that the user has surely received the message M.

In addition, the communication between the information provider terminal and the user terminal is repeatedly carried out as many times as a number m of divided blocks of the message M, so that if the verification of the information provider failed in the middle, the communication subsequent to that is discontinued, and the remaining message blocks are not transmitted. Namely, the message blocks that can be learned by the user are limited only to those prior to the failure of the verification, so that it becomes impossible for the user who caused the failure of the verification of the information provider to receive the entire message M correctly as a result. Consequently, an illegal user who does not know the secret information s of the user is prevented from transmitting an illegal responsive message $Y_{ij}$ (i=1, 2, ..., g). Further, an illegal act such as not transmitting the responsive message itself whereby the user illegally obtains the entire message and despite the information provider being unable to make a record management of the log H for proving the fact that the information provider has delivered the message and to the user is also prevented.

Also, in the above explanation, the bit length of the divided blocks has been set to be constant g for each block, but the bit length size could be changed block by block, for instance 1 bit for the first block, 2 bits for the second blocks, 4 bits for the third blocks, etc.

The description above explains a system that can provide definitive evidence that the information provider has delivered the message M of a large capacity to the user accurately and surely. Various manners of utilization are possible. For example, when the message M is a paid-for message in the "on demand service" for writings, etc., as the information provider delivers the message M to the user according to the above described message delivery method, the log H recorded and managed by the information provider can be utilized as proof at the time of collecting the message fee such as a fee for using the copyright, and so on.

Next, the fourth embodiment of the present invention will be explained.

Figure 10:
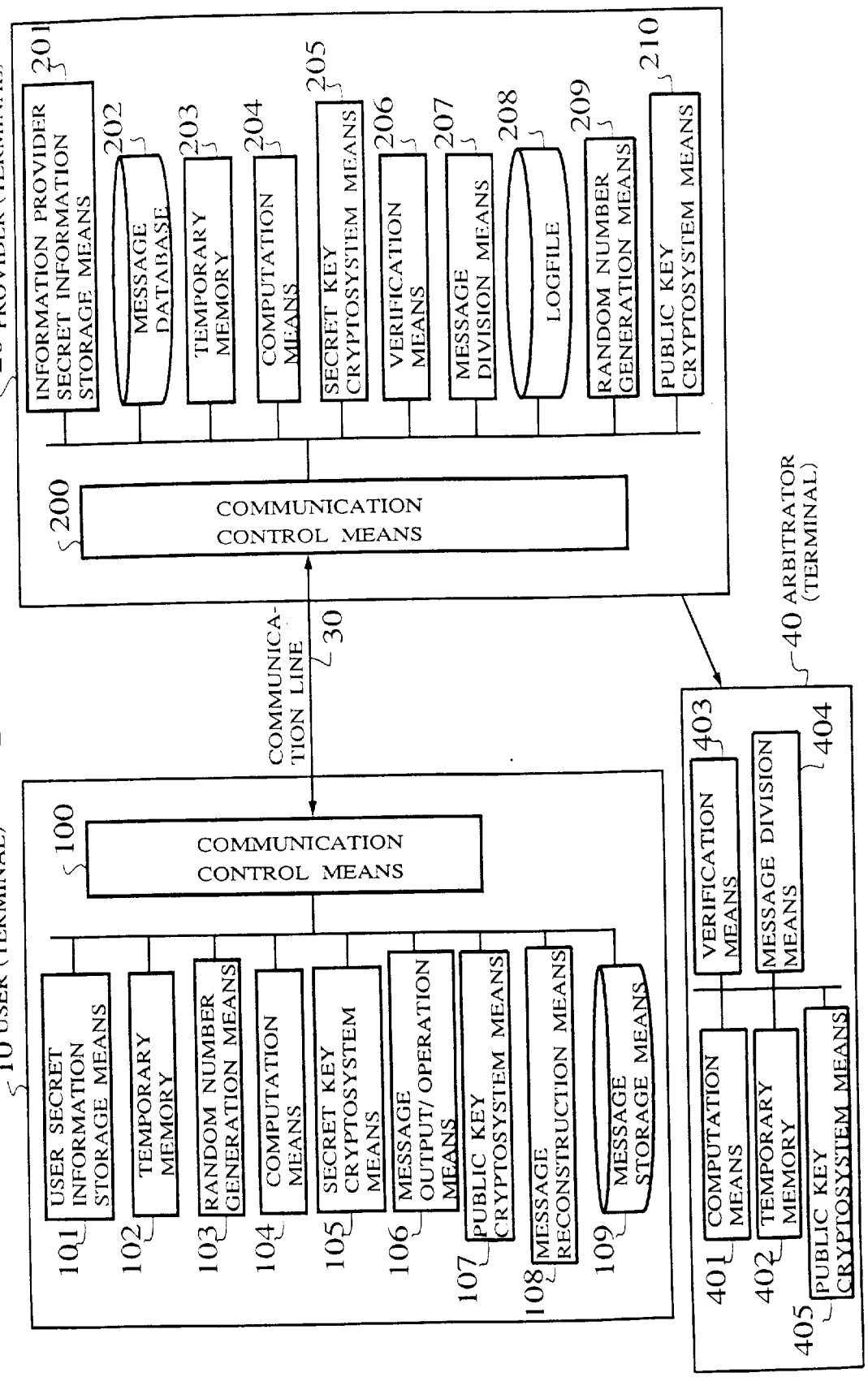
FIG. 10 is a block diagram showing an exemplary configuration of a message delivery system in the fourth embodiment of the present invention.

FIG. 10 is a block diagram showing a configuration of the message delivery system in the fourth embodiment of the present invention, in which 10 indicates a terminal (user terminal) of a user who receives messages provided from an information provider terminal 20, where the configurations from 100 to 106 are similar to the second embodiment, while 107 is a public key cryptosystem means for carrying out the secret communication according to the public key cryptosystem (RSA, ElGamal, for example), 108 is a message reconstruction means for reconstructing the divided block messages into an original message, and 109 is a message storage means for storing the message received from the information provider. An (information provider terminal 20) of an information provider is shown for providing the messages, where the configurations from 200 to 208 are similar to the third embodiment, while 209 is a random number generation means for the information provider to generate random numbers, and 210 is a public key cryptosystem means for carrying out the secret communication according to the public key cryptosystem as in the second embodiment 30 indicates a communication line. An arbitrator terminal 40 is shown, in which configurations from 401 to 404 are similar to the third embodiment, while 405 is a public key cryptosystem means for carrying out the encryption according to the public key cryptosystem.

Figure 11:
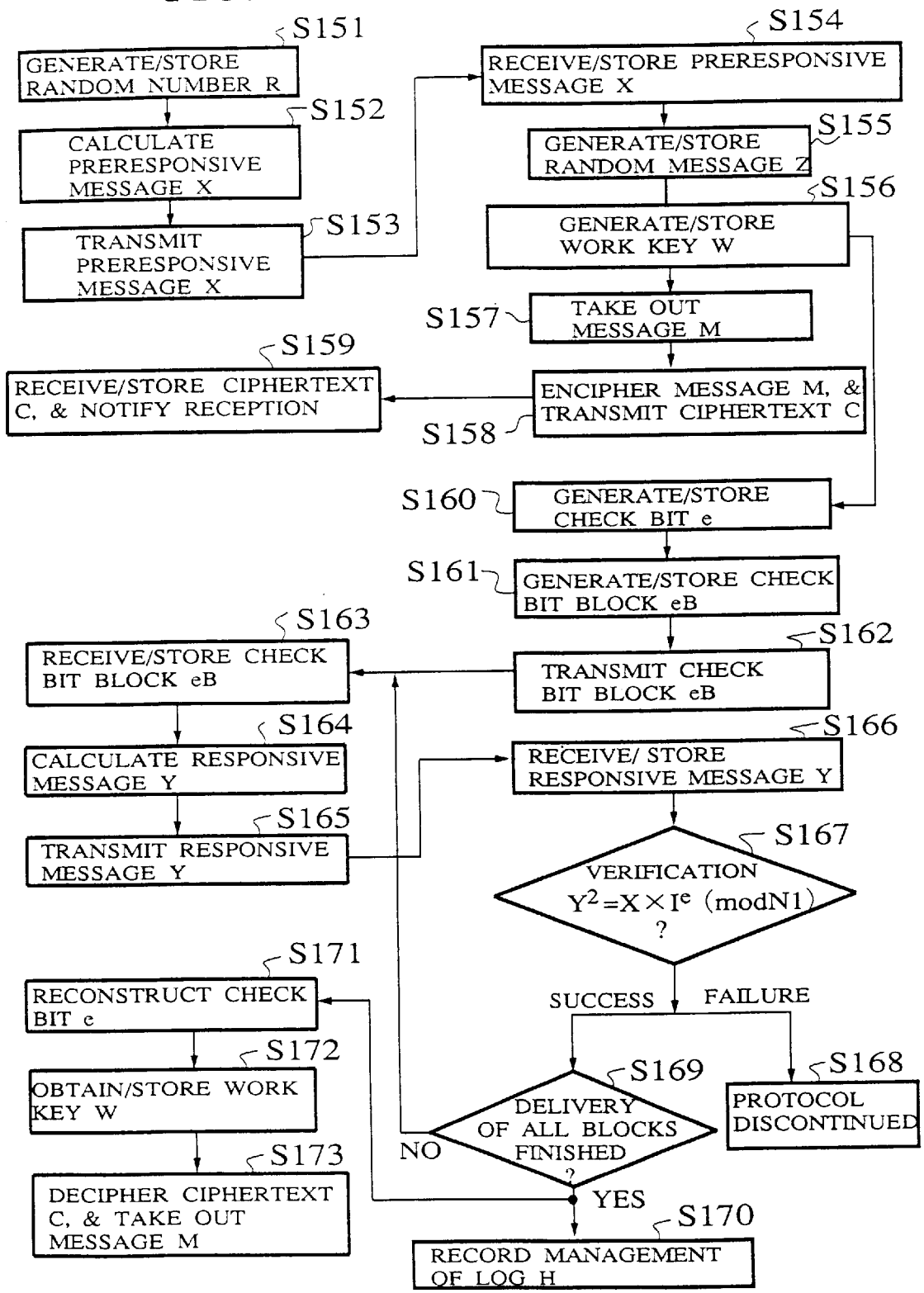
FIG. 11 is a flow chart showing an operation procedure concerning a delivery certification and a message take out for the message delivery system shown in FIG. 10.
Figure 12:
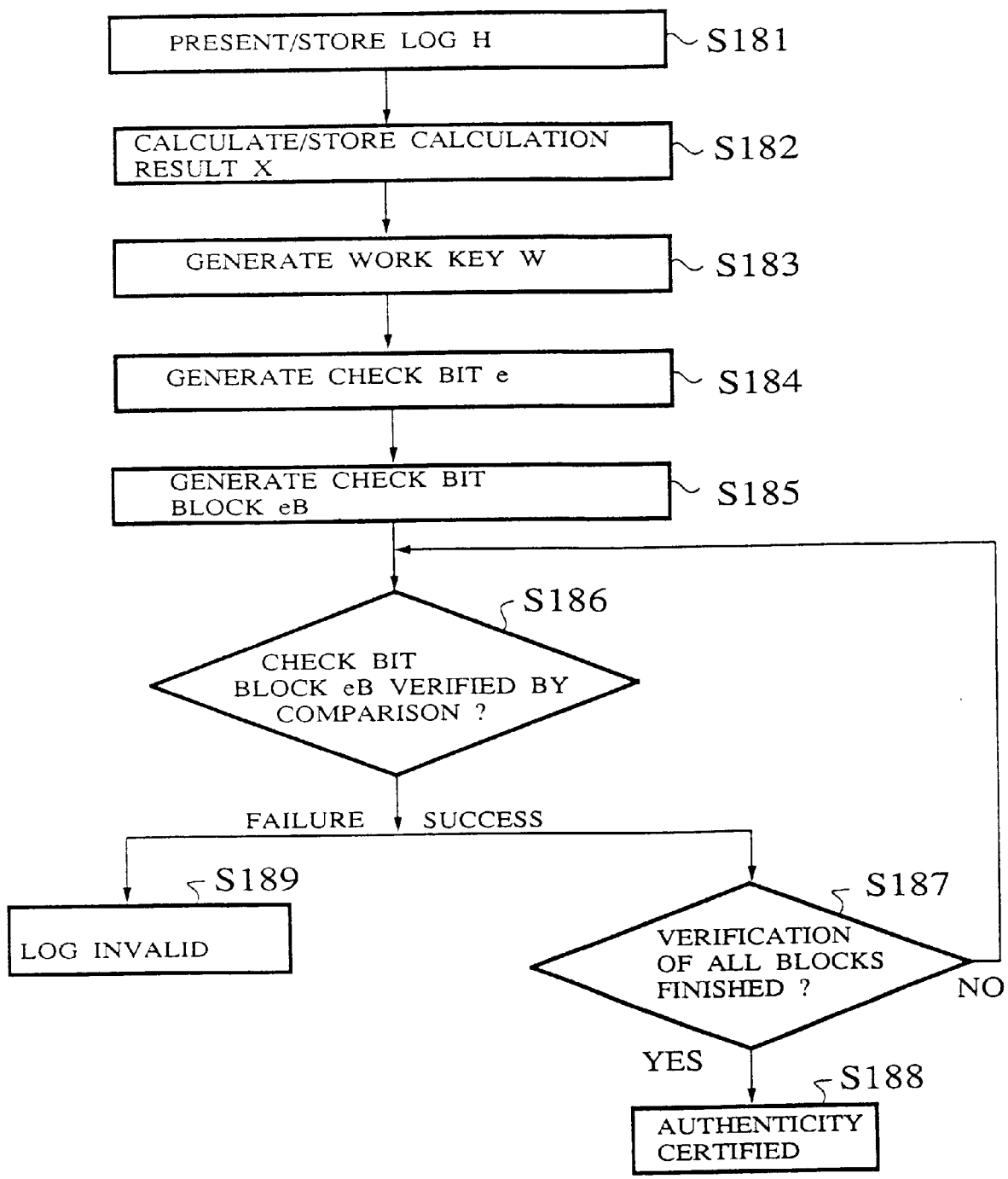
FIG. 12 is a flow chart showing an operation procedure concerning an arbitration for the message delivery system shown in FIG. 10.

In the following, the operation procedure for the delivery certification step and the message take out step will be explained according to the flow chart of FIG. 11, and the operation procedure for the arbitration will be explained according to the flow chart of FIG. 12.

First as a preparation stage, a reliable center sets up p1, q1, I, s, p2, q2, PU, and SU for each user, discloses N1, N2, I, and PU among them as the public information (public key)

of the user, and stores s and SU as the secret information (secret key) of the user in the user secret information storage means 101 and secretly distributes it to the user. Here, each set of (p1, q1) and (p2, q2) is a set of mutually different large prime numbers, and N1=p1×q1, N2=p2×q2. Also, I=$s^2$ (mod N1), PU×SU=1 (mod (p2-1)(q2-1)) hold. Note that it may be q1=p2, q1=q2.

(1) Delivery certification step

The user terminal 10 generates g×m random numbers $R_{jk}$ (j=1, 2, . . . , g: k=1, 2, . . . , m) by the random number generation means 103, and then stores them in the temporary memory 102 (S151). For each random number, a preresponsive message $X_{jk}=R_{jk}^2$ (mod N1) (j=1, 2, . . . , g: k=1, 2, . . . , m) is calculated by the computation means 104 (S152), and transmitted to the information provider through the communication line 30 (S153).

The information provider terminal 20 stores the received preresponsive message $X_{jk}$ (j=1, 2, . . . , g: k=1, 2, . . . , m) in the temporary memory 203 (S154), and generates the random message X randomly by the random number generation means 209 and stores it in the temporary memory 203 (S155).

Next, the work keys $W_j=h(Z\|X_{11}\|X_{21}\|-\|X_{gm})$ (j=1, 2, . . . , g) in g bits size are generated according to the one-way random hash function h of the computation means 204, from the preresponsive message $X_{jk}$ (j=1, 2, . . . , g: k=1, 2, . . . , m) and the random message Z, and stored in the temporary memory 203 (S156). Here, in general, a value of g is greater than or equal to a key length of the secret key used in the secret key cryptosystem means 105 and the secret key cryptosystem means 205. After that, the message M to be delivered is taken out from the message database 202 (S157), and after it is enciphered into the ciphertext C=$E_w$ (M) by the secret key cryptosystem means 205 with the work key $W_j$ (j=1, 2, . . . , g) as the secret key, the ciphertext C is transmitted to the user terminal 10 through the communication line 30 (S158).

After the ciphertext C is received/stored in the message storage means 109, the user terminal 10 notifies the fact of receiving to the information provider terminal 20 through the communication line 30 (S159).

The information provider terminal 20 generates the check bits $e_i=h(W_1\|W_2\|...\|W_g)^{PU}$ (mod N2) (i=1, 2, . . . , L) by enciphering the work keys $W_j$ (j=1, 2, . . . , g) stored in the temporary memory 203 by using the public information PU of the user by the public key cryptosystem means 210 (S160). Here, L is equal to a bit length of N2.

Next, the check bits $e_i$ (i=1, 2, . . . , L) is divided into a plurality of blocks at the message division means 207, and stored as the check bit blocks (S161). Here, for the sake of simplifying the explanation, a number of divided blocks is set to be m, a bit length is set to be constant g for all the blocks, and the divided check bits are expressed as the check bit blocks $eB_{jk}$ (j=1, 2, . . . , g: k=1, 2, . . . , m). Namely, $eB_{jk}=e(j+g\,(k-1))$, and it is going to be $eB_{11}=e_1$, $eB_{g1}=e_g$, $eB_{12}=e_{g+1}$, and $eB_{Lm}=e_L$, for example.

The processing from here on is for the k-th block, and the following processing is repeatedly carried out sequentially (m times) for each block from the first block to the m-th block.

The information provider terminal 20 transmits the check bit blocks $e_{Bjk}$ (j=1, 2, . . . , g) stored in the message division means 207 to the user terminal 10 through the communication line 30 (S162).

The user terminal 10 stores the received check bit blocks $e_{Bjk}$ (j=1, 2, . . . , g) in the temporary memory 102 (S163), and after that, for each bit j of the received check bit blocks $eB_{jk}$, $Y_{jk}=R_{jk}$ if $eB_{jk}=0$, or $Y_{jk}=sR_{jk}$ (mod N1) if $eB_{jk}=1$, is calculated at the computation means 104 from the random number $R_{jk}$ stored in the temporary memory 102 and the user's secret information is stored in the user secret information means 101 (S164), and transmitted as a responsive message $Y_{jk}$ (j=1, 2, . . . , g) to the information provider terminal 20 through the communication line 30 (S165).

The information provider terminal 20 stores the received responsive message $Y_{jk}$ (j=1, 2, . . . , g) in the temporary memory 203 (S166), and after that, at the verification means 206, whether a verification formula $Y_{jk}^2=X_{jk}$ (mod N1) if $e_{jk}=0$, or a verification formula $Y_{jk}^2=X_{jk}\times I$ (mod N1) if $e_{jk}=1$, is satisfied is determined for each bit i, from the public information I of the user, and the preresponsive message $X_{jk}$, the responsive message $Y_{jk}$, and the check bits $e_{jk}$ stored in the temporary memory 203 (S167). If this verification fails the user is regarded as illegal, and the execution of the protocol is immediately discontinued (S168). If the verification succeeds, the above processing is repeated until all the blocks are finished (S169). Then, when the verification has succeeded for all the blocks from the first block to the m-th block, the random message Z, the check bits $e_{jk}$, and the responsive message $Y_{jk}$ (i=1, 2, . . . , g: j=1, 2, . . . , m) are recorded and managed in the logfile 208 as the log H (S170).

(2) Message take out step

The user terminal 10 reconstructs the check bits $e_i$ (i=1, 2, . . . , L) at the message reconstruction means 108, from the check bit blocks $eB_{jk}$ (j=1, 2, . . . , g: k=1, 2, . . . , m) stored in the temporary memory 102 (S171), and after the work key $W_j=(e_1\|e_2\|...\|e_L)^{SU}$ (mod N2) (j=1, 2, . . . , g) is obtained by deciphering them at the public key cryptosystem means 107 by using the secret information SU of the user stored in the user secret information storage means 101, they are stored in the message storage means 109 (S172).

Finally, by deciphering the ciphertext C stored in the message storage means 109 by the secret key cryptosystem means 105 with the work key $W_j$ (j=1, 2, . . . , g) stored in the message storage means 109 as the secret key, the message M=$D_w$ (C) can be obtained from the message output/operation means 106 (S173).

(3) Arbitration

If the user claims later on that the message M has not been received, the information provider terminal 20 can present the log H recorded and managed in the logfile 208, and can store it in the temporary memory 402 of the arbitrator terminal 40 (S181).

For each block (k-th block), the arbitrator terminal 40 calculates $X_{jk}=Y_{jk}^2$ (mod N1) if $e_{jk}=0$, or $X_{jk}=Y_{jk}^2/I$ (mod N1) if $e_{jk}=1$, at the computation means 401 for each bit i, from the check bits $e_{jk}$ and the responsive message $Y_{jk}$ in the log H stored in the temporary memory 402, and stores the calculation result $X_{jk}$ (j=1, 2, . . . , g) in the temporary memory 402 (S182).

Next, the work keys $W_j=h(z\|X_{11}\|X_{21}\|...\|X_{gm})$ (j=1, 2, . . . , g) of g bits size are generated according to the one-way random hash function h of the computation means 401, by using the calculation result $X_{jk}$ (j=1, 2, . . . , g) and the random message Z stored in the temporary memory 402 (S183), and the check bits $e_i=h(W_1\|W_2\|...\|W_g)^{PU}$ (mod N2) (i=1, 2, . . . , L) are generated by enciphering them at the public key cryptosystem means 405 by using the public information PU of the user (S184).

After that, at the message division means 404, the check bits $e_i$ (i=1, 2, . . . , L) is divided into a plurality of blocks, and the check bit blocks $eB_{jk}$ (j=1, 2, ..., g: k=1, 2, ..., m) are generated (S185), and finally, for each block (k-th block), at the verification means 403, whether they coincide with the check bits $e_{jk}$ (j=1, 2, ..., g) in the log H stored in the temporary memory 402 is checked (S186). When they coincide for all the blocks (m blocks from the first block to the m-th block) (S187), it implies that the authenticity of the log H is proven and the fact that the user has received the message M is guaranteed (S188). Otherwise, the log H is considered invalid (S189).

By using the above described message delivery method, the message M itself is transmitted to the user by being enciphered into the ciphertext C first, so that at a point at which the user received the ciphertext C, the message M is not going to be obtained. Then, if the zero knowledge interactive proof protocol finishes normally, it implies that the user authentication according to the zero knowledge interactive proof protocol has been made normally. In addition, it becomes definitive proof that the user has correctly received the check bits $e_{jk}$ (j=1, 2, ..., g: k=1, 2, ..., m).

Also, the work key $W_j$ (j=1, 2, ..., g) is generated as the user deciphers the check bits $e_{jk}$ (j=1, 2, ..., g: k=1, 2, ..., m), and the message M can be obtained by deciphering the ciphertext C by using the generated work key $W_j$ (j=1, 2, ..., g). Consequently, that the user has received the check bits $e_{jk}$ (j=1, 2, ..., g: k=1, 2, ..., m) correctly and that the user has received the message M normally become equivalent. Therefore, the information provider can certify that the message has been delivered to the user accurately and surely.

Here, the enciphering/deciphering is carried out by utilizing the public key cryptosystem in the above explanation, but the secret key cryptosystem could be used instead. Also, it has been explained according to the Fiat Shamir scheme, but the present method is applicable to zero knowledge interactive proof protocol which bases its safety on a difficulty of the factoring or a difficulty of the discrete logarithmic problem, etc., including the Extended Fiat Shamir scheme (Ohta, Okamoto, "An Extension of the Fiat-Shamir Scheme Based on Higher Degree Roots", the Electronic Information Communication Society, Technical Research Report ISEC88-13).

Next, in relation to the log H comprising the check bits $e_{jk}$, the responsive message $Y_{jk}$ (=1, 2, ..., g: j=1, 2, ..., m), and the random message Z, they are mutually related by the verification formula in the zero knowledge interactive proof protocol and the one-way random hash function, so that it is impossible to forge the log H by illegally altering a portion of it. Therefore, by making a record management of the log H, it can be presented to a neutral third party, such as the arbitrator, later on as evidence that the user has surely received the work key $W_j$ (j=1, 2, ..., g)

In addition, the communication between the information provider terminal and the user terminal is repeatedly carried out as many times as the number m of divided blocks of the work key $W_j$ (j=1, 2, ..., g), so that in a case the verification of the information provider failed in the middle, the communication subsequent to that is discontinued, and the remaining check bits are not transmitted. Namely, the check bits that can be learned by the user are limited only to those prior to the failure of the verification, so that the user who caused the failure of the verification of the information provider can only obtain a part of the information necessary for deciphering the ciphertext C, and as a result, it becomes impossible to generate the correct work key $W_j$ (j=1, 2, ... , g). Consequently, it is possible to eliminate a case in which such an illegal act is not transmitting the responsive message itself is made, such that the user illegally receives the check bits $e_{jk}$ (j=1, 2, ..., g: k=1, 2, ..., m) necessary in obtaining the message M and illegally deciphers/obtains the message M despite the fact that the information provider cannot make a record management of the log H for proving the fact that the information provider has delivered the message M to the user. Also, in the above explanation, the bit length of the divided blocks has been set to be constant g for each block, but it may also be quite fine to change the bit length size block by block, as in a case of 1 bit for the first block, 2 bits for the second blocks, 4 bits for the third blocks, etc. for example.

The description above explains that a system that can provide definitive evidence that the information provider has delivered the message M of a large capacity to the user accurately and surely. Various manners of utilization are possible. For example, when the message M, is a paid-for message in the "on demand service" for writings, etc., as the information provider delivers the message M to the user according to the above described message delivery method, the log H recorded and managed by the information provider can be utilized as proof at the time of collecting the message fee such as a fee for using the copyright, and so on.

As explained in the above, in the message delivery method utilizing the zero knowledge interactive proof protocol of the second to fourth embodiments of the present invention, firstly, the operation of the protocol itself is equivalent to the zero knowledge interactive proof protocol as the user authentication, so that similarly as the zero knowledge interactive proof protocol, it is almost impossible for the illegal user to clear the verification of the information provider. Secondly, if the delivery certification step is normally finished, it is equivalent to the fact that the zero knowledge interactive proof protocol is finished normally, so that the information provider can judge that the user has correctly received the message.

Also, by enciphering the message and transmitting it as ciphertext, it is also possible to prevent: (1) the wiretapping of the message by a third party; (2) a third partyfrom obtaining information effective in decoding the message.

Also, according to the second embodiment of the present invention, it is possible to execute the processing for deciphering the ciphertext separate from the delivery certification step.

Also, according to the second and third embodiments of the present invention, it is possible to make the size of the check bits smaller by generating the check bits from the message (or the ciphertext that can be deciphered by the user) by using the hash function, etc. for example, so that the amount of communication and the processing time in the delivery certification step can be reduced.

Also, according to the third embodiment of the present invention, by generating the check bits using the one-way random function, forgery of the log comprising the message (or the ciphertext that can be deciphered by the user), the responsive message, and the check bits can be prevented.

Also, if the protocol of the information provider failed in the middle of the delivery certification step due to utilization by an illegal user, etc. for example, the execution of the protocol is immediately discontinued, and the blocks subsequent to the failure of the verification are not going to be transmitted to the user, so that as a result, it is possible to eliminate illegal reception of the entire message (or the ciphertext that can be deciphered by the user).

Also, according to the fourth embodiment of the present invention, when transmitting a large capacity message, firstly, the message is enciphered by the work key generated by the information provider and then delivered to the user, so that it is impossible for the user to take out the message itself before the user authentication is made. Secondly, by carrying out the delivery certification with only the work key as the check bits, it is possible to reduce the processing time for the delivery certification and the amount of communication considerably. Thirdly, when the delivery certification step is normally finished, it can be certified that the user has correctly received the check bits, and it is guaranteed that the work key is obtained at the message take out step, so that the message can be taken out definitely for the first time at this point. Consequently, if the message delivery method is finished, after the message is provided in an enciphered state to the legitimate user, the information provider can certifies that, after the message is provided in the enciphered state to the legitimate user, the information necessary for the user to decipher the enciphered message has been delivered to the user, and the user has actually received it so that the information provider has knowledge that the message was actually delivered to the user.

Also, by generating the work key using the one-way random function, it is possible to prevent illegal generation of the work key. Also, by using the one-way random function similarly, it becomes impossible to forge the log comprising the random message, the check bits, and the responsive message, so that the information provider can acquire valid evidence which can prove later on that, after the requested message was provided in an enciphered state to the legitimate user, the information necessary for the user to decipher the enciphered message was delivered to the user, and that the user has received it surely.

Also, by carrying out the secret communication for the check bits, the results similar to those produced by carrying out the secret communication for the work key can be obtained, so that the wiretapping of the work key by a third party is prevented, and it also becomes impossible for a third party to obtain useful information for decoding the work key.

Also, it is possible to execute the processing for deciphering the check bits separately from the delivery certification step.

Also, if the verification of the information provider failed in the middle of the delivery certification step due to the utilization by the illegal user, etc. for example, the execution of the protocol is immediately discontinued and the blocks subsequent to the failure of the verification are not transmitted to the user. Consequently, the user who caused the failure of the verification of the information provider can obtain only a part of the information necessary for deciphering the enciphered message, and as a result, it becomes impossible to generate the message itself or the work key, so that it is possible to eliminate a case in which the illegal user illegally obtains the requested message.

Also, according to the third and fourth embodiments of the present invention, it is possible to make a record management of the log which cannot be forged as evidence that the message has actually been delivered, and it becomes possible to present it as desired. In addition, an amount of information that must be recorded and managed as evidence that the information provider has delivered the message can be reduced considerably compared with a scheme of Sakurai (Japanese Patent Application Laid Open No. 5-12321).

Also, if there arises a need to carry out the arbitration regarding the presence or absence of the information having been exchanged between the information provider and the user, as the information provider presents the log to the neutral arbitration organization such as a court, and the arbitration organization checks the authenticity of that log as valid evidence, the validity of information provider's claim and the user's claim can be judged. Namely, the arbitrator can certify later on the fact that the information provider has transmitted the message (or the ciphertext that can be deciphered by the user) to the user, and that the user has surely received it, so that it is possible to prevent such an improper claim in which the user says the message has not been received, despite of the fact that the user has received the message (or the ciphertext that can be deciphered by the user).

Also, according to these embodiments, the information provider can certify that the information provider has actually delivered the requested message to the user and that the user has actually received it. Also, it is possible to use the zero knowledge interactive proof protocol independently as a user authentication method by which the information provider authenticates the user as desired. The secret communication can be made between the information provider and the user.

Also, according to the fourth embodiment of the present invention, the message provided from the information provider is stored and the user can utilize the message according to the need.

Also, a function could be provided for generating the work key such that the message delivery using the work key could be carried out.

Also, according to the third and fourth embodiments of the present invention, it becomes a the log as a valid evidence can be presented according to the need.

Also, execution of the protocol is immediately discontinued when an illegal user is detected, such that it is possible to eliminate a case in which the illegal user illegally obtains the requested message.

Also, it is possible to have a neutral arbitration organization, such as a court, check the authenticity of the log as valid evidence, and assess the credibility of the information provider's and of the user's claim.

Next, the fifth embodiment of the present invention will be explained.

Figure 13:
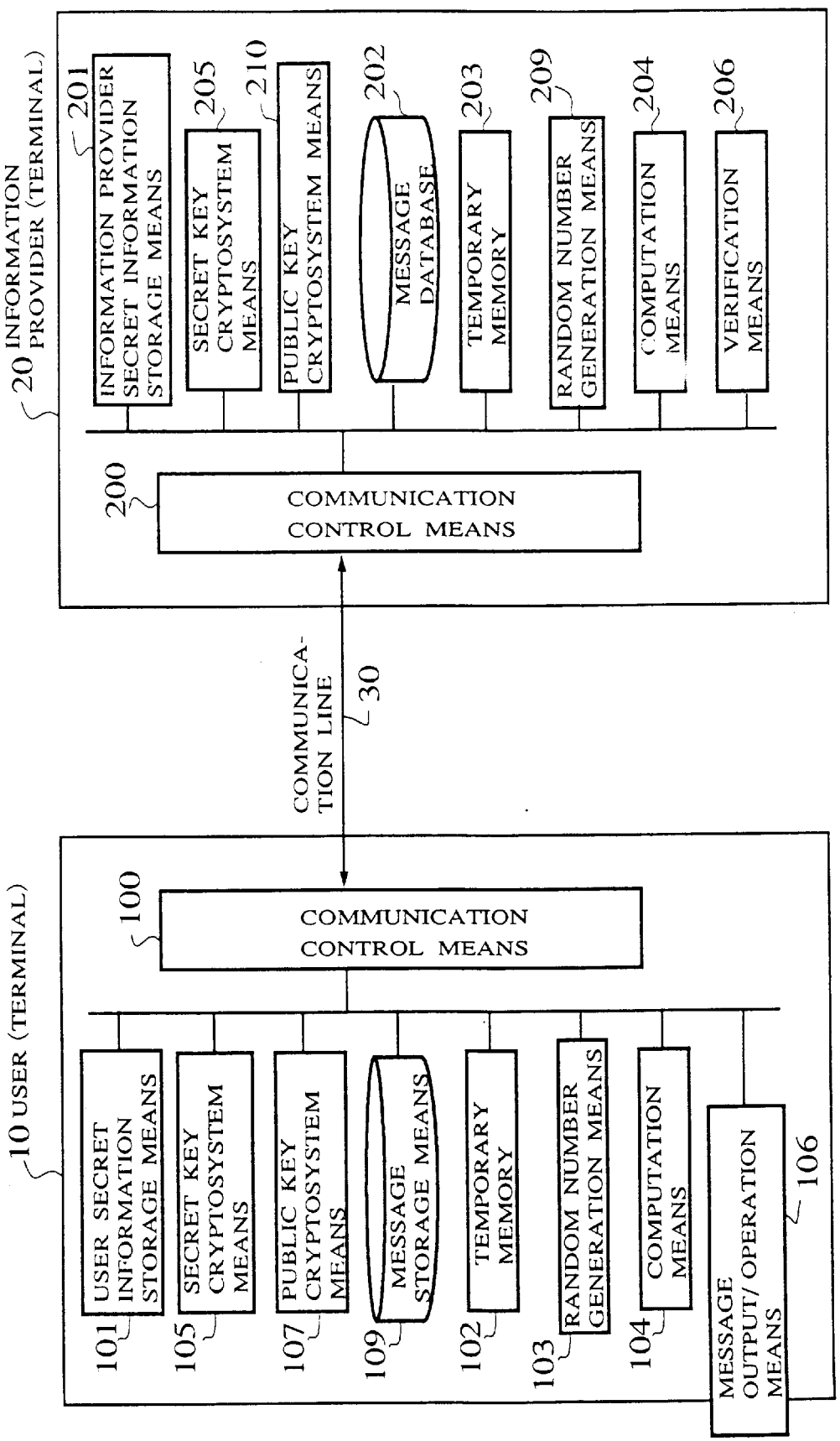
FIG. 13 is a block diagram showing an exemplary configuration of a message delivery system in the fifth embodiment of the present invention.

FIG. 13 is a block diagram showing a configuration of a message delivery system in the fifth embodiment of the present invention, in which 10 indicates a user (terminal) that requires delivery of messages with respect to an information provider, where 100 is a communication control means for controlling a communication line 30, 101 is a user secret information storage means for storing a secret information of the user produced by a center, 105 is a secret key cryptosystem means for carrying out a secret communication according to the secret key cryptosystem (DES, FEAL, for example), 197 is a public key cryptosystem means for carrying out a secret communication according to the public key cryptosystem (RDA, for example), 109 is a message storage means for storing the message delivered from the information provider, 102 is a temporary memory for the user to temporarily store a necessary information, 103 is a random number generation means for the user to generate random numbers, 104 is a computation means for carrying out necessary computations, and 106 is a message output/operation means for the user to output or operate the requested message.

Also, 20 indicates the information provider (terminal) for providing messages, where 200 is a communication control means for controlling the communication line 30, 201 is an information provider secret information storage means for storing a secret information of the information provider produced by the center, 205 is a secret key cryptosystem means for carrying out the secret communication according to the secret key cryptosystem, 210 is a public key cryptosystem means for carrying out the secret communication according to the public key cryptosystem, 202 is a message database in which the messages to be provided are stored, 203 is a temporary memory for the information provider to temporarily store necessary information, 209 is a random number generation means for the information provider to generate random numbers, 204 is a computation means for carrying out necessary computations, and 206 is a verification means for verifying an authenticity of a communication sequence according to the Fiat Shamir scheme, 30 indicates the communication line for connecting the user and the information provider by means of a communication.

Figure 14:
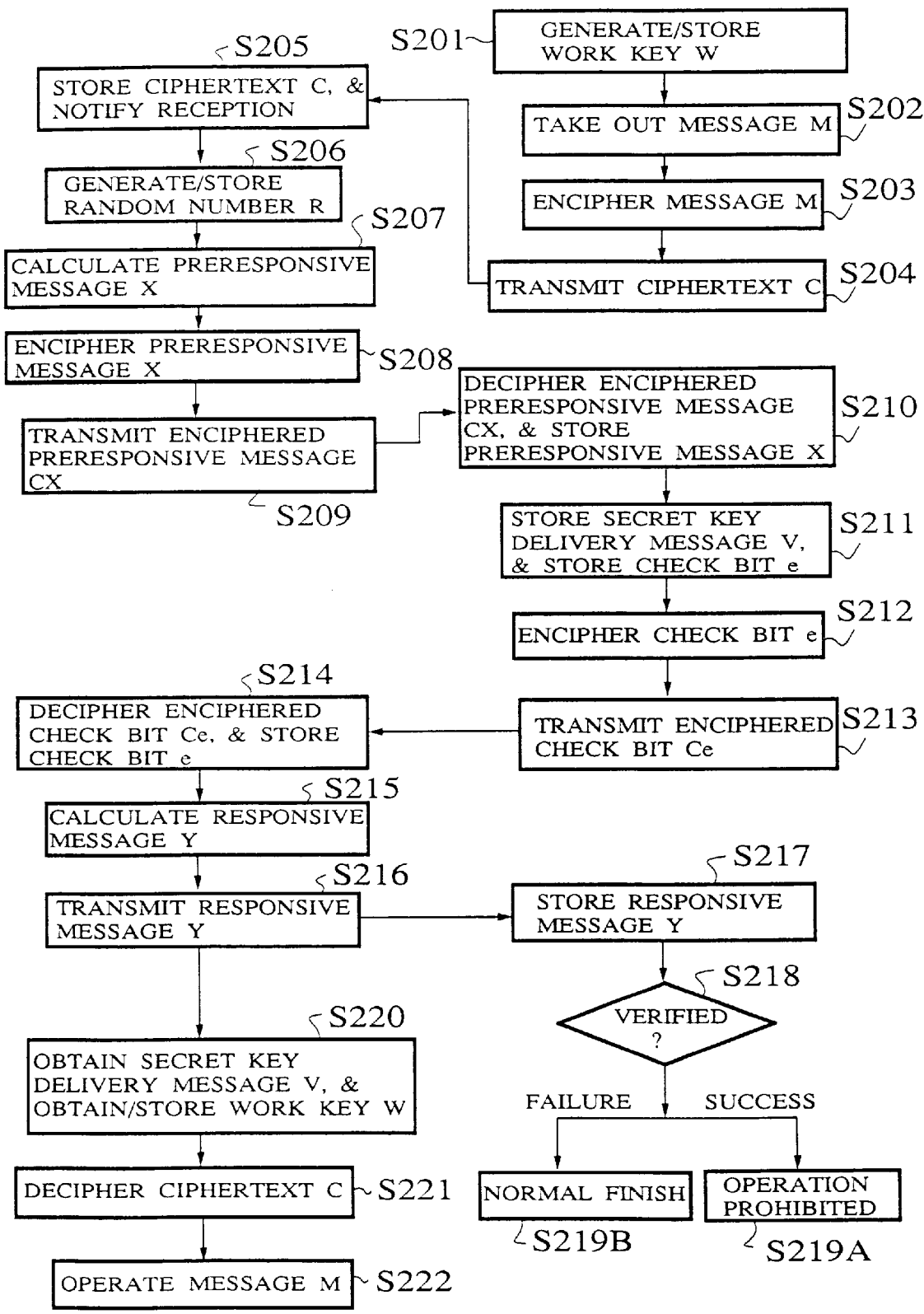
FIG. 14 is a flow chart showing an operation procedure for the message delivery system shown in FIG. 13.

In the following, an operation procedure for the message delivery step, the delivery certification step, and the message take out step will be explained according to the flow chart of FIG. 14.

First, as a preparation stage, a reliable center sets up p1, q1, I, s, p2, q2, PU, and SU for each user, disclosed N1, N2, I, and PU among them as the public information (public key) of the user, and stores s and SU as the secret information (secret key) of the user in the user secret information storage means 101 and secretly distributes it to the user. Here, each set of (p1, q1) and (p2, q2) is a set of mutually different large prime numbers, and N1=p1×q1, N2=p2×q2. Also, I=$s^2$ (mod N1), PU×SU=1 (mod (p2-1) (q2-1)) hold. Note that it may be p1=p2, q1=q2.

In addition, p, q, PC, and SC are set up for each information provider, N and PC among them are disclosed as the public information (public key) of the information provider, and SC is stored as the secret information (secret key) of the information provider in the information provider secret information storage means 201, and it is secretly distributed to the information provider. Here, p and q are mutually different large prime numbers, and N=pq. Also, PC×SC=1 (mod(p-1) (q-1)) holds.

(1) Message deliver step

The information provider generates the work key $W_i$ (i=1, 2, . . . g) of g bits size by the random number generation means 209, and stores it in the temporary memory 203 (S201). Here, in general, a value of g is greater than or equal to a key length of the secret key used in the secret key cryptosystem means 105 and 205. Note that, although the work key $W_i$ (i=1, 2, . . . , g) is generated here by the random number generation means 209, could be generated by using a function or using a specific secret key uniformly.

Next, the message M to be delivered to the user is taken out from the message database 202 (S202), and after it is enciphered into the ciphertext C=$E_w$(M) by the secret key cryptosystem means 205 with the work key $W_i$ (i=1, 2, . . . , g) as the secret key (S203), the ciphertext C is transmitted to the user through the communication line 30 (and the communication control means 100 and 200) (S204).

After the ciphertext C is received/stored at the message storage means 109, the user notifies the information provider of such reception/storage through the communication line 30 (S205).

(2) Delivery Certification step

The user generates g pieces of random numbers $R_i$ (i=1, 2, . . . , g) by the random number generation means 103, and after storing them in the temporary memory 102 (S206), calculates a preresponsive message $X_i$=$R_i^2$ (mod N1) (i=1, 2, . . . , g) for each random number by the computation means 104 (S207), enciphers it into the enciphered preresponsive message $Cx_i$=$X_i^{PC}$ (mod N) (i=1, 2, . . . , g) by the public key cryptosystem means 107 by using the public key PC of the information provider (S208), and transmits it to the information provider through the communication line 30 (S209).

The information provider deciphers the received enciphered preresponsive message $Cx_i$ into the preresponsive message $X_i$=$Cx_i^{SC}$ (mod N) (i=1, 2, . . . , g) by the public key cryptosystem means 210 by using the secret key SC stored in the information provider secret information storage means 201, and then stores it in the temporary memory 203 (S210).

Next, after the work keys $W_i$ (i=1, 2, . . . , g) stored in the temporary memory 203 are stored in the temporary memory 203 as the secret key delivery message $V_i$ and the check bits $e_I$ (i=1, 2, . . . , g) (S211), they are enciphered into the enciphered check bits $Ce_i$=$(e_1 \| e_2 \| \ldots \| e_g)^{PU}$ (mod N2) (i=1, 2, . . . , |N2|) by the public key cryptosystem means 210 by using the public key PU of the user (S212), and they are transmitted through the communication line 30 (S213). Here, |N2| indicates the number of bits of N2.

The user deciphers the received enciphered check bits Cei (i=1, 2, . . . , g) into the check bits ei=$(Ce_{i\|}Ce2\| \ldots \|_{Ce1\ N21})$SU (mod N2) (i=1, 2, . . . g) by the public key cryptosystem means 107 by using the secret key SU stored in the user secret information storage means 101, and then stores them in the temporary memory 102 (S214).

Next, at the computation means 104, for each bit i of the check bits $e_i$, $Y_i$=$R_i$ if $e_i$=0, or $Y_i$=$sR_i$ (mod N1) if $e_I$=1, is calculated from the random number $R_i$ stored in the temporary memory 102 and the user's secret information s stored in the user secret information storage means 101 (S215), and transmitted as a responsive message Yi (i=1, 2, . . . , g) to the information provider through the communication line 30 (S216).

The information provider stores the received responsive message $Y_i$ (i=1, 2, . . . , g) in the temporary memory 203 (S217), and then, at the verification means 206, whether a verification formula $Y_i^2$=$X_i$ (mod N1) if $e_i$=0, or a verification formula $Y_i^2$=Xi (mod N1) if $e_i$=0, or a verification formula $Y_i^2$=$X_i$×I (mod N1) if $e_i$=1, is satisfied for each bit i, from the public information I of the user, and the preresponsive message Xi, the responsive message Yi, and the check bits $e_i$ stored in the temporary memory 203 (S218). If this verification has failed, the user is regarded as illegal, and subsequent operation is prohibited (S219A). Otherwise, it is finished normally (S219B).

(3) Message take out step

The user takes out the secret key delivery message $V_i$ and the work key $W_i$ (i=1, 2, . . . , g) from the check bits $e_I$ (i=1, 2, . . . , g) stored in the temporary memory 102 at the computation means 104, and stores them in the message storage means 109 (S220).

Finally, the ciphertext C stored in the message storage means 109 is deciphered by the secret key cryptosystem means 105 with the work key $W_i$(i=1, 2, . . . , g) stored in the message storage means 109 as the secret key (S221), and the requested message M=$D_w$(C) can be obtained from the message output/operation means 106 (S222).

By using the above described message delivery method, the message M is transmitted to the user by being enciphered into the ciphertext C first, so that at a point at which the user received the ciphertext C, the message M is not going to be obtained. Then, at a point at which the zero knowledge interactive proof protocol is finished normally, it implies that the user authentication according to the zero knowledge interactive proof protocol has been made normally, and besides it can be seen that the user has received the check bits $e_i$(i=1, 2, . . . , g) normally, and the appropriate processing has been made.

Also, the user can generate the work key $W_i$ (i=1, 2, . . . , g) and obtain the message M by deciphering the ciphertext C of the message requested by the user if the user has correctly received the check bits $e_i$ (i=1, 2, . . . , g), so that the fact that the user has received the check bits $e_i$ (i=1, 2, . . . , g) normally and the fact that the user has received the requested message normally become equivalent. Therefore, the information provider can certify the fact that the requested message has been delivered to the user accurately and surely.

Here, as for portions in which the enciphering/deciphering is carried out by utilizing the public key cryptosystem in the above explanation, the secret key cryptosystem could be used. Also, it has been explained according to the Fiat Shamir scheme, but the present method is applicable to zero knowledge interactive proof protocol which bases it's safety on a difficulty of the factoring or a difficulty of the discrete logarithmic problem, etc., including the Extended Fiat Chamber scheme (Ohta, Okamoto, "An Extension of the Fiat-Chamber Scheme Based on Higher Degree Roots", the Electronic Information Communication Society, Technical Research Report ISEC88-13).

Next, the sixth embodiment of the present invention will be explained.

Figure 15:
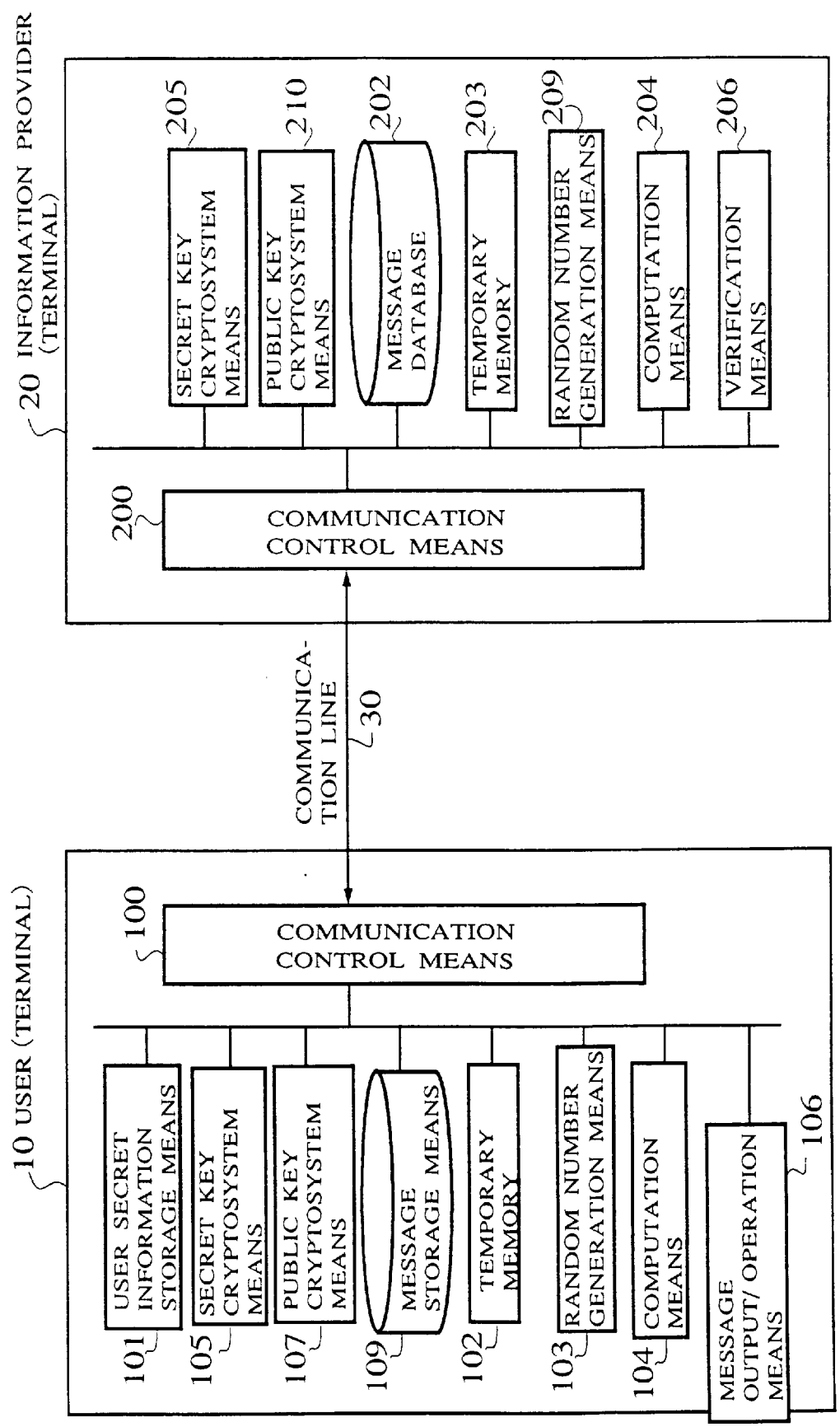
FIG. 15 is a block diagram showing an exemplary configuration of a message delivery system in the sixth embodiment of the present invention.

FIG. 15 is a block diagram showing a configuration of the message delivery system in the sixth embodiment of the present invention, where the system configuration is similar to the configuration of the fifth embodiment, except that the information provider secret information storage means 201 in the information provider (terminal) 20 is unnecessary.

Figure 16:
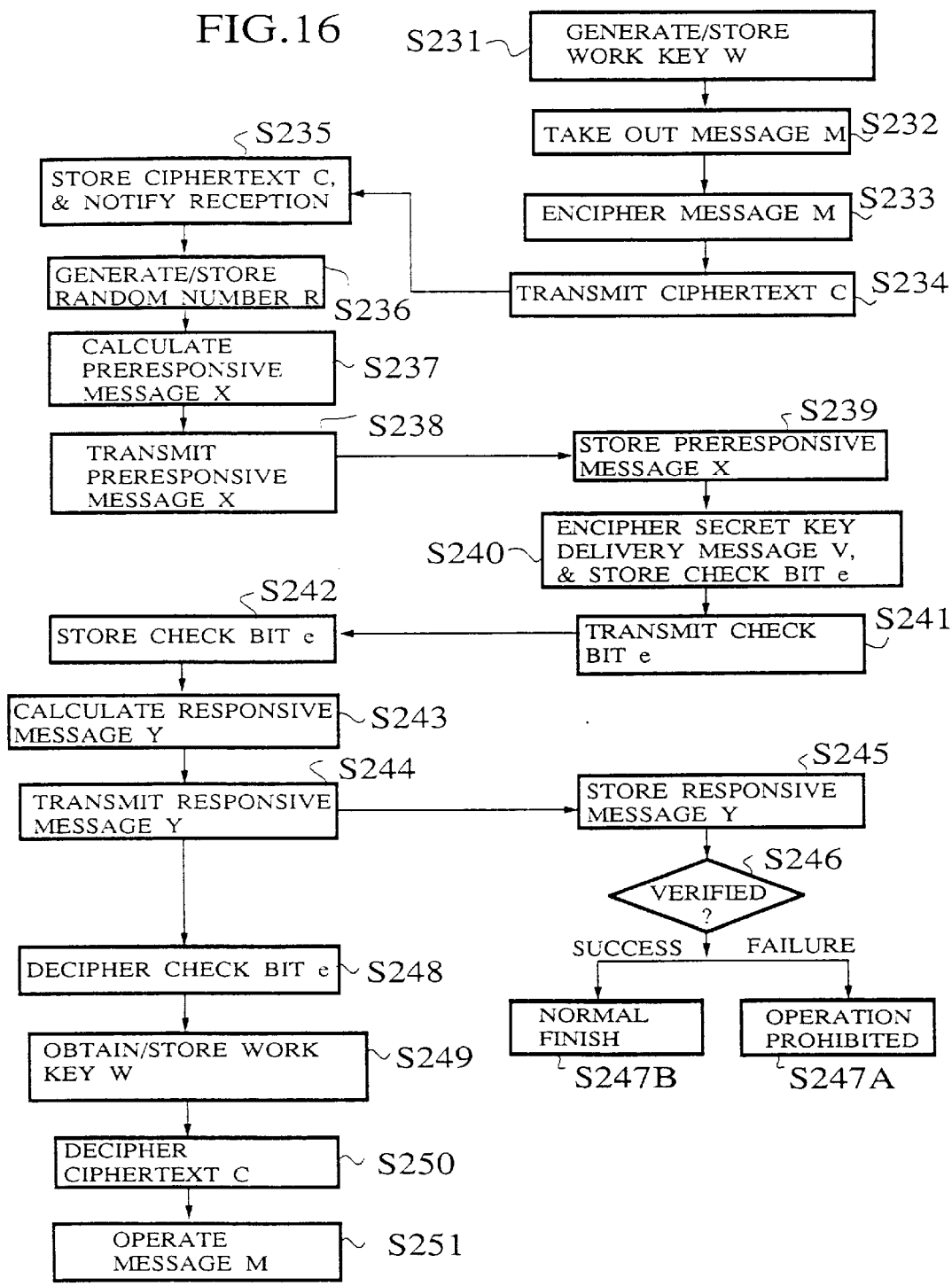
FIG. 16 is a flow chart showing an operation procedure for the message delivery system shown in FIG. 15.

In the following, the operation procedure for the message delivery step, the delivery certification step, and the message take out step will be explained according to the flow chart of FIG. 16.

First, as a preparation stage, a reliable center sets up p1, q1, I, s, p2, q2, PU, and SU for each user, disclosed N1, N2, I, and PU among them as the public information (public key) of the user, and stores s and SU as the secret information (secret key) of the user in the user secret information storage means 101 and secretly distributes it to the user. Here, each set of (p1, q1) and (p2, q2) is a set of mutually different large prime numbers, and N1=p1×q1, N2=p2×q2. Also, I=$s^2$ (mod N1), PU×SU=1 (mod (p2-1) (q2-1)) hold. Note that it may be p1=p2, q1=q2.

(1) Message delivery step

It is similar to the fifth embodiment (S231 to 235).

(2) Delivery certification step

The user generates |N2| random numbers Ri (i=1, 2, . . . , |N2|) by the random number generation means 103, and after storing them in the temporary memory 102 (S236), calculates a prerespensive message $X_i$=$R_i^2$ (mod N1) (i=1, 2, . . , |N2|) for each random number by the computation means 104 (S237), and transmits it to the information provider through the communication line 30 (S238). Here, |N2| indicates a number of bits of N2.

The information provider stores the received prerespensive message $X_i$ (i=1, 2, . . . , |N2|) in the temporary memory 203 (S239). Next, after the check bits $e_i$=$(V_i\|V_2\|. . .\|V_g)^{PU}$ (mod N2) (i=1, 2, . . . , |N2|) are generated by enciphering the work keys $W_i$ stored in the temporary memory 203 as the secret key delivery message $V_i$ (i=1, 2, . . . , g) by the public key cryptosystem means 210 by using the public key PU of the user, they are stored in the temporary memory 203 (S240). After that, the check bits e i (i=1, 2, . . . , |N2|) are transmitted through the communication line 30 (S241).

The user stores the received check bits ei (i=1, 2, . . . , |N2|) in the temporary memory 102 (S242), and then, at the computation means 104, for each bit i of the check bits ei, $Y_i$=$R_i$ if $e_i$=0, or $Y_i$=$sR_i$ (mod N1) if $e_i$=1, is calculated from the random number $R_i$ stored in the temporary memory 102 and the user secret information s stored in the user secret information storage means 101 (S243), and transmitted it as a responsive message $Y_i$ (i=1, 2, . . . , g) to the information provider through the communication line 30 (S244).

The information provider stores the received responsive message $Y_i$ (i=1, 2, . . . , |N2|) in the temporary memory 203 (S245), and then, at the verification means 206, whether a verification formula $Yi^2$=$X_i$(mod N1) if e i=0, or a verification formula $Yi^2$=Xi (mod N1) if ei=0, or a verification formula $Yi^2$=$X_i$×I (mod N1) if $e_i$=1, is satisfied for each bit i, from the public information I of the user, and the prerespensive message Xi, the responsive message Yi, and the check bits $e_i$ stored in the temporary memory 203 (S246). If this verification has failed, the user is regarded as illegal, and the operation subsequent to that is prohibited (S247A). Otherwise, it is finished normally (S247B).

(3) Message take out step

The user deciphers the check bits ei (i=1, 2, . . . , |N2|) stored in the temporary memory 102 into the secret key delivery message $V_i$=$(e_1\|e_2\|. . . \|e_{1N21})^{SU}$ (mod N2) (i=1, 2, . . . , g) by the public key cryptosystem means 107 by using the secret key SU stored in the user secret information storage means 101 (S248), and then takes out the work keys $W_i$ (i=1, 2, . . . , g) at the computation means 104, and stores them in the message storage means 109 (S249).

Finally, the ciphertext C stored in the message storage means 109 is deciphered by the secret key cryptosystem means 105 with the work keys $W_I$ (i=1, 2, . . . , g) stored in the message storage means 109 as the secret key (S250), and the requested message M=$D_W$(C) can be obtained from the message output/operation means 106 (S251).

By using the above described message delivery method, results equivalent to those produced by the fifth embodiment can be obtained. Also, in comparison with the fifth embodiment, the amount of information that must be stored in the temporary memory, etc. becomes larger, but number of times by which the public key cryptosystem having a slow processing speed is to be utilized can be only one, so that a shortening of the processing time can be expected.

Here, as for portions in which the enciphering/deciphering is carried out by utilizing the public key cryptosystem in the above explanation, the secret key cryptosystem could be used. Also, it has been explained according to the Fiat Shamir scheme, but the present method is applicable to all the zero knowledge interactive proof protocols which base their safety on a difficulty of the factoring or a difficulty of the discrete logarithmic problem, etc., including the Extended Fiat Shamir scheme (Ohta, Okamoto, "An Extension of the Fiat-Shamir Scheme Based on Higher Degree Roots", the Electronic Information Communication Society, Technical Research Report ISEC88-13).

Next, the seventh embodiment of the present invention will be explained.

Figure 17:
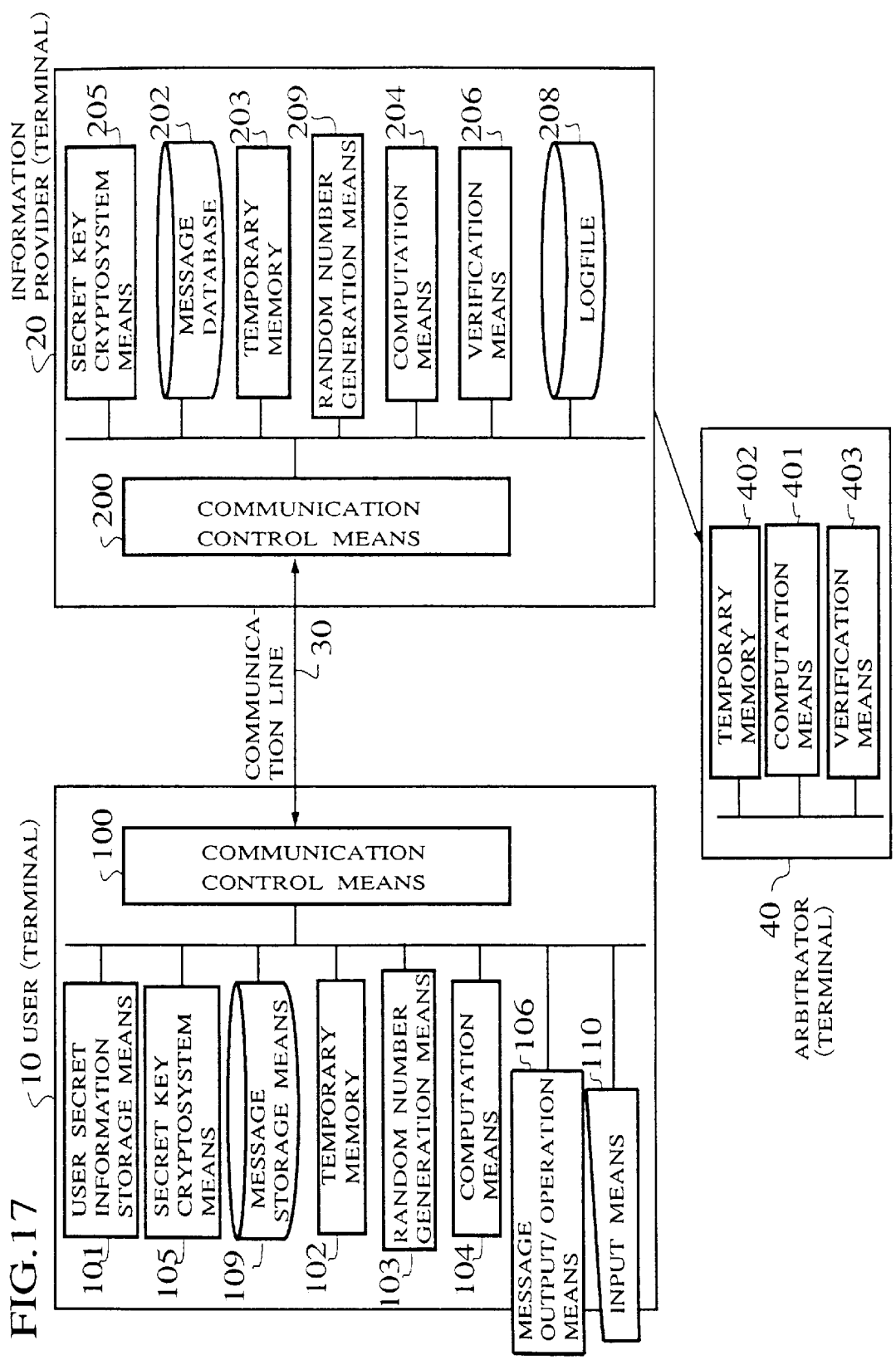
FIG. 17 is a block diagram showing an exemplary configuration of a message delivery system in the seventh embodiment of the present invention.

FIG. 17 is a block diagram showing a configuration of a message delivery system in the seventh embodiment of the present invention, in which 10 indicates a user (terminal) whose constituent means from 100 to 109 are similar to the sixth embodiment, while 110 is an input means for producing a message delivery request message. 20 indicates the information provider (terminal) whose constituent elements from 200 to 206 and 209 are similar to the sixth embodiment, while 208 is a logfile for making a record management of a log H as evidence for proving later on that the message has been delivered to the user. 30 indicates the communication line for connecting the user and the information provider by means of a communication. 40 indicates an arbitrator (terminal) for judging later on the authenticity of the log H from a neutral standpoint, for the log H which is recorded and managed by the information provider in the logfile 208, where 402 is a temporary memory for the arbitrator to temporarily store necessary information, 401 is a computation means for carrying out necessary computations, and 403 is a verification means for verifying an authenticity for the log H about which the judgement of the authenticity is requested.

Figure 18:
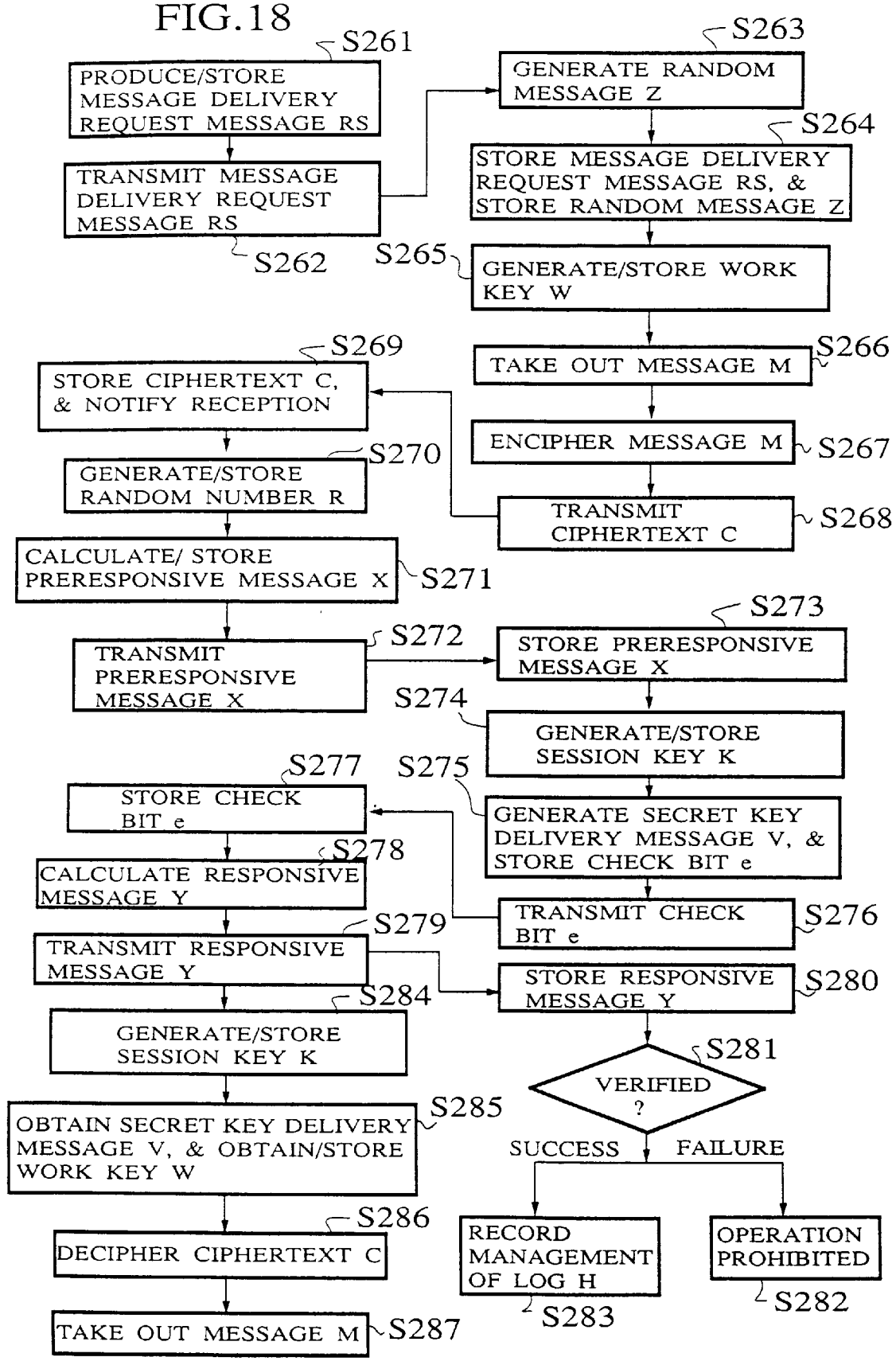
FIG. 18 is a flow chart showing an operation procedure concerning a message delivery, a delivery certification and a message take out for the message delivery system shown in FIG. 17.
Figure 19:
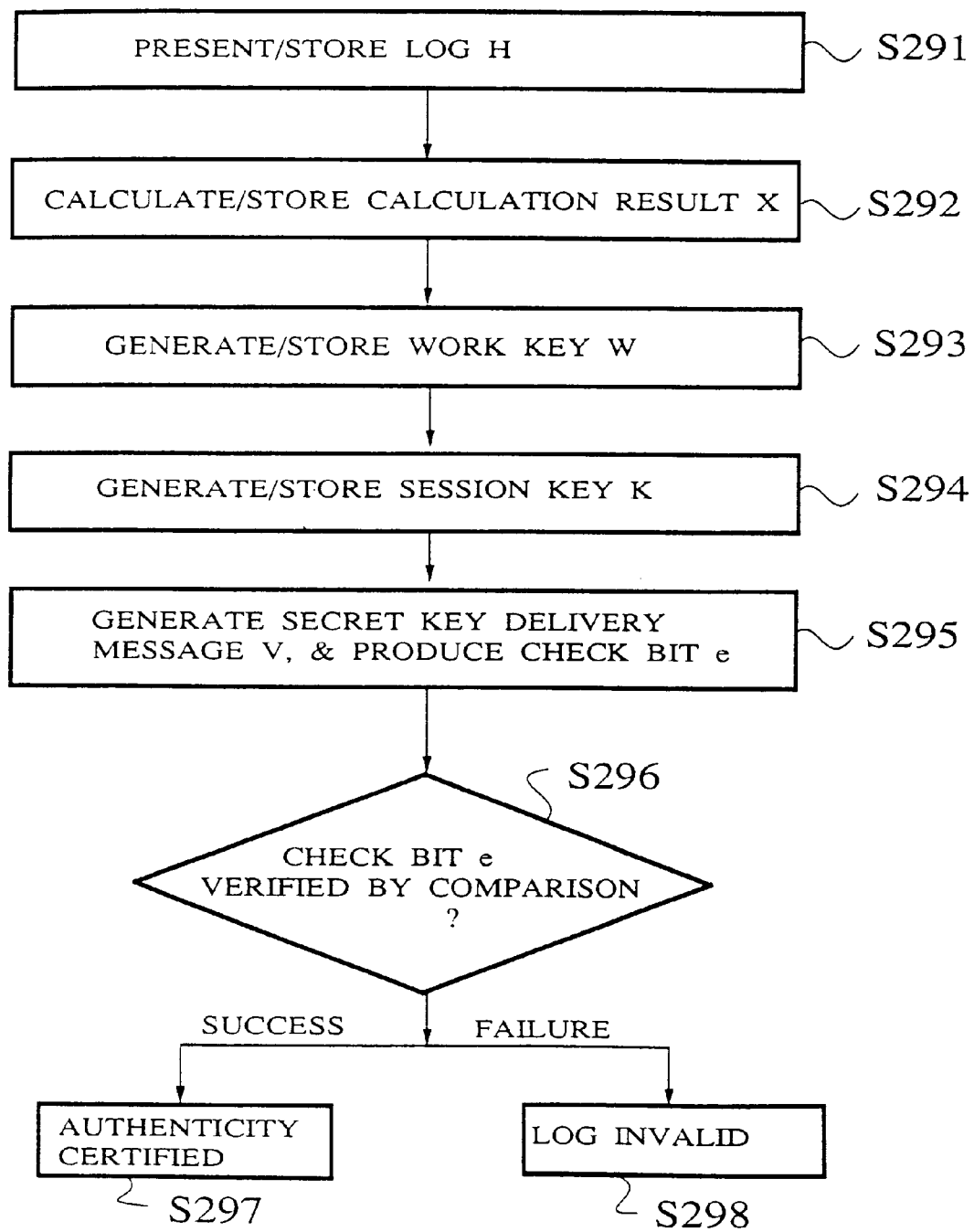
FIG. 19 is a flow chart showing an operation procedure concerning an arbitration for the message delivery system shown in FIG. 17.

In the following, an operation procedure for the message delivery step, the delivery certification step, and the message take out step will be explained according to the flow chart of FIG. 18, and the operation procedure for the arbitration will be explained according to the flow chart of FIG. 19.

First, as a preparation stage, a reliable center sets up p1, q1, I, and s for each user, discloses N1 and I among them as the public information of the user, and stores s as the secret information of the user in the user secret information storage means 101 and secretly distributes it to the user. Here, p1 and q1 are mutually different large prime numbers, and N1=p1×q1. Also, I=$s^2$ (mod N1) holds.

(1) Message deliver step

The user produces a message delivery request message RS about the message he wishes the information provider to provide, from the input means 110, stores it in the temporary memory 102 (S261), and then transmits it to the information provider through the communication line 30 (S262). Here, the message delivery request message RS is formed by a request date and time, a user ID number, a requested message name, a requested message code, etc., as shown in FIG. 20. Note that FIG. 20 indicates the configuration format of the message delivery request message RS.

Here, the message delivery request message RS is transmitted from the user to the information provider, but the user cold transmit the requested message code alone to the information provider, and each of the information provider and the user could produce the same message delivery request message RS independently.

The information provider generates the random message Z randomly from the random number generation means 209 (S263), and after the message delivery request message RS and the generated random message Z are stored in the temporary memory 203 (S264), generates the work key $W_i$=f1 (RS, Z) (i=1, 2, ..., g) of g bits size according to the first one-way random hash function f1 in the computation means 204 from the message delivery request message R and the random message Z, and stores it in the temporary memory 203 (S265). Here, in general, a value of g is greater than or equal to a key length of the secret key used in the secret key cryptosystem means 105 and 205. Next, according to the requested message code in the message delivery request message RS, the message M corresponding to that code is taken out from the message database 202 (S266), and after it is enciphered into the ciphertext C=Ew(M) by the secret key cryptosystem means 205 with the work key $W_i$ (i=1, 2, ..., g) as the secret key (S267), the ciphertext C is transmitted to the user through the communication line 30 (S268).

After the ciphertext C is received/stored at the message storage means 109, the user so notifies the information provider through the communication line 30 (S269).

(2) Delivery Certification step

The user generates g random numbers $R_i$ (i=1, 2, ..., g) by the random number generation means 103, stores them in the temporary memory 102 (S270), calculates a prerresponsive message $X_i$=$R_i^2$ (mod N1) (i=1, 2, ..., g) for each random number by the computation means 104, and stored it in the temporary memory 102 (271), and transmits the preresponsive message Xi (i=1, 2, ..., g) to the information provider through the communication line 30 (S272).

The information provider stores the received preresponsive message Xi (i=1, 2, ..., g) in the temporary memory 203 (S273), and then generates the session key $K_i$=f2 (RS, (X1∥X2∥...∥Xg)) (i=1, 2, ..., g) of g bits size according to the second one-way random hash function f2 in the computation means 204 from the message delivery request message RS and the preresponsive message $X_i$ (i=1, 2, ..., g) stored in the temporary memory 203, and stores it in the temporary memory 203 (S274). Here, f1 and f2 could be the same function.

Next, from the work keys $W_i$ and the session key $K_i$ (i=1, 2, ..., g) stored in the temporary memory 203, the secret key delivery message $V_i$ (i=1, 2, ..., g) is generated according to the third function f3 in the computation means 204, and stored as the check bits $e_i$ (i=1, 2, ..., g) in the temporary memory 203 (S275), and then the check bits $e_i$ (i=1, 2, ..., g) are transmitted to the user through the communication line 30 (S276). Here, as the third function f3, there is $V_i$=f3(Wi, Ki)=$W_i \oplus K_i$ (i=1, 2, ..., g) for example. Note that $\oplus$ indicates an exclusive OR.

The user stores the received check bits $e_i$(i=1, 2, ..., g) in the temporary memory 102 (S277), and then, at the computation means 104, for each bit i of the check bits $e_i$, $Y_i$=$R_i$ if $e_i$=0, or $Y_i$=$R_i$ if $e_i$=0, or $Y_i$=$sR_i$ (mod N1) if $e_i$=1, is calculated from the random number $R_i$ stored in the temporary memory 102 and the user's secret information s stored in the user secret information storage means 101 (S278), and transmitted as a responsive message $Y_i$ (i=1, 2, ..., g) to the information provider through the communication line 30 (S279).

The information provider stores the received responsive message $Y_i$, (i=1, 2, ..., g) in the temporary memory 203 (S280), and then, at the verification means 206, whether a verification formula $Y_i^2$=Xi (mod N1) if $e_i$=0, or a verification formula $Y_i^2$=$X_i$ $x_I$ (mod N1) if $e_i$=1, is satisfied or not is verified for each bit i, from the public information I of the user, and the preresponsive message $X_i$, the responsive message $Y_i$, and the check bits ei stored in the temporary memory 203 (S281). If this verification has failed, the user is regarded as illegal, and operation subsequent to that is prohibited (S282). If the verification has succeeded, the message delivery request message RS, the random message Z, the check bits $e_i$, and the responsive message $Y_i$ (i=1, 2, ..., g) stored in the temporary memory 203 are recorded and managed as the log H in the logfile 208, as shown in FIG. 21 (S283). Note that FIG. 21 is showing a configuration format of the log H.

(3) Message take out step

The user generates the session key $K_i$=f2(RS, ($X_1$∥$X_2$∥...∥Xg)) (i=1, 2, ..., g) of g bits size according to the second one-way random hash function f2 in the computation means 104 from the message delivery request message RS and the preresponsive message $X_i$ (i=1, 2, ..., g) stored in the temporary memory 102, and stores it in the temporary memory 102 (S284). Next, from the check bits $e_i$ (i=1, 2, ..., g) stored in the temporary memory 102, the secret key delivery message Vi (i=1, 2, ..., g) is generated, and the work key $W_i$ (i=1, 2, ..., g) is taken out according to an inverse function f3' of the third function f3 in the computation means 104 from the generated secret key delivery message $V_i$ and the session key $K_i$ (i=1, 2, ..., g) and stored in the message storage means 109 (S285). Here, with respect to the third function f3 of $V_i$=f3($W_i$, $K_i$)= $W_i \oplus K_i$(i=1, 2, ..., g) for example, the third inverse function f3' is $W_i$=f3'($V_i$, $K_i$)=Vi$\oplus K_i$(i=1, 2, ..., g). Note that $\oplus$ indicates an exclusive OR.

Finally, the ciphertext C stored in the message storage means 109 is deciphered by the secret key cryptosystem means 105 with the work key $W_i$ (i=1, 2, ..., g) stored in the message storage means 109 as the secret key (S286), and the requested message M=Dw(C) can be obtained from the message output/operation means 106 (S287).

(4) Arbitration

If the user claims later on that the requested message has not been received, or denies the request of the message delivery itself, the information provider presents the log H recorded and managed in the logfile 208, and stores it in the temporary memory 402 of the arbitrator (S291).

The arbitrator calculates $X_i=Y_i^2$ (mod N1) if $e_i$=0, or $X_i=Y_i^2/I$ (mod N1) if e=1, at the computation means 401 for each bit i, from the public information I of the user, and the check bits $e_i$ and the responsive message $Y_i$ in the log H stored in the temporary memory 402, and stores it in the temporary memory 402 (S292).

Next, the work key $W_i$=f1(RS, Z) (i=1, 2, ..., g) is generated according to the first one-way random hash function f1 in the computation means 401 from the message delivery request message RS and the random message Z in the log H stored in the temporary memory 402, while the session key $K_i$=f2(RS, ($X_1 \| X_2 \| \ldots \| X_g$)) (j=1, 2, ..., g) is generated according to the second one-way random hash function f2 in the computation means 401 from the message delivery request message RS and the calculation result $X_i$ (i=1, 2, ..., g), and stored in the temporary memory 402 (S294). Then, from the work keys Wi and the session key $K_i$(i=1, 2, ..., g), the secret key delivery message $V_i$ (i=1, 2, ..., g) is generated according to the third function f3 in the computation means 401, and as the check bits $e_i$(i=1, 2, ..., g), whether they coincide with the check bits $e_i$ (i=1, 2, ..., g) in the log H stored in the temporary memory 402 or not is checked at the verification means 403 (S296). When they coincide, it implies that the authenticity of the log H is proven (S297), and the fact that the user has requested the message delivery and received the requested message is guaranteed. Otherwise the log H is considered as invalid (S298).

By using the above described message delivery method, the message M is transmitted to the user by being enciphered into the ciphertext C first, so that at a point at which the user received the ciphertext C, the message M is not going to be obtained. Then, at a point at which the zero knowledge interactive proof protocol is finished normally, it implies that the user authentication according to the zero knowledge interactive proof protocol has been made normally, and besides it becomes proof that the user has normally received the check bits ei (i=1, 2, ..., g).

Also, apart from the check bits ei (i=1, 2, ..., g), the work key Wi (i=1, 2, ..., g) is generated from the message delivery request message RS and the preresponsive message Xi produced by the user himself, and the user can obtain the requested message M by deciphering the ciphertext C, so that the fact that the user has received the check bits ei (i=1, 2, ..., g) normally and the fact that the user has received the requested message normally become equivalent. Therefore, the information provider can certify the fact that the message has actually been delivered to the user accurately.

Also, it has been explained according to the Fiat Shamir scheme, but the present method is applicable to any zero knowledge interactive proof protocol which bases it's safety on a difficulty of the factoring or a difficulty of the discrete logarithmic problem, etc., including the Extended Fiat Shamir scheme (Ohta, Okamoto, "An Extension of the Fiat-Shamir Scheme based on Higher Degree Roots", the Electronic Information Communication Society, Technical Research Report ISEC88-13).

Next, in relation to the log H comprising the message delivery request message RS, the random message Z, the check bits ei, and the responsive message Yi (i=1, 2, ..., g), they are mutually related by the verification formula in the zero knowledge interactive proof protocol and the first and second one-way random hash functions, so that it is impossible to forge the log H by illegally altering a part of it, etc. Therefore, by making a record management of the log H, it can be presented to a neutral third party such as the arbitrator later on, as evidence that the user has surely received the work key Wi (i=1, 2, ..., g) for making it possible for the user to obtain the requested message M by deciphering the ciphertext C.

The above explanation is that by which it is possible to prove the fact that the user has made a request for the message delivery to the information provider, and the information provider has delivered the requested message to the user accurately and surely, and various manners of utilization are possible. For example, if the message M is paid-for message such as a writing, etc., as the information provider transmits the message M to the user according to the above described message delivery method, the log H recorded and managed by the information provider can be utilized as proof at a time of collecting the message fee such as a fee for using the copyright, and so on.

Next, the eighth embodiment of the present invention will be explained.

Figure 22:
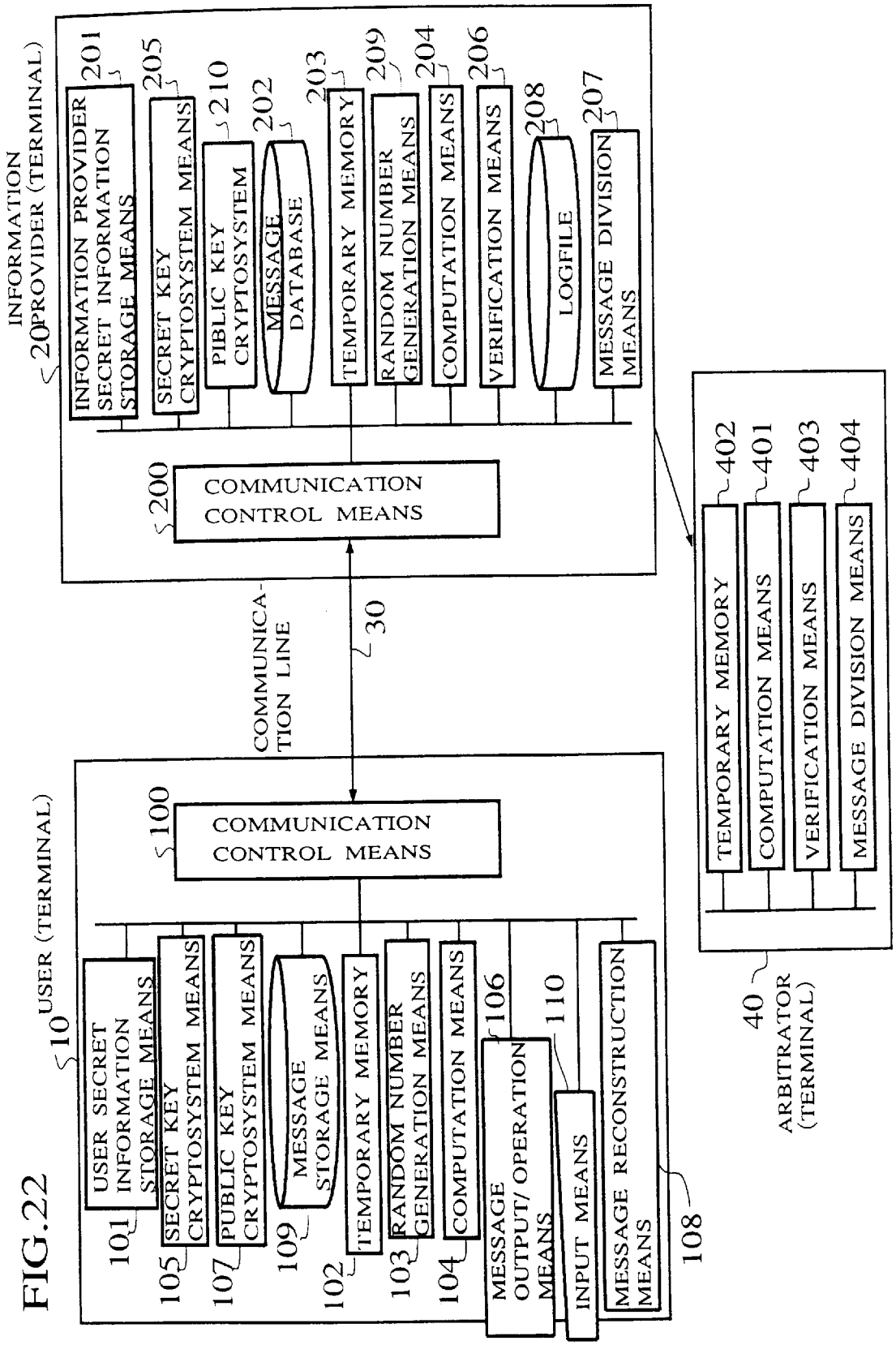
FIG. 22 is a block diagram showing an exemplary configuration of a message delivery system in the eighth embodiment of the present invention.

FIG. 22 is a block diagram showing a configuration of a message delivery system in the eighth embodiment of the present invention, in which 10 indicates a user (terminal) where configurations from 100 to 107 and 109 are similar to the fifth embodiment, while 110 is an input means for producing a message delivery request message, and 108 is a message reconstruction means for reconstructing the divided block messages into an original message. 20 indicates the information provider (terminal) where configurations from 200 to 206, 209, and 210 are similar to the fifth embodiment, while 208 is a logfile for making a record management of log H as an evidence for proving later on that the message has been delivered to the user, and 207 is a message division menas for dividing the message into a plurality of blocks in arbitrary bit lengths and storing them. 30 indicates the communication line for connecting the user and the information provider. 40 indicates an arbitrator (terminal) where configurations from 401 to 403 are similar to the seventh embodiment, while 404 is a message division means for dividing the message into a plurality of blocks in arbitrary bit lengths and storing them.

Figure 23:
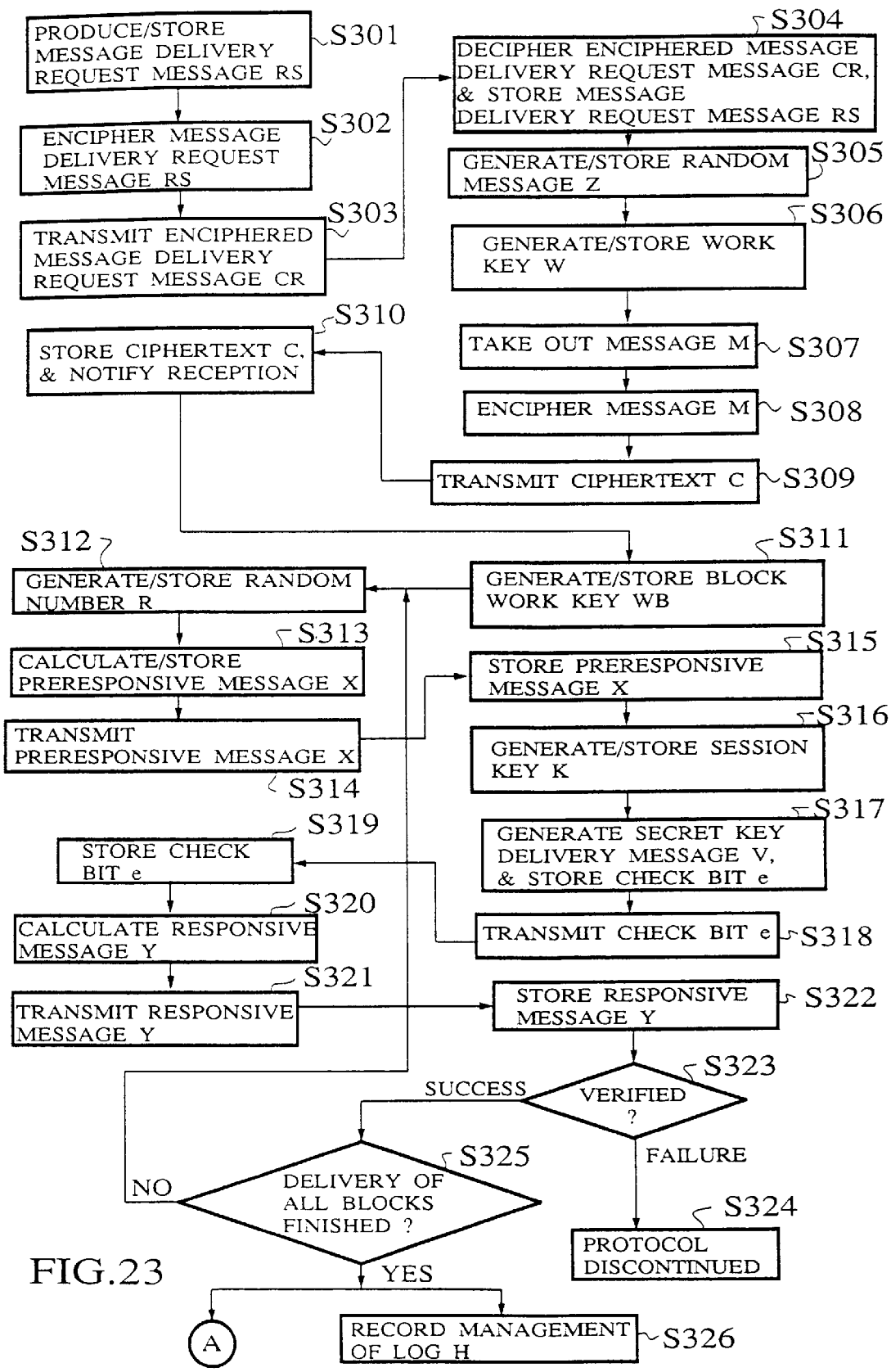
FIG. 23 is a flow chart showing a first half of an operation procedure concerning a message delivery, a delivery certification and a message take out for the message delivery system shown in FIG. 22.
Figure 24:
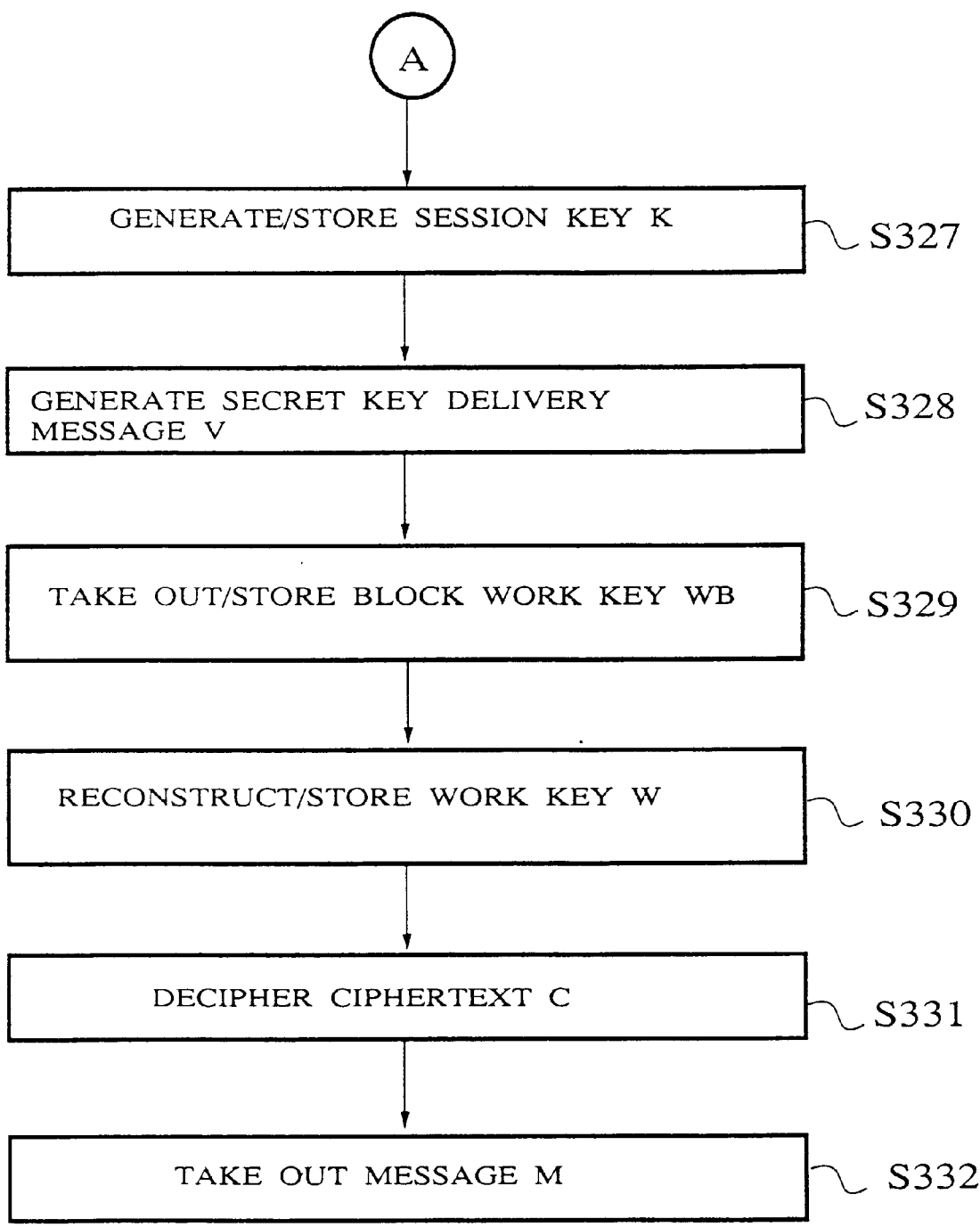
FIG. 24 is a flow chart showing a second half of an operation procedure concerning a message delivery, a delivery certification and a message take out for the message delivery system shown in FIG. 22.
Figure 25:
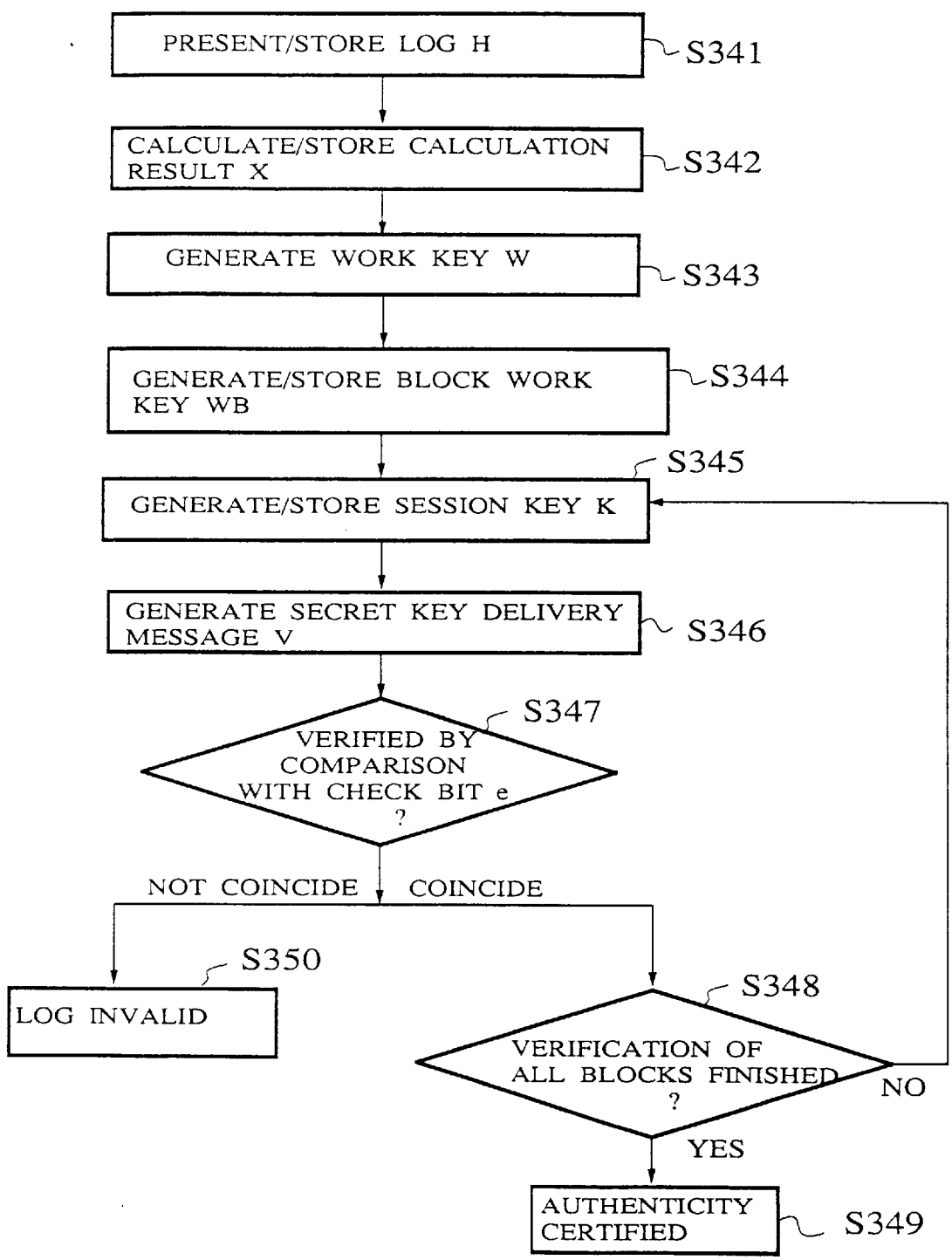
FIG. 25 is a flow chart showing an operation procedure concerning an arbitration for the message delivery system shown in FIG. 22.

In the following, an operation procedure for the message delivery step, the delivery certification step, and the message take out step will be explained according to the flow chart of FIG. 23, and the operation procedure for the arbitration will be explained according to the flow chart of FIG. 24.

First, as a preparation stage, a reliable center sets up p1, q1, I, and s for each user, discloses N1 and I among them as the public information of the user, and stores s as the secret information of the user in the user secret information storage means 101 and secretly distributes it to the user. Here, p1 and q1 are mutually different large prime numbers, and N1=p1×q1. Also, I=$s^2$ (mod N1) holds.

In addition, p, q, PC, and SC are set up for each information provider, N and PC among them are disclosed as the public information (public key) of the information provider, and SC is stored as the secret information (secret key) of the information provider in the information provider secret information storage means 201, and it is secretly distributed to the information provider. Here, p and q are mutually different large prime numbers, and N=pq. Also, PC×SC=1 (mod(p-1) (q-1)) holds.

(1) Message deliver step

The user produces a message delivery request message RS about the message he wishes the information provider to provide, from the input means 110, stores it in the temporary memory 102 (S301), enciphers it into the enciphered message delivery request message CR=$RS^{PC}$ (mod N) by the public key cryptosystem means 107 by using the public key PC of the information provider (S302), and transmits it to the information provider through the communication line 30 (S303). Here, the message delivery request message RS is formed by a request date and time, a user ID number, a requested message name, a requested message code, etc., similar to the seventh embodiment.

The information provider deciphers the received enciphered message delivery request message CR into the message delivery request message RS=$CR^{SC}$ (mod N) by the public key cryptosystem means 210 by using the secret key SC stored in the information provider secret information storage means 201, stores it in the temporary memory 203 (S304), while generating the random message Z randomly from the random number generation means 209, and then storing it in the temporary memory 203 (S305).

Next, the work key $W_i$=f1 (RS, Z) (i=1, 2, . . . , g) of g bits size is generated according to the first one-way random hash function f1 in the computation means 204 from the message delivery request message RS and the random message Z, and stored in the temporary memory 203 (S306). Here, in general, a value of g is greater than or equal to a key length of the secret key used in the secret key cryptosystem means 105 and 205. After that, according to the requested message code in the message delivery request message RS, the message M corresponding to that code is taken out from the message database 202 (S307), and after it is enciphered into the ciphertext C=$E_w$(M) by the secret key cryptosystem means 205 with the work key $W_i$(I=1, 2, . . . , g) as the secret key (S308), the ciphertext C is transmitted to the user through the communication line 30 (S309).

After the ciphertext C is received/stored at the message storage means 109, the user so notifies the information provider through the communication line 30 (S310).

(2) Delivery Certification step

The information provider terminal 20 divides the work key $W_i$ (i=1, 2, . . . , g) stored in the temporary memory 203 into a plurality of blocks in sizes of arbitrary bit lengths at the message division means 207, and stores them as the block work keys. Here, for the sake of the simplicity of the explanation, a number of divided blocks is set to be m, a bit length is set to be constant L for all the blocks, and the divided work keys are expressed as the block work keys $Wb_{ij}$ (i=1, 2 . . . , L: j=1, 2, . . . , m). Namely, $WB_{ij}$=$W_{(i+L(j-1))}$, and it is going to be $WB_{11}$=$WB_{L1}$=$W_1$=$W_L$, $WB_{12}$=$W_{L+1}$, and $WB_{LM}$=$W_G$, for example.

The processing from here on is for the j-th block, and the following processing is repeatedly carried out sequentially (m times) for each block from the first block to the m-th block.

First, the user generates L pieces of random numbers $R_{ij}$ (i=1, 2, . . . , L) by the random number generation means 103 and then stores them in the temporary memory 102 (S312), calculates a preresponsive message $X_{ij}$=$R_{ij}^2$ (mod N1) (i=1, 2, . . . , L) by the computation means 104 for each random number and then stores it in the temporary memory 102 (S313), and transmits the preresponsive message $X_{ij}$ (i=1, 2, . . . , L) to the information provider through the communication line 30 (S314).

The information provider stores the received preresponsive message $X_{ij}$ (i=1, 2, . . . , L) in the temporary memory 203 (S315), and then generates the session key $K_{ij}$=f2(RS, ($X_{ij}$, ||$X_{2j}$|| . . . ||$X_{Lj}$)) (i=1, 2, . . . L) of L bits size according to the second one-way random hash function f2 in the computation means 204 from the message delivery request message RS and the preresponsive message $X_{ij}$ (i=1, 2, . . . , L) stored in the temporary memory 203 and stores it in the temporary memory 203 (S316). Here, f1 and f2 could be the same function.

Next, from the block work keys $WB_{ij}$ (l=1, 2, . . . , L) stores in the message division means 207 and the session key $K_{ij}$ (i=1, 2, . . . L) stored in the temporary memory 203, the secret key delivery message $V_{ij}$ (i=1, 2, . . . , L) is generated according to the third function f3 in the computation means 204, and stored as the check bits $e_{ij}$ (i=1, 2, . . . , L) which are transmitted to the user through the communication line 30 (S318). Here, as the third function f3, there is $V_{ij}$=f3 ($W_{ij}$, $K_{ij}$)=$W_{ij}$⊕$K_{ij}$ (i=1, 2 . . . , L) for example. Note that ⊕ indicates an exclusive OR.

The user stores the received check bits $e_{ij}$ (i=1, 2, . . . , g) in the temporary memory 102 (S319), and then, at the computation means 104, for each bit i of the check bits $e_{ij}$, $Y_{ij}$=$R_{ij}$ if $e_{ij}$=0, or $Y_{ij}$=$sRr_{ij}$ (mod N1) if $e_{ij}$=1, is calculated from the random number $R_{ij}$ stored in the temporary memory 102 and the user's secret information s stored in the user secret information storage means 101 (S320), and transmitted as a responsive message $Y_{ij}$ j(1–1, 2, . . . , L) to the information provider through the communication line 30 (S321).

The information provider stores the received responsive message $Y_{ij}$ (i=1, 2 . . . , L) in the temporary memory 203 (S322), and then, at the verification means 206, memory 203 (S322), and then, at the verification means 206. Whether a verification formula $Y_{ij}^2$=$X_{ij}$ (mod N1) if $e_{ij}$=0, or a verification formula $Y_i z$=$X_{ij}$×I (mod N1) if $e_{ij}$=1, is satisfied for each bit i, from the public information I of the user, and the preresponsive message $X_{ij}$, the responsive message $Y_{ij}$, and the check bits $e_{ij}$ stored in the temporary memory 203 (S323). If this verification has failed, the user is regarded as illegal, and the execution of the protocol is immediately discontinued (S324). If the verification has succeeded, the above processing is repeated until all the blocks are finished (S325). Then, if the verification has succeeded for all the blocks from the first block to the m-th block, the message delivery request message RS, the random message Z, the check bits $e_{ij}$, and the responsive message $Y_{ij}$ (i=1, 2, . . . , L) stored in the temporary memory 203 are recorded and managed as the log H in the logfile 208 (S326).

(3) Message take out step

For each block, the user generates the session key $K_j$=f2 (RS, ($X_{1j}$||$X_{2j}$|| . . . ||$X_{1j}$)) (i=1, 2, . . . , L: j=1, 2, . . . , m) of L bits size according to the second one-way random hash function f2 in the computation means 104 from the message delivery request message RS and the preresponsive message ($i=1, 2, \ldots, L: j=1, 2, \ldots, m$) stored in the temporary memory 102 and stores it in the temporary memory 102 (S327).

Next, from the check bits $e_{ij}$ ($i=1, 2, \ldots, L: j=1, 2, \ldots, m$) stored in the temporary memory 102, the secret key delivery message $V_{ij}$ ($i=1, 2, \ldots L: j=1, 2, \ldots, m$) is generated (S328), and the block work key $WB_{ij}$ ($i=1, 2, \ldots, L: j=1, 2, 1 \ldots, m$) is taken out according to an inverse function f3' of the third function f3 in the computation means 104 from the generated secret key delivery message $V_{ij}$ and the session key $K_{ij}$ ($i=1, 2, \ldots, L: j=1, 2, \ldots, m$) and stored in the message reconstruction means 108 (S329). Here, with respect to the third function f3 of $V_{ij}=f3(W_{ij}, K_{ij})=W_{ij} \oplus K_{ij}$ ($i=1, 2, \ldots, L: j=1, 2, \ldots, m$) for example, the third inverse function f3' is $W_{ij}=f3'(V_{ij}, K_{ij})=V_{ij} \oplus K_{ij}$ ($i=1, 2, \ldots, L, j=1, 2, \ldots, m$). Note that $\oplus$ indicates an exclusive OR.

After that, the work key $W_i$ ($i=1, 2, \ldots, g$) is reconstructed by using the block key $WB_{ij}$ ($i=1, 2, \ldots, L: j=1, 2, \ldots, m$) by the message reconstruction means 108 and stored in the message storage means 109 (S330).

Finally, the ciphertext C stored in the message storage means 109 is deciphered by the secret key cryptosystem means 105 with the work key $W_i$ ($i=1, 2, \ldots, g$) stored in the message storage means 109 as the secret key (S331), and the requested message $M=D_W(C)$ can be obtained from the message output/operation means 106 (S332).

(4) Arbitration

If the user claims later on that the requested message has not been received, or denies the request of the message delivery itself, the information provider presents the log H recorded and managed in the logfile 208, and stores it in the temporary memory 402 of the arbitrator (S341).

The arbitrator calculates $X_{ij}=Y_{ij}^2 \pmod{N1}$ if $e_{ij}=0$, or $X_{ij}=Y_{ij}^2/I \pmod{N1}$ if $e_{ij}=1$, at the computation means 401 for each bit i, from the public information I of the user, and the check bits $e_{ij}$ and the responsive message $Y_{ij}$ in the log H stored in the temporary memory 402, and stores it in the temporary memory 402 (S342). Next, the work key $W_i$ f1 (RS, Z) ($i=1, 2, \ldots, g$) is generated according to the first one-way random hash function f1 in the computation means 401 from the message delivery request message RS and the random message Z in the log H stored in the temporary memory 402 (S343), and then it is divided into the block work keys $WB_{ij}$ ($i=1, 2, \ldots L: j=1, 2, \ldots, m$) and stored at the message division means 404 (S344).

For each block (j-th block), the session key $K_{ij}=f2(RS, (X_{1j}\|X_{2j}\ldots\|X_{Lj}))$ ($i=1, 2, \ldots, L$) is generated according to the second one-way random hash function f2 in the computation means 401 from the message delivery request message RS and the calculation result $X_{ij}$ ($i=1, 2, \ldots, L$) stored in the temporary memory 402 (S345). Then, from the block work keys $W_{ij}$ stored in the message division means 404 and the session key $K_{ij}$ ($i=1, 2, \ldots, L$) stored in the temporary memory 402, the secret key delivery message $V_{ij}$ ($i=1, 2, \ldots, L$) is generated according to the third function f3 in the computation means 401 (S346), and as the check bits $e_{ij}$ ($i=1, 2, \ldots, L$) whether they coincide with the check bits $e_{ij}$ ($i=1, 2, \ldots, L$) in the log H stored in the temporary memory 402 is checked at the verification means 403 (S347). When they coincide for all blocks (m blocks from the first block to the m-th block), it implies that the authenticity of the log H is proven (S349), and the fact that the user has requested the message delivery and received the requested message is guaranteed. Otherwise, the log H is considered invalid (S350).

By using the above described message delivery method, results similar to the seventh embodiment can be obtained, and besides the secret communication is made for the message delivery request message RS between the information provider and the user, so that even if a third party wiretaps the communication sequence, it is impossible to obtain the message delivery request message RS and the session key Kij ($i=1, 2, \ldots, L: j=1, 2, \ldots, m$) from the wiretapped communication sequence. Also, the work key Wi ($i=1, 2, \ldots, g$) is obtained from the check bits $e_{ij}$ and the session key $K_{ij}$ ($i=1, 2, \ldots, L: j=1, 2, \ldots, m$), so that it becomes equivalent to the fact that the third party cannot obtain the work key $W_i$ ($i=1, 2, \ldots, g$), and it becomes possible to prevent the third party from illegally obtaining the message M by deciphering the ciphertext C.

In addition, the communication between the information provider and the user is repeatedly carried out as many times as a number m of divided blocks of the work key $W_i$ ($i=1, 2, \ldots, g$), so that if the verification of the information provider failed in the middle, the communication subsequent to that is discontinued, and the remaining check bits are not transmitted. Namely, the check bits that can be learned by the user are limited only to those prior to the failure of the verification, so that the user who caused the failure of the verification of the information provider can only obtain a part of the information necessary for deciphering the ciphertext C, and as a result, it becomes impossible to generate the correct work key $W_i$, ($i=1, 2, \ldots, g$).

Consequently, in addition to dealing with the case in which the illegal user who does not know the secret information s of the user transmits the illegal responsive message Y ij ($i=1, 2, \ldots, L: j=1, 2, \ldots, m$), it is possible to prevent an illegal act such as not transmitting the responsive message itself such that the user would illegally receive the check bits eij ($i=1, 2, \ldots, L: j=1, 2, \ldots, m$) necessary in obtaining the requested message M and illegally decipher/obtain the message M despite the fact that the information provider cannot make a record management of the log H for proving that the information provider has delivered the requested message M to the user.

Also, in the above explanation, the bit length of the divided blocks has been set to be constant L for each block, the bit length size could be changed block by block, as in a case of 1 bit for the first block, 2 bits for the second blocks, 4 bits for the third blocks, etc. for example.

Finally, among the secret communication in the above explanation, as for the secret communication according to the public key cryptosystem, the secret key cryptosystem could be used instead. Also, it has been explained according to the Fiat Shamir scheme, but the present method is applicable to all the zero knowledge interactive proof protocols which base their safety on a difficulty of the factoring or a difficulty of the discrete logarithmic problem, etc., including the Extended Fiat Shamir scheme (Ota, Okamoto, "An Extension of the Fiat-Shamir Scheme Based on Higher Degree Roots", the Electronic Information Communication Society, Technical Research Report ISEC88-13).

As explained in the above, according to the fifth to eight embodiments of the present invention, in the message delivery method utilizing the zero knowledge interactive proof protocol, firstly, at the message delivery step, the message requested by the user is delivered to the user by being enciphered by the information provider, so that it is impossible for the user to take out the requested message itself at this point. Secondly, the operation of the protocol carried out at the delivery certification step itself is equivalent to the zero knowledge interactive proof protocol as the user authentication, so that similarly as in the zero knowledge interactive proof protocol, it is almost impossible for the illegal user to clear the verification of the information provider. Thirdly, if the delivery certification step is normally finished, it is equivalent to the fact that the zero knowledge interactive proof protocol is finished normally, so that the information provider can judge that the user has correctly received the check bits and has applied the appropriate processing. Fourthly, at the message take out step, if the check bits can be received correctly, the user can produce the secret key delivery message and the work key, so that the requested message can be taken out by deciphering the message enciphered by said work key at this point. Consequently, due to these effects, all the steps of the message delivery method are finished, the information provider can certify that, after the requested message is provided in the enciphered state to the legitimate user, the information necessary for the user to decipher the enciphered message has been delivered to the user, and the user has surely received it so that the information provider can judge that the message requested by the user has surely been delivered to the user.

Also, according to the fifth and sixth embodiments of the present invention, by carrying out the secret communication for the check bits, the equivalent effects as in a case of carrying out the secret communication for the work key as well can be obtained, so that these secret keys are not going to be learned even when a third party wiretaps the communication path. In addition, it is also possible to make it such that information effective in decoding the work key cannot be obtained.

Also, according to the seventh and eighth embodiments of the present invention, it is possible to make it such that the work key convenient for the information provider cannot be generated illegally.

Also, as it is impossible to forge the log, the information provider can acquire a valid evidence which can prove later on the fact that, after the requested message is provided in an enciphered state to the legitimate user, the information necessary for the user to decipher the enciphered message has been delivered to the user, and the user has surely received it.

Also, it becomes possible to present the log as valid evidence. In addition, the amount of information that must be recorded and managed as desired evidence that the information provider has delivered the message can be reduced considerably compared with the scheme of Sakurai (Japanese Patent Application Laid Open No. 5-12321).

Also, in case there arises a need to carry out the arbitration regarding the presence or absence of the information having been provided between the information provider and the user, a neutral arbitration organization, such as a court, can judge which one of a claim of the information provider and a claim of the user is a proper one by checking the authenticity of the log as a valid evidence.

Also, according to the eighth embodiment of the present invention, by making the secret communication for the message delivery request message, it is possible to prevent wiretapping of the message delivery request message by the third party, and to protect the privacy of the user, concerning what kind of message has been requested, etc.

Also, as for the session key and the work key, they are scrambled by the information secret among the information provider and the user alone, so that these secret keys are not going to be learned even when a third party wiretaps the communication path, thus information effective in decoding the secret key cannot be obtained. Therefore, it is impossible for a third party to illegally obtain the message requested by the user.

Also, in the case the verification of the information provider failed in the middle of the delivery certification step due to utilization by the illegal user, etc. for example, the execution of the protocol is immediately discontinued, and the blocks subsequent to the failure of the verification are not transmitted to the user. Consequently, the user who caused the failure of the verification of the information provider can obtain only a part of the information necessary for deciphering the enciphered message, and as a result, it becomes impossible to generate the session key or the work key, so that it is possible to eliminate a case in which the illegal user illegally obtains the requested message.

Also, according to these embodiments, the information provider can certify that the information provider has surely delivered the requested message to the user and the user has surely received it. Also, it is possible to use the zero knowledge interactive proof protocol independently as a user authentication method by which the information provider authenticates the user according to the need. Also, a random message can be utilized at the time of generating the work key.

Also, according to the fifth and eighth embodiments of the present invention, there is no information provider secret information storage means in which the information provider can store the information which is to be kept in secret.

Also, according to the fifth, sixth, and eighth embodiments of the present invention, the secret communication according to the public key cryptosystem can be made between the information provider and the user.

Also, according to the seventh and eighth embodiments of the present invention, there is input means for producing the message delivery request message easily on the user terminal.

Also, there is provided a function for generating the session key and the secret key delivery message, such that the message delivery utilizing the work key and the session key can be carried out.

Also, the log can be presented as valid evidence according to the need.

Also, for neutral arbitration organization, such as a court to check the authenticity of the log as evidence, and judge which one of a claim of the information provider and a claim of the user is a proper one.

Also, according to the eighth embodiment of the present invention, it becomes a system in which the execution of the protocol is immediately discontinued when it detects an illegal user, such that it is possible to eliminate a case in which the illegal user illegally obtains the requested message.

Next, the ninth embodiment of the present invention will be explained.

Figure 26:
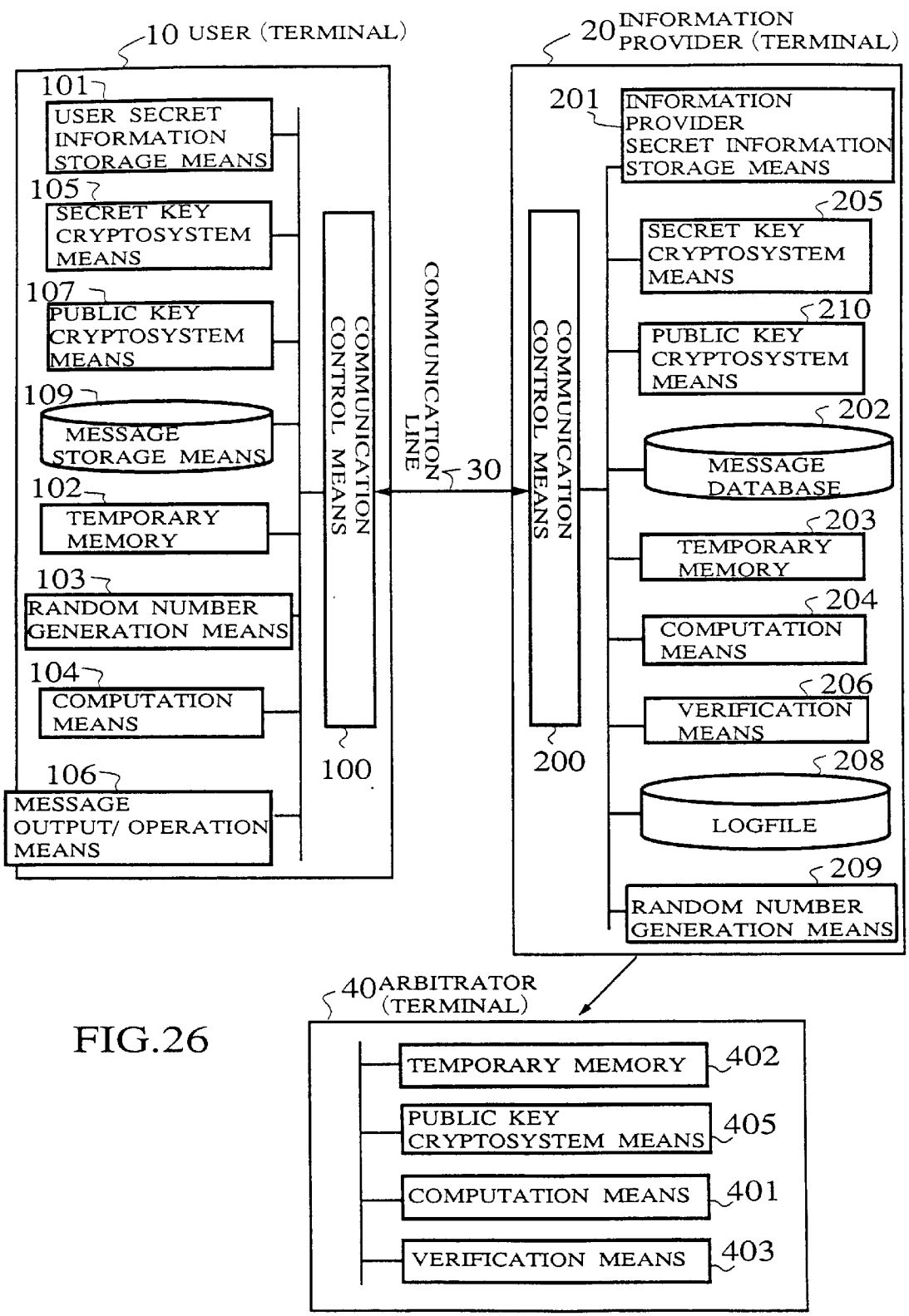
FIG. 26 is a block diagram showing an exemplary configuration of a message delivery system in the ninth embodiment of the present invention.

FIG. 26 is a block diagram showing a configuration of a message delivery system in the ninth embodiment of the present invention, in which 10 indicates a user (terminal) that receives delivery of messages, where 100 is a communication control means for controlling a communication line 30, 101 is a user secret information storage means for storing a secret information of the user produced by a center, 105 is a secret key cryptosystem means for utilizing the secret key cryptosystem (DES, FEAL, for example), 197 is a public key cryptosystem means for utilizing the public key cryptosystem (RSA, for example), 109 is a message storage means for storing the message delivered from the information provider, 102 is a temporary memory for the user to temporarily store necessary information, 103 is a random number generation means for the user to generate random numbers, 104 is a computation means for carrying out necessary computations, and 106 is a message output/operation means outputting or operating the requested message. 20 indicates the information provider (terminal) for providing messages, where 200 is a communication control means for controlling the communication line 30, 201 is an information provider secret information storage means for storing secret information of the information provider, 205 is a secret key cryptosystem means for utilizing the secret key cryptosystem, 210 is a public key cryptosystem means for utilizing the public key cryptosystem, 202 is a message database in which the messages to be provided are stored, 203 is a temporary memory for the information provider to temporarily store a necessary information, 204 is a computation means for carrying out necessary computations, 206 is a verification means for verifying an authenticity of the message, 208 is a logfile for making a record management of a log data H as an evidence for proving later on the fact that the message has been delivered to the user, and 209 is a random number generation means for the information provider to generate random numbers. 30 indicates the communication line for connecting the user and the information provider. 40 indicates an arbitrator (terminal) for judging later on an authenticity of the log data H from a neutral standpoint, for the log data H which is recorded and managed by the information provider in the logfile 208, where 402 is a temporary memory for the arbitrator to temporarily store a necessary information, 405 is a public key cryptosystem, 401 is a computation means for carrying out necessary computations, and 403 is a verification means for verifying an authenticity for the log data H about which the judgment of the authenticity is requested.

Figure 27:
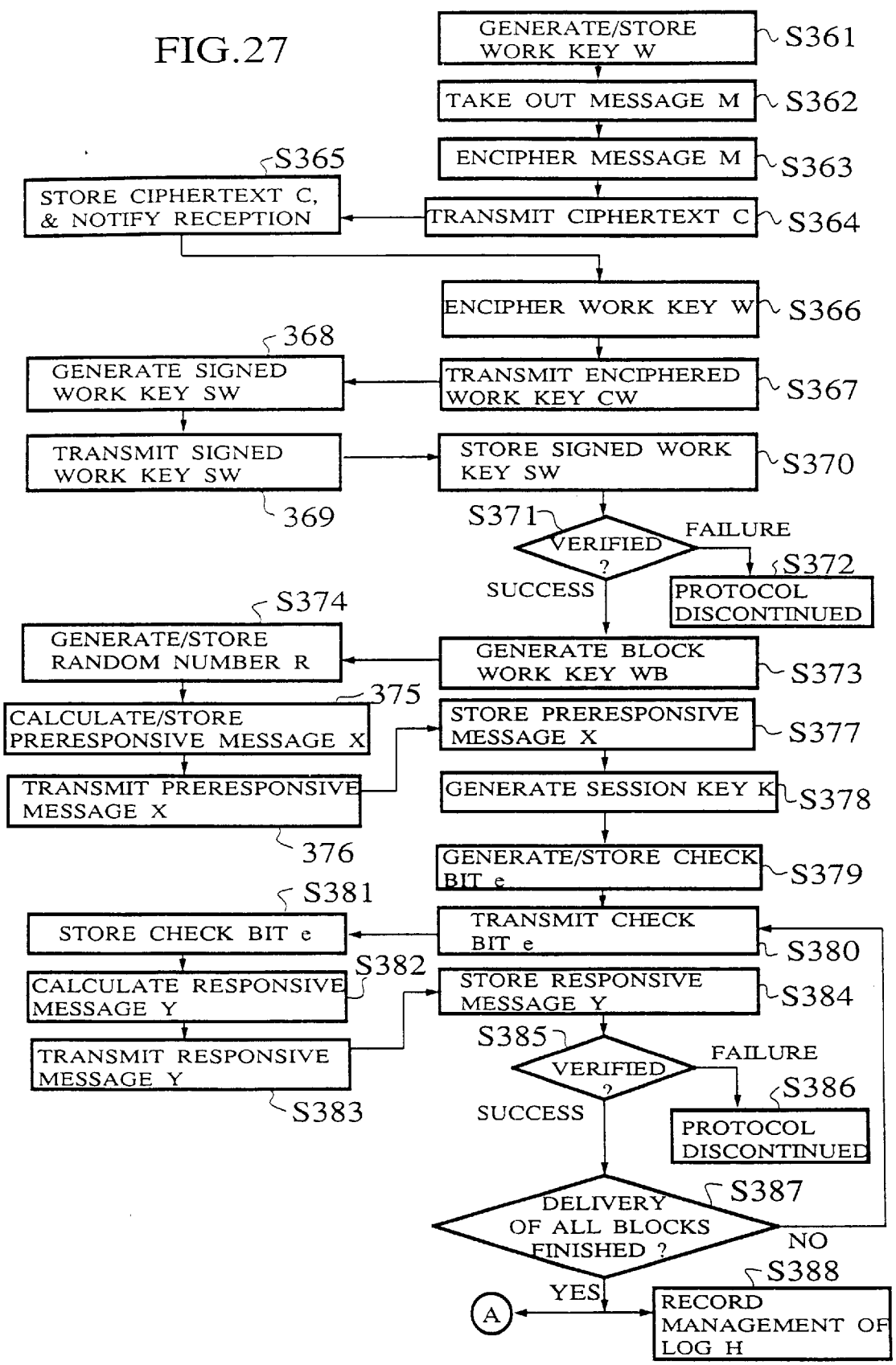
FIG. 27 is a flow chart showing a first half of an operation procedure concerning a message delivery, a delivery certification and a message take out for the message delivery system shown in FIG. 26.

In the following, an operation procedure for the message delivery step, the delivery certification step, and the message take out step will be explained according to the flow chart of FIG. 27 and FIG. 28, and the operation procedure for the arbitration will be explained according to the flow chart of FIG. 29.

Here, an alphabet letter other than the random number R, the preresponsive message X, and the responsive message Y indicates the entire information, and an alphabet letter with a subscript indicates bit information for that information. For example the work key W indicates an entire work key formed in g bits length, and the work key $W_i$ (i=1, 2, ..., g) indicates the bit information for the i-th bit of the work key. Also, the subscript of the random number R, the preresponsive message X, and the responsive message Y indicates one piece information among others of the identical type which are generated in plurality. For example, the random number $R_i$ (i=1, 2, ..., g) indicates that it is a random number information which is generated at the i-th order among the random numbers which are generated in g pieces.

(0) Preparation stage

A reliable center sets up p1, q1, ID, S, p2, q2, PU, and SU for each user, discloses N1, N2, ID, and PU among them as the public information as the user, and stores S and SU as the secret information of the user in the user secret information storage means 101 and secretly distributes it to the user. Here, each set of (p1, q1) and (p2, q2) is a set of mutually different large prime numbers, and N1=p1×q1, N2=q2×q2. Also, ID=$S^2$ (mod N1), PU×SU=1 (mod (p2-1) (q2-1)) hold. Note that it may be p1=p2, q1=q2.

In addition, p, q, PC, and SC are set up for each information provider, N and PC among them are disclosed as the public key of the information provider, and SC is stored as the secret key of the information provider in the information provider secret information storage means 201, and it is secretly distributed to the information provider. Here, p and q are mutually different large prime numbers, and N=pq. Also, PC×SC=1 (mod(p-1) (q-1)) holds.

(1) Message deliver step

The information provider arbitrarily generates the work key W of the g bits length by the random number generation means 209, and stores it in the temporary memory 203 (S361). Here, in general, a value of g is greater than or equal to a key length of the secret key used in the secret key cryptosystem means 105 and 205. After that, the message M is taken out from the message database 202 (S362), and after it is enciphered into the ciphertext C=$E_w$(M) by the secret key after it is enciphered into the ciphertext C=Ew (M) by the secret key cryptosystem means 205 with the work key W as the secret key (S363), the ciphertext C is transmitted to the user through the communication line 30 (S364).

After the ciphertext C is received/stored at the message storage means 109, the user so notifies the information provider through the communication line 30 (S365).

Here, the communication line 30 is used for the transmission of the ciphertext C at S364, but it could be recorded on a physical medium such as a CD-ROM, and distributed to the public without using the communication line. In such a case, the operation of S365 is often omitted.

(2) Delivery Certification step

The information provider enciphers the work key W by the public key cryptosystem means 210 with the public key PC of the information provider (S366), and communicates the enciphered work key CW=$W^{PC}$ (mod N) to the user through the communication line 30 (S367).

The user makes the digital signature on the enciphered work key CW by the public key cryptosystem means 107 by using the secret information SU of the user (S368), and transmits the signed work key SW=$CW^{SU}$ (mod N2) to the information provider through the communication line 30 (S369).

The information provider stores the signed work key SW in the temporary memory 203 (S370), and then, at the verification means 206, whether a signature verification formula CW=$SW_p$U (mod N2) is satisfied by using the public key PU of the user (S371). If this verification has failed, the user is regarded as illegal, and the execution of the protocol is immediately discontinued (S372). Also, if the verification has succeeded, the work key W is divided into a plurality of blocks in arbitrary bit lengths at the computation means 204, to generate the block work keys WB (S373). Here, for the sake of the simplicity of the explanation, a number of divided blocks is set to be b, a bit length is set to be constant L for all the blocks, and the divided work keys are expressed as the block work keys $WB_{ij}$ (i=1, 2, ..., L: j=1, 2, ..., b). Namely, $WB_{ij}$=W $_{(i+L(j-1))}$), and it is going to be $WB_{11}$=$W_1$, $WB_{L1}$, $WB^{12}$= WL+1, and WB L B=W2, for example.

The user generates g pieces of random numbers $R_{ij}$ (i=1, 2, ..., L: j=1, 2, ..., b) by the random number generation means 103 and then stores them in the temporary memory 102 (S374), calculates a preresponsive message $X_{ij}$=$R_{ij}^2$ (mod N1) (i=1, 2, ..., L: j=1, 2, ..., b) by the computation means 104 for each and then stores it in the temporary memory 102 (S375), and transmits the preresponsive message $X_{ij}$ (i=1, 2, ..., L: 1, 2, ..., b) to the information provider through the communication line 30 (S376).

The information provider stores the preresponsive message $X_{ij}$ (i=1, 2, ..., L: j=1, 2, ..., b) in the temporary memory 203 (S377), and then generate the session key $K_{ij}$=h $(X_{ij}\|X_{2j}, \|...\|X_{Lj})$ (i=1, 2, ..., L: j=1, 2, ..., b) of g bits length according to the one-way random hash function h(•)

in the computation means 204 (S378), and generates the check bits $e_{ij}$ (i=1, 2, ..., L: j=1, 2, ..., b) according to the function f(•) in the computation means 204 from the block work keys $WB_{ij}$ and the session key $K_{ij}$ (i=1, 2, ..., b) and stores it in the temporary memory 203 (S379). Here, as the function f, there is $e_{ij}=f(W_{ij}, K_{ij})=W_{ij}\oplus K_{ij}$ (i=1, 2, ..., L: j=1, 2, ..., b) for example. Note that $\oplus$ indicates an exclusive OR.

The processing from here on is for the j-th block, and the following processing is repeatedly carried out sequentially (b times) for each block from the first block to the b-th block.

The information provider transmits the check bits $e_{ij}$ (i=1, 2, ..., L) to the user through the communication line 30 (S380).

The user stores the check bits $e_{ij}$ (i=1, 2, ..., L) in the temporary memory 102 (S381), and then, at the computation means 104, for each bit i of the check bits $e_{ij}$, $Y_{ij}=R_{ij}$ if $e_{ij}=0$, or $Y_{ij}=S \times R_{ij}$ (mod N1) if $e_{ij}=1$, is calculated from the random number Rij and the secret information S of th user (S382), and transmitted as a responsive message $Y_{ij}$ (i=1, 2, ..., L) to the information provider through the communication line 30 (S383).

The information provider stores the responsive message $Y_{ij}$ (i=1, 2, ..., L) in the temporary memory 203 (S384), and then, at the verification means 206, whether a verification formula $Y_{ij}^2=X_{ij}$ (mod N1) if $e_{ij}=0$, or a verification formula $Y_{ij}^2=X_{ij} \times ID$ (mod N1) if $e_{ij}=1$, is satisfied for each bit i, from the public information ID of the user, the preresponsive message $X_{ij}$, the responsive message $Y_{ij}$, and the check bits $e_{ij}$ (S385). If this verification has failed, the user is regarded as illegal, and the execution of the protocol is immediately discontinued (S386). If the verification has succeeded, it returns to S380, and the above processing is repeated until all the blocks are finished (S387). Then, if the verification has succeeded for all the blocks from the first block to the b-the block, the work key W, the signed work key SW, the check bits $e_{ij}$, and the responsive message $Y_{ij}$ (i=1, 2, ..., L) are recorded and managed as the log data H in the logfile 208 (S388).

(3) Message take out step

The user generates the session key $K_{ij}=h\ (X_{1j}\|X_{2j}\|\ldots\|X_{Lj})$ (i=1, 2, ..., L: j=1, 2, ..., b) of g bits length according to the one-way random hash function h (•) in the computation means 104 from the preresponsive message $X_{ij}$ (i=1, 2, ..., L: j=1, 2, ..., b) (S389), (S389), and takes out the block work keys $WB_{ij}\ldots$, L: j=1, 2, ..., b) according to an inverse function f'(•) of the third function f(•) in the computation means 104 from the check bits eij and the session key $K_{ij}$ (i=1, 2, ..., L: j=1, 2, ..., b) (S390). Here, with respect to the function f(•) of $e_{ij}=f(W_{ij}, K_{ij})=W_{ij}\oplus K_{ij}$ (i=1, 2, ..., L: j=1, 2, ..., b) for example, the inverse function f'(•) is $W_{ij}=f'(e_{ij}, k_{ij}\|(\bullet)(e_{ij}\oplus K_{ij})$ (i=1, 2, L: j=1, 2, ..., b). Note that $\oplus$ indicates an exclusive OR. After that, the work key $W_{ij}$ (i=1, 2, ..., L: j=1, 2, ..., m) at the computation means 104, and stored in the message storage means 109 (S391). Finally, the ciphertext C stored in the message storage means 109 is deciphered by the secret key cryptosystem means 105 with the work key W as the secret key (S392), and the message $M=D_W$ (C) can be obtained from the message output/operation means 106 (S393).

(4) Arbitration

If the user claims later on that the requested message has not been received, the information provider presents the log data H recorded and managed in the logfile 208 and stores it in the temporary memory 402 of the arbitrator (S401).

The arbitrator generates the work key $CW=W_{pc}$ (mod N) in which the work key W is enciphered by the public key PC of the information provider at the public key cryptosystem means 405 (S402), and verifies whether the signed work key SW satisfies the signature verification formula $CW=SW\_$ (mod N2) by using the public key PU of the user at the verification means 403 (S403). When the verification has failed, the log data H is considered as invalid (S404).

If the verification of the signature has succeeded, $X_{ij}=Y_{ij}^2$ (mod N1) if $e_{ij}=0$, or $X_{ij}=Y_{ij}^2/ID$ (mod N1) if $e_{ij}=1$ is calculated, at the computation means 401 for each bit i, from the public information ID of the user, and the check bits e ij and the responsive message $Y_{ij}$ in the log data H and stored in the temporary memory 402 (S405), the block work keys $WB_{ij}$ (i=1, 2, ..., L: j=1, 2, ..., b) are generated from the work key W at the computation means 401 (S406). Next, the session key $K_{ij}=h\ (X_{1j}\|X_{2j}\|X_{Lj})$ (i=1, 2, ..., L: j=1, 2, ..., b) are generated according to the function f(•) in the computation means 401 from the calculation result $X_{ij}$ (i=1, 2, ..., L) (S407), the check bits $e_{ij}$ (i=1, 2, ..., L: j=1, 2, ..., b) are generated according to the function h(•) in the computation means 401 from the block work keys $W_{ij}$ and the session key $K_{ij}$ (i=1, 2, ..., L: j=1, 2, ..., b) (S408), and whether they coincide with the check bits $e_{ij}$ (i=1, 2, ..., L: j=1, 2, ..., b) in the log data H stored in the temporary memory 402 for all bits is checked at the verification means 403 (S409). When they coincide for all bits, it implies that the authenticity of the log data H is proven, and the fact that the user has received the message M is guaranteed (S410). Otherwise the log data H is considered invalid (S411).

By using the above described message delivery method, the message M is transmitted or distributed by the physical medium to the user by being enciphered into the ciphertext C first, so that at a point at which the user acquired the ciphertext C, the message M is not going to be obtained. Then, at a point at which the protocol is finished normally, it implies that the user authentication according to the zero knowledge interactive proof protocol has been made normally, and besides it can be certified that the user has received the check bits e normally. Also, apart from the check bits e, the work key W is generated from the preresponsive message $X_{ij}$ (i=1, 2, ..., L: j=1, 2, ..., b) produced by the user and the user can obtain the message M by deciphering the ciphertext C, so that the fact that the user has received the check bits e normally and the fact that the user has received the message M normally become equivalent. Therefore, the information provider can certify the fact that the message M has surely been delivered to the user accurately.

In addition, the communication between the information provider and the user is repeatedly carried out as many times as a number b of divided blocks of the work key W, so that if the verification of the information provider failed in the middle, the communication subsequent to that is discontinued, and the remaining check bits are not transmitted. Namely, the check bits that can be learned by the user arc limited only to those prior to the failure of the verification, so that the user who caused the failure of the verification of the information provider can only obtain a part of the information necessary for deciphering the ciphertext C, and as a result, it becomes impossible to generate the correct work key W. Consequently, in addition to dealing with the case in which the illegal user who does not know the secret information S of the user transmits the illegal responsive message, it is possible to prevent an illegal act such as not transmitting the responsive message itself such that the user would illegally receive all the check bits e necessary in obtaining the message M and could illegally decipher/obtain the message M despite the fact that the information provider cannot make a record management of the log data H for proving that the information provider has delivered the message M to the user. Note that, in the above explanation, the bit length of the divided blocks has been set to be constant L for each block, but the bit length could be changed block by block, as in a case of 1 bit for the first block, 2 bits for the second blocks, 4 bits for the third blocks, etc. for example.

Next, the signed work key SW can be produced only by the user, and it is impossible for the information provider to illegally alter the work key W or the signed work key W. Also, in relation to the communication sequence comprising the work key W, the preresponsive message $X_{ij}$, the check bits $e_{ij}$, and the responsive message $Y_{ij}$ (i=1, 2, . . . , L: j=1, 2, . . . , b), they are mutually related by the verification formula in the zero knowledge interactive proof protocol and the one-way random has function h(•), so that it is impossible to alter or forge the communication sequence by altering a part of the log data H, which can be presented to a neutral third party such as the arbitrator, later on, as evidence that the user has surely received the work key W for making it possible for the user to obtain the message M by deciphering the ciphertext C.

The above explanation describes a system by which it is possible to prove the fact that the information provider has delivered the message M to the user accurately and surely, and various manners of utilization are possible. For example, if the message is being charged for such as the writings, etc., as the information provider transmits the message M to the user according to the above described message delivery method, the log data H recorded and managed by the information provider can be utilized as proof at the time of collecting the message fee such as a fee for using the copyright, and so on.

Also, it has been explained according to the Fiat Shamir scheme, but the present method is applicable to all the zero knowledge interactive proof protocols which base their safety on a difficulty of the factoring or a difficulty of the discrete logarithmic problem, etc., including the Extended Fiat Shamir scheme (Ohta, Okamoto, "An Extension of the Fiat-Shamir Scheme Based on Higher Degree Roots", the Electronic Information Communication Society, Technical Research Report ISEC88-13).

As explained in the above, according to the ninth embodiment of the present invention, in the message delivery method utilizing the zero knowledge interactive proof protocol, firstly, at the message delivery step, the message requested by the user is delivered to the user by being enciphered by the information provider, so that it is impossible for the user to take out the requested message itself at this point. Secondly, the operation of the protocol carried out at the delivery certification step itself is equivalent to the zero knowledge interactive proof protocol, so that similarly as in the zero knowledge interactive proof protocol, it is almost impossible for the illegal user to clear the verification of the information provider. Thirdly, if the delivery certification step is normally finished, it is equivalent to the fact that the zero knowledge interactive proof protocol is finished normally, so that the information provider can judge that the user has correctly received the check bits and applied the appropriate processing. Fourthly, at the message take out step, if the check bits are received correctly, the user can produce the work key, so that the requested message can be taken out by deciphering the message enciphered by said work key at this point. Consequently, due to these effects, if all the steps of the message delivery method are finished, the information provider can certify that, after the requested message is provided in the enciphered state to the legitimate user, the information necessary for the user to decipher the enciphered message has delivered to the user, and the user has surely received it so that the information provider can judge that the message requested by the user has surely been delivered to the user.

Also, it is possible to prevent the information provider from illegally altering the work key to what is convenient to itself. In addition, the enciphered work key cannot be deciphered by anyone but the information provider, so that the work key can not be learned by the user, thus ensuring that the user has surely received it unaltered.

Also, it becomes possible to present the log as a valid evidence according to the need. In addition, an amount of information that must be recorded and managed as the evidence that the information provider has delivered the message can be reduced considerably compared with the scheme of Sakurai (Japananese Patent Application Laid Open No. 5-12321).

Also, in case there arises a need to carry out an arbitration regarding the presence or absence of the information having been provided between the information provider and the user, a neutral arbitration organization, such as a court, can judge which one of a claim of the information provider and a claim of the user is a proper one by checking the authenticity of the log as valid evidence.

Also, in case the verification of the information provider failed in a middle of the delivery certification step due to the utilization by the illegal user, etc. for example, the execution of the protocol is immediately discontinued, and the blocks subsequent to the failure of the verification are not transmitted to the user. Consequently, the user who caused the failure of the verification of the information provider can obtain only a part of the information necessary for deciphering the enciphered message, and as a result, it becomes impossible to generate the work key, so that it is possible to eliminate a case in which the illegal user illegally obtains the requested message.

Also, according to this embodiment, the information provider can certify that it has surely delivered the requested message to the user. Also, it is possible to use the zero knowledge interactive proof protocol independently as a user authentication method by which the information provider authenticates the user according to the need. Also, the random message can be utilized at a time of generating the work key.

Also, the information provider can store information which is to be kept in secret in the information provider secret information storage means.

Also, the key secret information according to the public key cryptosystem can be made between the information provider and the user.

Also, a function could be provided for generating the session key, such that the message delivery utilizing the work key and the session key can be carried out.

Also, the log can be presented according to the need as valid evidence.

Also, a neutral arbitration organization such as a court, could check the authenticity of the log as valid evidence, and judge which one of a claim of the information provider and a claim of the user is a proper one.

Also, the execution of the protocol is immediately discontinued when an illegal user is detected, such that it is possible to eliminate a case in which the illegal user illegally obtains the requested message.

It is to be noted that the present invention is not limited to the embodiments described above, and can be realized in various modifications within a range not departing from its essence.

We claim:

1. A message delivery system for delivering a message M from an information providing terminal to a user terminal, comprising:

a user terminal including:
a user communication control unit for controlling a communication with the information provider terminal,
a user secret information storage unit for storing a secret information S that is kept in secret by a user,
a random number generation unit for generating a random number, and
a user computation unit for generating a preresponsive message X and a responsive message Y according to the secret information S and the random number, the preresponsive message X being a message transmitted from the user terminal to the information provider terminal prior to a response by the user to the message M and the response message Y being a message transmitted from the user terminal to the information provider terminal in response to receiving of the message M; and an information provider terminal including:
an information provider communication control unit for controlling the communication with the user terminal,
a message database for storing the message M to be provided to the user by the communication through the information provider communication control unit, and
a verification unit for carrying out a user authentication of the user according to a zero knowledge interactive proof protocol using the preresponsive message X and the responsive message Y received from the user terminal through the information provider communication control unit and check bits E, the check bits E being information generated at the information provider terminal from a work key W and transmitted to the user terminal such that the responsive message Y is produced at the user terminal from the preresponsive message X, the check bits E, and the secret information S, the work key W being a key used in enciphering the message M at the time of transmitting the message M from the information provider terminal to the user terminal, and the user authentication checks whether the responsive message Y is a correct response corresponding to the preresponsive message X, the check bits E, and a public information of the user, and authenticates that the user knows the secret information S without leaking the secret information S of the user, while certifying that the user has surely received the check bits E.

2. The message delivery system as described in claim 1, wherein the user terminal also includes a message storage unit for storing the message delivered from the information provider terminal through the user communication control unit.

3. The message delivery system as described in claim 1, wherein both the user terminal and the information provider terminal also include a cryptosystem unit for carrying out a secret communication according to either a secret key cryptosystem or a public key cryptosystem, or both.

4. The message delivery system as described in claim 3, wherein the information provider terminal also includes an information provider secret information storage unit for storing an information to be kept in secret by the information provider which is to be utilized by the cryptosystem unit in carrying out the secret communication.

5. The message delivery system as described in claim 1, wherein both the user computation unit of the user terminal and the verification unit of the information provider terminal carry out a function computation according to either a hush function or a one-way random function, or both.

6. The message delivery system as described in claim 1, wherein the information provider terminal also includes a logfile for carrying out a record management of a log data for the zero knowledge interactive proof protocol.

7. The message delivery system as described in claim 6, further comprising:
an arbitration terminal for checking an authenticity of the log data, so as to determine whether the information provider has provided the message to the user or not, including:
an arbitration computation unit for generating the preresponsive message and the check bits, and
an arbitration verification unit for checking the authenticity of the log data according to the check bits in the log data and the check bits generated by the arbitration computation unit.

8. The message delivery system as described in claim 7, wherein the arbitration terminal also has a verification unit for verifying whether a signature of a signed work key in the log data is authentic.

9. The message delivery system as described in claim 1, wherein
the information provider terminal also includes a message division unit for dividing the message to be delivered to the user through the information provider communication control unit into a plurality of blocks in sizes of arbitrary bit lengths, and
the user terminal also includes a message reconstruction unit for reconstructing the message divided by the message division unit into an original form.

10. The message delivery system as described in claim 1, wherein the information provider terminal also includes a random number generation unit for generating a random number to be utilized by the verification unit.

11. The message delivery system as described in claim 1, wherein both the user terminal and the information provider terminal also include a public key cryptosystem unit for carrying out a secret communication according to a public key cryptosystem.

12. The message delivery system as described in claim 1, wherein
the user terminal also includes a digital signature unit for making a digital signature, and
the information provider terminal also includes a digital signature verification unit for verifying the digital signature.

13. A message delivery system in which a user receives a message from an information provider, the system comprising:
an information provider terminal including:
a user authentication unit for carrying out a user authentication of the user according to a zero knowledge interactive proof protocol using check bits E generated from a work key W; and
a transmission unit for transmitting to the user a ciphertext C and the check bits E, the ciphertext C containing a message M to be delivered to the user which is enciphered according to a secret key cryptosystem by using the work key W; and
a user terminal including:
a message reception unit for taking out the work key W by using at least the check bits E, and obtaining the message M by deciphering the ciphertext C according to the secret key cryptosystem by using the work key W;

wherein the user terminal transmits to the information provider terminal a preresponsive message X prior to a response by the user to the message M, and a response message Y produced from the preresponsive message X, the check bits E, and a secret information S of the user in response to receiving of the message M, and the user authentication checks whether the responsive message Y is a correct response corresponding to the preresponsive message X, the check bits E, and a public information of the user, and authenticates that the user knows the secret information S, without leaking the secret information S of the user, while certifying that the user has surely received the check bits E.

* * * * *